United States Patent
Appelman

(10) Patent No.: US 9,049,569 B2
(45) Date of Patent: Jun. 2, 2015

(54) PROHIBITING MOBILE FORWARDING

(75) Inventor: Barry Appelman, McLean, VA (US)

(73) Assignee: Google Inc., Mountain View, CA (US)

( * ) Notice: Subject to any disclaimer, the term of this patent is extended or adjusted under 35 U.S.C. 154(b) by 350 days.

(21) Appl. No.: 12/662,909

(22) Filed: May 11, 2010

(65) Prior Publication Data

US 2010/0285843 A1      Nov. 11, 2010

Related U.S. Application Data

(63) Continuation of application No. 11/618,635, filed on Dec. 29, 2006, now Pat. No. 7,730,143, and a continuation-in-part of application No. 11/321,074, filed on Dec. 30, 2005, now abandoned, and a continuation-in-part of application No. 11/017,202, filed on Dec. 21, 2004.

(60) Provisional application No. 60/806,329, filed on Jun. 30, 2006, provisional application No. 60/806,322, filed on Jun. 30, 2006, provisional application No. 60/724,883, filed on Oct. 11, 2005, provisional application No. 60/631,876, filed on Dec. 1, 2004.

(51) Int. Cl.
| | |
|---|---|
| G06F 15/16 | (2006.01) |
| H04W 4/12 | (2009.01) |
| H04L 12/58 | (2006.01) |
| H04L 29/06 | (2006.01) |
| H04W 4/16 | (2009.01) |
| H04W 88/18 | (2009.01) |

(52) U.S. Cl.
CPC ............. *H04W 4/12* (2013.01); *H04L 12/5855* (2013.01); *H04L 51/14* (2013.01); *H04L 63/104* (2013.01); *H04L 12/581* (2013.01); *H04L 12/5835* (2013.01); *H04L 51/04* (2013.01); *H04L 51/066* (2013.01); *H04W 4/16* (2013.01); *H04W 88/184* (2013.01)

(58) Field of Classification Search
USPC ......................................................... 709/206
See application file for complete search history.

(56) References Cited

U.S. PATENT DOCUMENTS

| | | | |
|---|---|---|---|
| 4,837,798 | A | 6/1989 | Cohen et al. |
| 5,086,394 | A | 2/1992 | Shapira |

(Continued)

FOREIGN PATENT DOCUMENTS

| | | |
|---|---|---|
| EP | 0862304 A2 | 2/1998 |
| EP | 1176840 A1 | 1/2002 |

(Continued)

OTHER PUBLICATIONS

Yahoo! Messenger, "Messenger Help," (4 total pages) (available at least as of Aug. 9, 2004).

(Continued)

*Primary Examiner* — Melvin H Pollack

(57) ABSTRACT

An incoming message and an indication of a sender-specified destination for the incoming message are received. In addition, a determination is made as to whether a mobile telephone number is known by the sender to be associated with the sender-specified destination. If a mobile telephone number is known by the sender to be associated with the sender-specified destination, a first message that is based on the incoming message is sent to the mobile telephone number. Furthermore, a second message is sent to the mobile telephone number that indicates that the first message was sent to the mobile telephone number based on a determination that the mobile telephone number is known by the sender to be associated with the sender-specified destination.

18 Claims, 28 Drawing Sheets

(56) References Cited

U.S. PATENT DOCUMENTS

| | | |
|---|---|---|
| 5,276,905 A | 1/1994 | Hurst et al. |
| 5,315,636 A | 5/1994 | Patel |
| 5,327,486 A | 7/1994 | Wolff et al. |
| 5,548,637 A | 8/1996 | Heller et al. |
| 5,608,786 A | 3/1997 | Gordon |
| 5,673,308 A | 9/1997 | Akhavan |
| 5,694,616 A | 12/1997 | Johnson et al. |
| 5,721,906 A | 2/1998 | Siefert |
| 5,742,905 A | 4/1998 | Pepe et al. |
| 5,774,670 A | 6/1998 | Montulli |
| 5,793,365 A | 8/1998 | Tang et al. |
| 5,802,470 A | 9/1998 | Gaulke et al. |
| 5,850,594 A | 12/1998 | Cannon et al. |
| 5,867,162 A | 2/1999 | O'Leary et al. |
| 5,870,744 A | 2/1999 | Sprague |
| 5,872,521 A | 2/1999 | Lopatukin et al. |
| 5,878,219 A | 3/1999 | Vance et al. |
| 5,893,091 A | 4/1999 | Hunt et al. |
| 5,893,099 A | 4/1999 | Schreiber et al. |
| 5,913,032 A | 6/1999 | Schwartz et al. |
| 5,920,692 A | 7/1999 | Nguyen et al. |
| 5,940,488 A | 8/1999 | DeGrazia et al. |
| 5,946,616 A | 8/1999 | Schomack et al. |
| 5,946,617 A | 8/1999 | Portaro et al. |
| 5,946,630 A | 8/1999 | Willars et al. |
| 5,948,058 A | 9/1999 | Kudoh et al. |
| 5,950,193 A | 9/1999 | Kulkarni |
| 5,951,643 A | 9/1999 | Shelton et al. |
| 5,951,652 A | 9/1999 | Ingrassia et al. |
| 5,954,798 A | 9/1999 | Shelton et al. |
| 5,960,173 A | 9/1999 | Tang et al. |
| 5,978,673 A | 11/1999 | Alperovich et al. |
| 5,987,113 A | 11/1999 | James |
| 5,995,023 A | 11/1999 | Kreft |
| 5,999,932 A | 12/1999 | Paul |
| 6,002,402 A | 12/1999 | Schacher |
| 6,009,413 A | 12/1999 | Webber et al. |
| 6,012,051 A | 1/2000 | Sammon et al. |
| 6,014,135 A | 1/2000 | Fernandes |
| 6,014,638 A | 1/2000 | Burge et al. |
| 6,026,403 A | 2/2000 | Siefert |
| 6,026,429 A | 2/2000 | Jones et al. |
| 6,038,451 A | 3/2000 | Syed et al. |
| 6,049,533 A | 4/2000 | Norman et al. |
| 6,065,047 A | 5/2000 | Carpenter et al. |
| 6,073,138 A | 6/2000 | de l'Etraz et al. |
| 6,081,830 A | 6/2000 | Schindler |
| 6,085,223 A | 7/2000 | Carino et al. |
| 6,088,435 A | 7/2000 | Barber et al. |
| 6,091,948 A | 7/2000 | Carr et al. |
| 6,134,432 A | 10/2000 | Holmes et al. |
| 6,141,545 A | 10/2000 | Begeja et al. |
| 6,151,584 A | 11/2000 | Papierniak et al. |
| 6,161,130 A | 12/2000 | Horvitz et al. |
| 6,166,730 A | 12/2000 | Goode et al. |
| 6,167,256 A | 12/2000 | Yla-Outinen et al. |
| 6,175,831 B1 | 1/2001 | Weinreich et al. |
| 6,189,026 B1 | 2/2001 | Birrell et al. |
| 6,199,099 B1 | 3/2001 | Gershman et al. |
| 6,199,103 B1 | 3/2001 | Sakaguchi et al. |
| 6,212,550 B1 | 4/2001 | Segur |
| 6,247,043 B1 | 6/2001 | Bates et al. |
| 6,249,740 B1 | 6/2001 | Ito et al. |
| 6,249,743 B1 | 6/2001 | Ohshimo |
| 6,260,148 B1 | 7/2001 | Aggarwal et al. |
| 6,269,369 B1 | 7/2001 | Robertson |
| 6,301,609 B1 | 10/2001 | Aravamudan et al. |
| 6,311,211 B1 | 10/2001 | Shaw et al. |
| 6,324,541 B1 | 11/2001 | de l'Etraz et al. |
| 6,330,590 B1 | 12/2001 | Cotton |
| 6,347,332 B1 | 2/2002 | Malet et al. |
| 6,349,299 B1 | 2/2002 | Spencer et al. |
| 6,351,698 B1 | 2/2002 | Kubota et al. |
| 6,360,251 B1 | 3/2002 | Fujita et al. |
| 6,363,248 B1 | 3/2002 | Silverman |
| 6,363,392 B1 | 3/2002 | Halstead et al. |
| 6,374,246 B1 | 4/2002 | Matsuo |
| 6,374,290 B1 | 4/2002 | Scharber et al. |
| 6,389,127 B1 | 5/2002 | Vardi et al. |
| 6,389,372 B1 | 5/2002 | Glance et al. |
| 6,392,669 B1 | 5/2002 | Matoba et al. |
| 6,400,381 B1 | 6/2002 | Barrett et al. |
| 6,415,318 B1 | 7/2002 | Aggarwal et al. |
| 6,421,439 B1 | 7/2002 | Liffick |
| 6,421,675 B1 | 7/2002 | Ryan et al. |
| 6,421,709 B1 | 7/2002 | McCormick et al. |
| 6,425,012 B1 | 7/2002 | Trovato et al. |
| 6,430,604 B1 * | 8/2002 | Ogle et al. ............... 709/207 |
| 6,446,112 B1 | 9/2002 | Bunney et al. |
| 6,449,344 B1 | 9/2002 | Goldfinger et al. |
| 6,449,634 B1 | 9/2002 | Capiel |
| 6,457,044 B1 | 9/2002 | IwaZaki |
| 6,463,471 B1 | 10/2002 | Dreke et al. |
| 6,480,885 B1 | 11/2002 | Olivier |
| 6,484,196 B1 | 11/2002 | Maurille |
| 6,501,834 B1 | 12/2002 | Milewski et al. |
| 6,505,167 B1 | 1/2003 | Horvitz et al. |
| 6,507,866 B1 | 1/2003 | Barchi |
| 6,525,747 B1 | 2/2003 | Bezos |
| 6,535,586 B1 | 3/2003 | Cloutier et al. |
| 6,539,421 B1 | 3/2003 | Appelman et al. |
| 6,542,750 B2 | 4/2003 | Hendrey et al. |
| 6,549,933 B1 | 4/2003 | Barrett et al. |
| 6,549,937 B1 | 4/2003 | Auerbach et al. |
| 6,557,027 B1 | 4/2003 | Cragan |
| 6,559,863 B1 | 5/2003 | Megiddo |
| 6,564,261 B1 | 5/2003 | Gudjonsson et al. |
| 6,564,264 B1 | 5/2003 | Creswell et al. |
| 6,567,796 B1 | 5/2003 | Yost et al. |
| 6,571,234 B1 | 5/2003 | Knight et al. |
| 6,580,790 B1 | 6/2003 | Henry et al. |
| 6,604,133 B2 | 8/2003 | Aggarwal et al. |
| 6,606,647 B2 | 8/2003 | Shah et al. |
| 6,608,637 B1 | 8/2003 | Beaton et al. |
| 6,615,241 B1 | 9/2003 | Miller et al. |
| 6,625,423 B1 | 9/2003 | Wang |
| 6,636,733 B1 | 10/2003 | Helferich |
| 6,640,218 B1 | 10/2003 | Golding et al. |
| 6,640,230 B1 | 10/2003 | Alexander et al. |
| 6,643,669 B1 | 11/2003 | Novak et al. |
| 6,647,259 B1 | 11/2003 | Boyle et al. |
| 6,647,383 B1 | 11/2003 | August et al. |
| 6,654,683 B2 | 11/2003 | Jin et al. |
| 6,657,234 B1 | 12/2003 | Tanizawa |
| 6,658,095 B1 | 12/2003 | Yoakum et al. |
| 6,677,968 B1 | 1/2004 | Appelman |
| 6,678,719 B1 | 1/2004 | Stimmel |
| 6,687,362 B1 | 2/2004 | Lindquist et al. |
| 6,691,162 B1 | 2/2004 | Wick |
| 6,694,353 B2 | 2/2004 | Sommerer |
| 6,697,807 B2 | 2/2004 | McGeachie |
| 6,701,348 B2 | 3/2004 | Sommerer |
| 6,714,791 B2 | 3/2004 | Friedman |
| 6,714,793 B1 | 3/2004 | Carey et al. |
| 6,728,357 B2 | 4/2004 | O'Neal et al. |
| 6,731,308 B1 | 5/2004 | Tang et al. |
| 6,732,155 B2 | 5/2004 | Meek |
| 6,750,881 B1 | 6/2004 | Appelman |
| 6,760,580 B2 | 7/2004 | Robinson et al. |
| 6,772,188 B1 | 8/2004 | Cloutier |
| 6,781,608 B1 | 8/2004 | Crawford |
| 6,785,554 B1 | 8/2004 | Amerga |
| 6,785,681 B2 | 8/2004 | Keskar et al. |
| 6,785,781 B2 | 8/2004 | Leenstra et al. |
| 6,788,769 B1 | 9/2004 | Waites |
| 6,799,039 B2 | 9/2004 | Wu et al. |
| 6,800,031 B2 | 10/2004 | Di Cesare |
| 6,832,245 B1 | 12/2004 | Isaacs et al. |
| 6,839,737 B1 | 1/2005 | Friskel |
| 6,901,559 B1 | 5/2005 | Blum et al. |
| 6,904,026 B1 | 6/2005 | Tarnanen et al. |
| 6,907,243 B1 | 6/2005 | Patel |
| 6,912,563 B1 | 6/2005 | Parker et al. |
| 6,912,564 B1 | 6/2005 | Appelman et al. |

(56) References Cited

U.S. PATENT DOCUMENTS

| | | | |
|---|---|---|---|
| 6,917,965 B2 | 7/2005 | Gupta et al. | |
| 6,920,478 B2 | 7/2005 | Mendiola et al. | |
| 6,941,345 B1 | 9/2005 | Kapil et al. | |
| 6,957,077 B2 | 10/2005 | Dehlin | |
| 6,968,179 B1 | 11/2005 | De Vries | |
| 6,993,564 B2 | 1/2006 | Whitten | |
| 7,035,865 B2 | 4/2006 | Doss et al. | |
| 7,039,639 B2 | 5/2006 | Brezin et al. | |
| 7,058,036 B1 | 6/2006 | Yu et al. | |
| 7,058,690 B2 | 6/2006 | Maehiro | |
| 7,082,047 B2 | 7/2006 | Chow | |
| 7,117,254 B2 | 10/2006 | Lunt et al. | |
| 7,120,455 B1 | 10/2006 | Chen et al. | |
| 7,124,123 B1 | 10/2006 | Roskind et al. | |
| 7,127,232 B2 | 10/2006 | O'Neil et al. | |
| 7,177,880 B2 | 2/2007 | Ruvolo et al. | |
| 7,181,498 B2 | 2/2007 | Zhu et al. | |
| 7,185,059 B2 | 2/2007 | Daniell et al. | |
| 7,188,153 B2 | 3/2007 | Lunt et al. | |
| 7,190,956 B2 | 3/2007 | Dorenbosch et al. | |
| 7,200,634 B2 | 4/2007 | Mendiola et al. | |
| 7,202,814 B2 | 4/2007 | Caspi et al. | |
| 7,222,156 B2 | 5/2007 | Gupta et al. | |
| 7,269,590 B2 | 9/2007 | Hull et al. | |
| 7,269,629 B2 * | 9/2007 | Zmudzinski et al. | 709/207 |
| 7,275,215 B2 | 9/2007 | Werndorfer et al. | |
| 7,287,097 B1 * | 10/2007 | Friend et al. | 709/248 |
| 7,308,082 B2 | 12/2007 | Davis et al. | |
| 7,313,760 B2 | 12/2007 | Grossman et al. | |
| 7,319,882 B2 | 1/2008 | Mendiola et al. | |
| 7,321,920 B2 * | 1/2008 | Washburn | 709/206 |
| 7,321,921 B2 * | 1/2008 | Malik | 709/206 |
| 7,330,713 B2 * | 2/2008 | Zhu | 455/412.1 |
| 7,353,015 B1 * | 4/2008 | Tenhunen | 455/412.2 |
| 7,370,278 B2 | 5/2008 | Malik et al. | |
| 7,373,383 B2 | 5/2008 | Boss et al. | |
| 7,403,970 B1 * | 7/2008 | Kamble et al. | 709/206 |
| 7,403,972 B1 * | 7/2008 | Lau et al. | 709/206 |
| 7,409,428 B1 * | 8/2008 | Brabec et al. | 709/206 |
| 7,412,231 B1 * | 8/2008 | Kelleher | 455/412.1 |
| 7,412,232 B2 | 8/2008 | Wilson et al. | |
| 7,428,580 B2 * | 9/2008 | Hullfish et al. | 709/207 |
| 7,428,590 B2 | 9/2008 | Miller et al. | |
| 7,436,780 B2 | 10/2008 | Stephens et al. | |
| 7,512,407 B2 | 3/2009 | Wu et al. | |
| 7,519,675 B2 * | 4/2009 | Di Giorgio et al. | 709/206 |
| 7,555,520 B2 * | 6/2009 | Watanabe et al. | 709/206 |
| 7,564,958 B1 * | 7/2009 | Contractor | 379/93.15 |
| 7,590,696 B1 | 9/2009 | Odell et al. | |
| 7,603,421 B1 * | 10/2009 | Roche et al. | 709/206 |
| 7,606,864 B2 * | 10/2009 | Koch | 709/206 |
| 7,640,293 B2 * | 12/2009 | Wilson et al. | 709/203 |
| 7,653,389 B2 * | 1/2010 | Eales et al. | 455/433 |
| 7,657,253 B2 * | 2/2010 | Lewis | 455/412.2 |
| 7,660,856 B2 * | 2/2010 | O'Brien et al. | 709/206 |
| 7,660,864 B2 * | 2/2010 | Markki et al. | 709/207 |
| 7,668,535 B2 * | 2/2010 | Conneely et al. | 455/412.2 |
| 7,668,917 B2 * | 2/2010 | Netsch et al. | 709/206 |
| 7,680,887 B1 * | 3/2010 | Kiss et al. | 709/206 |
| 7,765,262 B2 * | 7/2010 | Gross et al. | 709/206 |
| 7,765,263 B1 | 7/2010 | Alfke | |
| 7,792,906 B2 * | 9/2010 | Garcia-Martin et al. | 709/206 |
| 7,848,744 B2 * | 12/2010 | Eason et al. | 455/423 |
| 7,853,652 B2 * | 12/2010 | McCarty | 709/206 |
| 7,890,586 B1 * | 2/2011 | McNamara et al. | 709/206 |
| 7,895,263 B1 * | 2/2011 | Kirchmeier et al. | 709/203 |
| 7,895,273 B1 * | 2/2011 | Haldar | 709/206 |
| 7,895,314 B1 * | 2/2011 | Russell | 709/224 |
| 7,912,899 B2 * | 3/2011 | Beauchamp et al. | 709/204 |
| 7,912,903 B2 * | 3/2011 | Shah | 709/206 |
| 7,924,811 B2 * | 4/2011 | Asokan | 370/352 |
| 7,945,623 B2 * | 5/2011 | Simpson | 709/205 |
| 7,961,663 B2 * | 6/2011 | Lin | 370/313 |
| 7,975,009 B2 * | 7/2011 | Wilensky | 709/206 |
| 8,005,461 B2 * | 8/2011 | Vander Veen et al. | 455/412.2 |
| 8,046,008 B2 * | 10/2011 | Park et al. | 455/466 |
| 8,103,722 B2 * | 1/2012 | Lee | 709/206 |
| 8,122,084 B2 * | 2/2012 | Beringer | 709/204 |
| RE43,284 E * | 3/2012 | Degraeve | 709/206 |
| 8,131,803 B2 * | 3/2012 | Hardy et al. | 709/206 |
| 8,150,925 B2 * | 4/2012 | Zimmers et al. | 709/206 |
| 8,161,116 B2 * | 4/2012 | Chaddha et al. | 709/206 |
| 8,243,893 B2 * | 8/2012 | Hayes et al. | 379/88.23 |
| 8,370,756 B2 * | 2/2013 | Malik et al. | 715/752 |
| 8,443,049 B1 * | 5/2013 | Geddes | 709/207 |
| 8,483,729 B2 * | 7/2013 | Knotts | 455/466 |
| 8,516,055 B2 * | 8/2013 | Hind et al. | 709/206 |
| 2001/0002469 A1 | 5/2001 | Bates et al. | |
| 2001/0003202 A1 | 6/2001 | Mache et al. | |
| 2001/0003203 A1 | 6/2001 | Mache | |
| 2001/0005861 A1 | 6/2001 | Mousseau et al. | |
| 2001/0013050 A1 | 8/2001 | Shah | |
| 2002/0015061 A1 | 2/2002 | Maguire | |
| 2002/0021307 A1 | 2/2002 | Glenn et al. | |
| 2002/0023132 A1 | 2/2002 | Tornabene et al. | |
| 2002/0023134 A1 | 2/2002 | Roskowski et al. | |
| 2002/0042816 A1 | 4/2002 | Bae | |
| 2002/0049610 A1 | 4/2002 | Gropper | |
| 2002/0049751 A1 | 4/2002 | Chen et al. | |
| 2002/0052921 A1 | 5/2002 | Morkel | |
| 2002/0059201 A1 | 5/2002 | Work | |
| 2002/0065828 A1 | 5/2002 | Goodspeed | |
| 2002/0065856 A1 | 5/2002 | Kisiel | |
| 2002/0065894 A1 | 5/2002 | Dalal et al. | |
| 2002/0077080 A1 | 6/2002 | Greene | |
| 2002/0083127 A1 | 6/2002 | Agrawal | |
| 2002/0083136 A1 | 6/2002 | Whitten, II | |
| 2002/0087634 A1 | 7/2002 | Ogle et al. | |
| 2002/0087704 A1 | 7/2002 | Chesnais et al. | |
| 2002/0091667 A1 | 7/2002 | Jaipuria et al. | |
| 2002/0097856 A1 | 7/2002 | Wullert, II | |
| 2002/0103801 A1 | 8/2002 | Lysons | |
| 2002/0112181 A1 | 8/2002 | Smith | |
| 2002/0116461 A1 | 8/2002 | Diacakis et al. | |
| 2002/0116463 A1 | 8/2002 | Hart | |
| 2002/0116641 A1 | 8/2002 | Mastrianni | |
| 2002/0117733 A1 | 8/2002 | Racanelli | |
| 2002/0120687 A1 | 8/2002 | Diacakis et al. | |
| 2002/0120697 A1 | 8/2002 | Generous et al. | |
| 2002/0133292 A1 | 9/2002 | Miyaki | |
| 2002/0133369 A1 | 9/2002 | Johnson | |
| 2002/0137530 A1 | 9/2002 | Karve | |
| 2002/0147777 A1 | 10/2002 | Hackbarth | |
| 2002/0169748 A1 | 11/2002 | Macholda | |
| 2002/0174010 A1 | 11/2002 | Rice | |
| 2002/0175953 A1 | 11/2002 | Lin | |
| 2002/0178161 A1 | 11/2002 | Brezin et al. | |
| 2002/0181703 A1 | 12/2002 | Logan et al. | |
| 2002/0184089 A1 | 12/2002 | Tsou et al. | |
| 2002/0193942 A1 | 12/2002 | Odakura et al. | |
| 2002/0199095 A1 | 12/2002 | Bandini et al. | |
| 2003/0004855 A1 | 1/2003 | Dutta et al. | |
| 2003/0004872 A1 | 1/2003 | Gardi et al. | |
| 2003/0009523 A1 | 1/2003 | Lindskog et al. | |
| 2003/0018726 A1 | 1/2003 | Low et al. | |
| 2003/0023691 A1 | 1/2003 | Knauerhase | |
| 2003/0023875 A1 | 1/2003 | Hursey et al. | |
| 2003/0025824 A1 | 2/2003 | Ishikawa | |
| 2003/0028524 A1 | 2/2003 | Keskar et al. | |
| 2003/0028542 A1 | 2/2003 | Muttik et al. | |
| 2003/0028595 A1 | 2/2003 | Vogt et al. | |
| 2003/0037012 A1 | 2/2003 | Fitzpatrick | |
| 2003/0043201 A1 | 3/2003 | Abdelhadi et al. | |
| 2003/0046198 A1 | 3/2003 | Knapp et al. | |
| 2003/0050916 A1 | 3/2003 | Ortega et al. | |
| 2003/0055831 A1 | 3/2003 | Ryan et al. | |
| 2003/0058478 A1 | 3/2003 | Aoki | |
| 2003/0065721 A1 | 4/2003 | Roskind | |
| 2003/0065724 A1 | 4/2003 | Clark | |
| 2003/0084103 A1 | 5/2003 | Weiner et al. | |
| 2003/0088554 A1 | 5/2003 | Ryan et al. | |
| 2003/0088633 A1 | 5/2003 | Chiu et al. | |
| 2003/0093580 A1 | 5/2003 | Thomas et al. | |
| 2003/0101226 A1 | 5/2003 | Quine | |

(56) References Cited

U.S. PATENT DOCUMENTS

| | | |
|---|---|---|
| 2003/0101343 A1 | 5/2003 | Eaton et al. |
| 2003/0105822 A1 | 6/2003 | Gusler et al. |
| 2003/0112225 A1 | 6/2003 | Granberg |
| 2003/0131061 A1 | 7/2003 | Newton et al. |
| 2003/0135569 A1 | 7/2003 | Khakoo et al. |
| 2003/0154257 A1 | 8/2003 | Hantsch et al. |
| 2003/0158860 A1 | 8/2003 | Caughey |
| 2003/0158864 A1 | 8/2003 | Samn |
| 2003/0167324 A1 | 9/2003 | Farnham et al. |
| 2003/0172349 A1 | 9/2003 | Katayama et al. |
| 2003/0182394 A1 | 9/2003 | Ryngler et al. |
| 2003/0187813 A1 | 10/2003 | Goldman et al. |
| 2003/0208545 A1 | 11/2003 | Eaton et al. |
| 2003/0217109 A1 | 11/2003 | Ordille et al. |
| 2003/0219104 A1 | 11/2003 | Malik |
| 2003/0219109 A1 | 11/2003 | Malik |
| 2003/0220946 A1 | 11/2003 | Malik |
| 2003/0220976 A1 | 11/2003 | Malik |
| 2003/0229722 A1 | 12/2003 | Beyda |
| 2004/0015548 A1 | 1/2004 | Lee |
| 2004/0019695 A1 | 1/2004 | Fellenstein et al. |
| 2004/0029572 A1 | 2/2004 | Nerot |
| 2004/0039630 A1 | 2/2004 | Begole et al. |
| 2004/0044536 A1 | 3/2004 | Fitzpatrick et al. |
| 2004/0054646 A1 | 3/2004 | Daniell et al. |
| 2004/0054736 A1 | 3/2004 | Daniell et al. |
| 2004/0056901 A1 | 3/2004 | March et al. |
| 2004/0059781 A1 | 3/2004 | Yoakum et al. |
| 2004/0073643 A1 | 4/2004 | Hayes et al. |
| 2004/0078445 A1 | 4/2004 | Malik |
| 2004/0117443 A1 | 6/2004 | Barsness |
| 2004/0122681 A1 | 6/2004 | Ruvolo et al. |
| 2004/0122810 A1 | 6/2004 | Mayer |
| 2004/0122855 A1 | 6/2004 | Ruvolo et al. |
| 2004/0128310 A1 | 7/2004 | Zmudzinski et al. |
| 2004/0128356 A1 | 7/2004 | Bernstein et al. |
| 2004/0136358 A1 | 7/2004 | Hind et al. |
| 2004/0154022 A1 | 8/2004 | Boss et al. |
| 2004/0158610 A1 | 8/2004 | Davis et al. |
| 2004/0165705 A1 | 8/2004 | Cragun |
| 2004/0179039 A1 | 9/2004 | Blattner et al. |
| 2004/0186738 A1 | 9/2004 | Reisman |
| 2004/0199649 A1 | 10/2004 | Tarnanen et al. |
| 2004/0201624 A1 | 10/2004 | Crawford |
| 2004/0210844 A1 | 10/2004 | Pettinati et al. |
| 2004/0215648 A1 | 10/2004 | Marshall et al. |
| 2004/0215721 A1 | 10/2004 | Szelo et al. |
| 2004/0215793 A1 | 10/2004 | Ryan et al. |
| 2004/0221309 A1 | 11/2004 | Zaner et al. |
| 2004/0254998 A1 | 12/2004 | Horvitz |
| 2004/0260762 A1 | 12/2004 | Fish |
| 2004/0267531 A1 | 12/2004 | Whynot et al. |
| 2005/0013426 A1 | 1/2005 | Ooki |
| 2005/0015432 A1 | 1/2005 | Cohen |
| 2005/0021750 A1 | 1/2005 | Abrams |
| 2005/0027382 A1 | 2/2005 | Kirmse et al. |
| 2005/0038688 A1 | 2/2005 | Collins et al. |
| 2005/0038856 A1 | 2/2005 | Krishnasamy et al. |
| 2005/0043989 A1 | 2/2005 | Shifrin |
| 2005/0044152 A1 | 2/2005 | Hardy et al. |
| 2005/0050143 A1 | 3/2005 | Guster et al. |
| 2005/0055416 A1 | 3/2005 | Heikes et al. |
| 2005/0060377 A1 | 3/2005 | Lo et al. |
| 2005/0076241 A1 | 4/2005 | Appelman |
| 2005/0080859 A1 | 4/2005 | Lake |
| 2005/0080863 A1 | 4/2005 | Daniell |
| 2005/0086211 A1 | 4/2005 | Mayer |
| 2005/0091311 A1 | 4/2005 | Lund et al. |
| 2005/0114229 A1 | 5/2005 | Ackley et al. |
| 2005/0114533 A1 | 5/2005 | Hullfish et al. |
| 2005/0153681 A1 | 7/2005 | Hanson |
| 2005/0171799 A1 | 8/2005 | Hull et al. |
| 2005/0177486 A1 | 8/2005 | Yeager |
| 2005/0187781 A1 | 8/2005 | Christensen |
| 2005/0197846 A1 | 9/2005 | Pezaris et al. |
| 2005/0198268 A1 | 9/2005 | Chandra |
| 2005/0198321 A1 | 9/2005 | Bolhm |
| 2005/0210148 A1 | 9/2005 | Kato et al. |
| 2005/0216300 A1 | 9/2005 | Appelman et al. |
| 2005/0220134 A1 | 10/2005 | Lin |
| 2005/0246420 A1 | 11/2005 | Little |
| 2006/0005133 A1 | 1/2006 | Lyle et al. |
| 2006/0025164 A1 | 2/2006 | Wang et al. |
| 2006/0041684 A1 | 2/2006 | Daniell et al. |
| 2006/0075044 A1 | 4/2006 | Fox et al. |
| 2006/0129643 A1 | 6/2006 | Nielson et al. |
| 2006/0129678 A1 | 6/2006 | Morita |
| 2006/0167991 A1 | 7/2006 | Heikes et al. |
| 2006/0168054 A1 | 7/2006 | Burkhart et al. |
| 2006/0173824 A1 | 8/2006 | Bensky et al. |
| 2006/0173963 A1 | 8/2006 | Roseway et al. |
| 2006/0182248 A1 | 8/2006 | Smith et al. |
| 2006/0190117 A1 | 8/2006 | Weczorek et al. |
| 2006/0190543 A1 | 8/2006 | Pulver et al. |
| 2006/0212561 A1 | 9/2006 | Feng |
| 2006/0248573 A1 | 11/2006 | Pannu et al. |
| 2006/0277187 A1 | 12/2006 | Roese et al. |
| 2007/0156664 A1 | 7/2007 | Norton et al. |
| 2007/0250566 A1 | 10/2007 | Appelman et al. |
| 2008/0089316 A1 | 4/2008 | Reams |
| 2008/0140827 A1 | 6/2008 | Ma |
| 2008/0228598 A1 | 9/2008 | Leff et al. |
| 2008/0255989 A1 | 10/2008 | Altberg et al. |
| 2008/0256257 A1 | 10/2008 | Miller et al. |
| 2009/0006555 A1* | 1/2009 | Curran et al. ................ 709/206 |
| 2009/0043844 A1 | 2/2009 | Zimmet et al. |
| 2009/0044252 A1 | 2/2009 | Kashima et al. |
| 2009/0070306 A1 | 3/2009 | Stroe et al. |
| 2009/0234922 A1 | 9/2009 | Appelman |
| 2010/0005523 A1 | 1/2010 | Hassan et al. |
| 2011/0289170 A1* | 11/2011 | Smith et al. ................. 709/206 |
| 2012/0083297 A1 | 3/2012 | Appelman |
| 2013/0073653 A1* | 3/2013 | Heikes et al. ............... 709/206 |
| 2013/0073657 A1* | 3/2013 | Hullfish et al. ............. 709/206 |
| 2013/0138752 A1* | 5/2013 | Guthrie et al. .............. 709/206 |
| 2013/0172026 A1* | 7/2013 | Odell et al. ................. 455/466 |

FOREIGN PATENT DOCUMENTS

| | | |
|---|---|---|
| GB | 2357932 | 7/2001 |
| GB | 2368747 | 5/2002 |
| JP | 2000259514 A | 8/2000 |
| JP | 2000284999 A | 10/2000 |
| JP | 2001084320 A | 3/2001 |
| WO | 97/10558 A2 | 8/1996 |
| WO | 97/46955 A1 | 12/1997 |
| WO | 98/16045 A1 | 4/1998 |
| WO | WO 98/47270 | 10/1998 |
| WO | 99/08434 A1 | 2/1999 |
| WO | WO 99/34628 | 7/1999 |
| WO | WO 00/79396 | 12/2000 |
| WO | WO 01/06748 | 1/2001 |
| WO | 01/22258 A2 | 3/2001 |
| WO | WO 01/67787 | 9/2001 |
| WO | WO 02/03216 | 1/2002 |
| WO | 02/073886 A1 | 9/2002 |

OTHER PUBLICATIONS

Cerulean Studios, "Trillian pro: No Boundaries," (Overview, New Features, Tech Specs, Corporate, Product Tour—16 total pages) (available at least as of Aug. 9, 2004).

Cerulean Studios, "Trilian: Your Freedom to Chat," (Overview, Features, Screenshots, Tech Specs—8 total pages) (available at least as of Aug. 9, 2004).

"A Countermeasure to Duplicate-detecting Anti-spam Techniques," Robert J. Hall, AT&T Labs Technical Report 99.9.1, 1999, Abst. and pp. 1-26.

"A Reputation System for Peer-to-Peer Networks,"Gupta et al., Jun. 1-3, 2003, NOSSDAV'03, Monterey, California, pp. 144-152.

"Announce: Implementation of E-mail Spam Proposal," Maurice L. Marvin, news.admin.net-abuse.misc, Aug. 3, 1996, 2 pages.

(56) References Cited

OTHER PUBLICATIONS

"BestCalls.com Announces the BestCalls Technology Index," Business Wire, Jun. 30, 1999, Business Wire, p. 1.
"Better Bayesian Filtering," Paul Graham, Jan. 2003, pp. 1-11, http://www.paulgraham.com/better.html.
"Business of Cyberspeed; Brainstorm Becomes Quick Internet Hit," Walker, Jan. 24, 1999, The Washington Post, p. A.01 (4 total pages).
"CrushParty.com Help," retrieved Jun. 12, 2002 from the World Wide Web: http://www.crushparty.com/help.jsp, 3 pages.
"Degrees of Separation Email Spam Protection," Halfbakery: Degrees of Separation Email Spam Protection, reprinted from http://halfbakery.com/idea/Degrees_20of_20Separation_20Email_20Spam_20Protection . . . printed on Mar. 1, 2004 (3 pages).
"Digital Artifacts for Remembering and Storytelling: Post History and Social Network Fragments," Vegas et al., retrieved from the World Wide Web: http://we.media.mit.edu/~fviegas/papers/posthistory_snf.pdf, 10 pages (2004).
Finding Others Online: Reputation Systems for Social Online Spaces, Jensen et al., Apr. 20-25, 2002, CHI, Minneapolis, Minnesota, vol. 4, Issue 1, pp. 447-454.
"Hottie or Nottie? Web Site Voters Let You Know Whether You Sizzle or Fizzle," Marino, Jul. 11, 2001, Florida Times Union, p. C.1. (2 total pages).
"Icq.anywhere, Email Features—Email Center—ICQ.com," retrieved Apr. 29, 2004 from the World Wide Web: http://www.icq.com/email/popular-feature.html, pp. 1-5.
"Idea for Online Networking Brings Two Entrepreneurs Together," Patents: Idea for Online Networking Brings Two Entrepreneurs Together, reprinted from http://www.nytimes.com/2003/12/01/technology/01patt.html?adxmix=107029 . . . printed on Nov. 5, 2004 (3 pages).
"Instant Messaging for Garners," PC Gamer, May 2004, vol. 11, No. 5, p. 28.
"Learning Spam: Simple Techniques for Freely-Available Software," Bart Massey et al., Computer Science Department. Portland, OR USA, 2003, pp. 1-14.
"Learning to Filer Spam E-Mail: A Comparison of a Naive Bayesian and a Memory-Based Approach," Ion Adroutsopoulous et al., University of Athens, Sep. 2000, pp. 1-12.
"Lotus Instant Messaging Everyplace FAQ," retrieved Apr. 29, 2004 from the World Wide Web: http://www.lotus.com/products/product4.nsf/wdocs/249c6f083166cd3e85256d7300714407, pp. 1-3.
"PieSpy—Inferring and Visualizing Social Network on IRC," PieSpy Social Network Bot, reprinted from http://lister.linux-rv.anlx.net/piespy printed on Mar. 11, 2004 (18 pages).
Plaxo, reprinted from http://web.archive.org/web/20041105072256/http://www.plaxo.com/printed on Nov. 5, 2004 (available on Feb. 14, 2004) (2 pages).
"Plaxo—Update Your Address Book," Plaxo Contact Networks, reprinted from http://web.archive.org/web/20030218233638/http://www.plaxo.com/printed on Nov. 5, 2004 (available on Feb. 18, 2003) (1 page).
"Reflections on Friendster, Trust and Intimacy," Danah Boyd. Ubicomp 2003, Workshop Application for the Intimate Ubiquitous Computing Workshop. Seattle, WA, Oct. 12-15, 2003.
"Reputation Systems," Resnick et al., Dec. 2000, Communications of the ACM, vol. 43, No. 12, pp. 45-48.
"RIM Road: Software: Internet & Network: Webmessenger RIM J2ME/Instant Messaging," retrieved Apr. 29, 2004 from the World Wide Web: http://www.rimrod.com/software/rim1/Webmessenger-RIM-J2ME-Instant-Messaging -20 . . . , pp. 1-4.
"Six Degrees—New Programs Help Companies 'Mine Workers' Relationships for Key Business Prospects," William M. Bulkeley et al., Marketplace, The Wall Street Journal, Aug. 4, 2003.
"Social Nets Find Friends in VCs," Joanna Glasner, http://www.wired.com/news, Nov. 17, 2003, pp. 1-3.
"Social Network Fragments: An Interactive Tool for Exploring Digital Social Connections." Danah Boyd, Jeff Potter, Sketch at SIGGRAPH 2003. San Diego, California: ACM, Jul. 27-31, 2003.
"Social Networking for Business: Release 0.5," Esther Dyson, Esther Dyson's Monthly Report, vol. 21, No. 10, Nov. 25, 2003, www.edventure.com.
"Social Sites Clicking With Investors," Washingtonpost.com: Social Sites Clicking With Investors, reprinted from http://www.washingtonpost.com/ac2/wp-dyn/A32066-2003Nov12?language-printer, printed on Nov. 5, 2004.
Socialware: Multiagent Systems for Supporting Network Communities, Hattori et al., Mar. 1999, Association for Computing Machinery, Communications of the ACM, vol. 42, Issue 3, pp. 55ff.
"Spoke Builds on Social Networking Patent Portfolio," Spoke Builds on Social Networking patent Portfolio, reprinted from http://www.internetnews.com/ent-news/print.php/3073621 printed on Nov. 5, 2004 (3 pages).
"Support Vector Machines for Spam Categorization," Harris Drucker et al., IEEE Transactions on Neural Networks, vol. 10, No. 5, Sep. 1999, pp. 1048-1054.
"Support Vector Machines," Marti Hearst , IEEE Intelligent System, Jul./Aug. 1998, pp. 18-28.
"SVM-based Filtering of E-mail Spam with Content-specific Misclassification Costs," Aleksander Kolez et al., TextDM'2001 (IEEE ICDM-2001 Workshop on Text Mining), San Jose, CA 2001, pp. 1-14.
"SWF Seeks Attractive Head Shot; To Stand Out, Online Daters Pay for Professional Photos; Cropping out the Ex-Wife," Leiber, Nov. 19, 2003, The Wall Street Journal, p. D.1.
"Technical Solutions for Controlling Spam," Shane Hird, Proceedings of AUUG2002, Melbourne, Sep. 4-6, 2002, 17 pages.
"Technology Journal—Are You Satisfied? EBay's Battle Against Fraud Rests Primarily on a Simple Concept: Customer Feedback," Wingfield, Sep. 23, 2002, Asian Wall Street Journal, p. T.8, (4 total pages).
"Technology Journal: Changing Chat—Instant Messaging is Taking Off, and for Some Users It's Nuzzling Out the Phone," Nick Wingfield, Asian WSJ, Sep. 2000.
"Telstra targets Net spammers," J. Dudley, news.com.au, Dec. 2, 2003, 2 pages.
"Text Categorization with Support Vector Machines: Learning with Many Relevant Features," Thorsten Joachims, University of Dortmund, Computer Science Dept., LS-8 Report 23, 1998, 18 pages.
"The first Social Software . . . a true Social Adventure," Huminity-Social Networking, Chat Software, Create Personal Free Blogs and My Group . . ., reprinted from http://www.huminity.com/printed on Nov. 5, 2004 (2 pages).
"Trillian Discussion Forums—HOWTO: Import ICQ 2003A Contact List," retrieved Apr. 29, 2004 from the World Wide Web: http://trillian.cc/forums/showthread.php?s+&threadid=36475, pp. 1-2.
"Welcome to Huminity World of Connections," Huminity-Home, reprinted form http://web.archive.org/web/20030228131435/www.huminity.com/default.php?international . . . printed on Nov. 5, 2004 (available on Feb. 2, 2003) (1 page).
"Will You Buy a Car From This Man?," Leander Kahney, Oct. 6, 2003, pp. 1-3.
America Online, Inc., "AOL Instant Messenger", Aug. 29, 2000, Internet: www.aol.com/aim/.
America Online Inc., New AIM 4.7, Sep. 27, 2001, Internet: http://aim.aol.com.
CNET Networks, Inc., "PopUp Killer," Sep. 13, 2001, Internet: download.cnet.com/downloads/0-10059-100-6932612.html.
Ed Bott and Ron Person, Using Windows 95 with Internet Explorer 4.0, Feb. 17, 1998, Que, Special Edition.
Home-tribe.net, http://washingtondc.tribe.net/message 24434d1b-817b-4580-aa42-3bffa15f26a?page=1 (4 total pages, reprinted on Dec. 13, 2004).
http://www.friendster.com (17 pages, reprinted on Dec. 13, 2004).
Mckendrick, Joseph; "Internet Call Centers: New Era in Customer Service"; Feb. 2002; V10, n2, pp. 22(4).
Nick Wingfield; Technology Journal: Changing Chat—Instant Messaging is Taking Off, and for Some Users It's Nuzzling Out the Phone; Asian WSJ; Sep. 2000.

(56) References Cited

OTHER PUBLICATIONS

Ryze home page, www.ryze.com, Dec. 21, 2003, available at http://web.archive.org/web/20031221010006/http://ryze.com, printed Mar. 16, 2005.
VisiblePath webpages, www.visiblepath.org, Dec. 3, 2003, available at http://web.archive.org/web/20031203132211/http://www.visiblepath.com, printed Mar. 16, 2005.
WebmasterWorldcom Inc., "HTML and Browsers", Mar. 5, 2001, Internet: www.webmaster.com/forum21/367.htm.
ZeroDegrees home page, www-zerodegrees.com, Jan. 24, 2004, available at http://web.archive.org/web/20040204153037/www.zerodegrees.com/home.htm, printed Mar. 16, 2005.
Tang, John C., et al., "ConNexus to Awarenex: Extending awareness to mobile users." Sun Microsystems Laboratories, SOGCHI '01, Mar. 31-Apr. 2001, Seattle, WA, USA. ACM 1-58113-327-08/01/003. pp. 221-228.
International Search Report, Application Serial No. PCT/US05/42992, dated Mar. 6, 2007, 14 pages.
"How to turn off IM forwarding for AIM Mobile", bigblueball.com, Mar. 12, 2010, Retrieved from http://www.bigblueball.com/forums/aim-support/15256-how-turn-off-im-forwarding-aim-mobile-3.html, 3 pages.
Office action for U.S. Appl. No. 13/274,076, mailed on Mar. 20, 2012, Barry Appelman, "Automatically Enabling the Forwarding of Instant Messages", 8 pages.
"Trillian Pro 2.0", Cerulean Studios, 1999, Retrieved from http://web.archive.org/web/20031118192623/www.ceruleanstudios.com/, retrieved on Aug. 9, 2004, 21 pages.
"Trillian Pro User Manual", Cerulean Studios, 1999, Retrieved from http://web.archive.org/web/20040409110818/www.ceruleanstudios.eom/support/manual.ph, retrieved on Aug. 9, 2004, 70 pages.
United States Office Action, U.S. Appl. No. 11/017,202, Aug. 21, 2013, 16 pages.
Non-Final Office Action dated Sep. 28, 2006 for related U.S. Appl. No. 11/017,202.
Final Office Action dated May 4, 2007 for related U.S. Appl. No. 11/017,202.
Non-Final Office Action dated Mar. 24, 2008 for related U.S. Appl. No. 11/017,202.
Final Office Action dated Dec. 1, 2008 for related U.S. Appl. No. 11/017,202.
Non-Final Office Action dated Sep. 30, 2009 for related U.S. Appl. No. 11/017,202.
Final Office Action dated Mar. 24, 2010 for related U.S. Appl. No. 11/017,202.
OA—Restriction Req—Feb. 12, 2013 for for related U.S. Appl. No. 11/017,202.
"Social Networking for Business: Release 0.5," Esther Dyson, Esther Dyson's Monthly Report, vol. 21, No. 10, Nov. 25, 2003, www.edventure.com, (36 pages).
Wagner "Spoke builds on social networking patent portfolio", www.InternetNews.com, Retreived on Jan. 16, 2013, Sep. 8, 2003, 3 pages.
Non-Final office Action dated Mar. 13, 2013 for related U.S. Appl. No. 11/017,202.
Non-Final Rejection dated Jan. 22, 2009 for related U.S. Appl. No. 11/321,074.
Restriction Requirement, dated May 15, 2009, for related U.S. Appl. No. 11/618,635.
Non-Final Rejection, dated Jul. 22, 2009, for related U.S. Appl. No. 11/618,635.
Office Action, dated Feb. 9, 2007, for related U.S. Appl. No. 09/893,693.
Office Action dated Feb. 5, 2014 for related U.S. Appl. No. 11/017,202.
Non-Final Rejection, dated Jun. 5, 2014, for related U.S. Appl. No. 13/770,864.
Dyson "Social Networks Deodorant for the Soul".
"About Internet directory services," Outlook 2000 Sr-1 (9.0.0. 4527) Help File, on or before Aug. 10, 2001, p. 1.
"Active Directory Features," [online], Jun. 15, 1999 [retrieved on May 13, 2003]. Retrieved from the Internet http://www.microsoft.comiwindows2000/serverievaluationifeaturesiadlistas—p, pp. 1-4.
"Active Directory Service Overview," [online], Nov. 30, 2001 [retrieved on May 13, 2003]. Retrieved from the Internet <http://wAtw.microsoft.comiwindows2000/serverievaluationibusinessiaddat asheetasp>, pp. 1-5.
"Benefits of Active Directory in a Windows 2000 Environment," [online], Sep. 20, 2001 [retrieved on May 13, 2003]. Retrieved from the Internet <http://wAtw.microsoft.comiwindows2000/serverievaluationibusinessiadwin—2k.asp>, pp. 1-9.
"Directory Integration Can Lower Total Cost of Ownership and Increase Application Functionality," [online], Jul. 27, 1998, [retrieved on May 13, 2003]. Retrieved from the Internet http://www.microsoft.comipresspasipress/1998/July98/ActivDPR.asp, pp. 1-4.
"Enterprise Identity Management with Windows 2000 and Active Directory," [online], 1999 [retrieved on May 13, 2003]. Retrieved from the Internet ims.asp?fra . . . , pp. 1-16.
"Integrating Applications with Windows 2000 and Active Directory," [online], Oct. 2000 [retrieved on May 8, 2003]. Retrieved from the Internet <http:/www.microsoft.comitechnetiprodtechnoliadiwindows2000/e-valuateiadappstrasp?fra . . . >, pp. 1-12.
"Integrating Microsoft Metadirectory Services and Active Directory," [online], Aug. 31, 2000 [retrieved on May 13, 2003]. Retrieved from the Internet bulletinsimmsma.asp>, p. 1.
"The Gordano Messaging Server," http://www.gordano.com.
"Look up contact information from an item," Outlook 2000 SR-1 Help File, on or before Aug. 10, 2001.
"Part II: Tasks and Procedures," Active Directory Operations Guide, Microsoft Corporation, Microsoft Windows 2000, Version 1.5, Published Dec. 5, 2002, pp. 1-131.
AOL Instant Messenger All New Version 2.0.
"Set up LDAP directory services," Outlook 2000 SR-1 (9.0.0 4527) Help File, on or before Aug. 10, 2001, p. 1.
"The LP Wireless Messenger," Messenger Documentation, [online]. LP Wireless, Inc., 2002, retrieved on Nov. 2, 2002 from http://www.lowireless.comimessengerhelp.htm, pp. 1-7.
"Using Active Directory Service," from Chapter 5, Microsoft Windows 2000 Administrators Pocket Consultant, by William R. Stank (1999). pp. 1-6.
"What is AOL Instant Messenger," 2 pages, http://web.archive.org/web/20000621145945/www.aol.co.uk/aim/whatis.html.
"What's new about exchanging information over the Internet," Outlook 2000 SR-1 (9.0.0.4527), 1 page.
"Windows 2000 Directory Services," [online] http://www.microsoft.comiwindows2000/technologiesidirectoryidefaultasp, Nov. 25, 2001, 1 page.
"YAHOO! Messenger Makes the World a Little Smaller, More Informed," Jun. 21,1999, pp. 1-2.
Alan Cohen, "Instant Messaging," PC Magazine, PC Labs, Apr. 13, 1999, 2 pages.
J.C. Cannon, "Design Guide for Directory-Enabled Applications," [online], Apr. 2001 [retrieved on May 13, 2003]. Retrieved from the Internet <http://msdn.microsoft.comilibraryien-usidnactdirihtmlideal.asp?frame=—true>, pp. 1 18.
Kohda et al., "IMPP: A New Instant Messaging Standard and Its Impact on Internet Business," Dec. 2000, Fujitsu Sci. Tech. J., 36, 2, pp. 147-153.
Microsoft Corporation, "Active Directory Services Interface in the Microsoft Exchange 5.5 Environment," [online], Nov. 1997 [retrieved on May 13, 2003]. Retrieved from the Internet <http://msdn.microsoft.comilibraryien-usidnactdirihtmlimsdn.sub.—adsiexch.asp?frame=true>, pp. 1-12.
Microsoft Corporation, "Comparing Microsoft Active Directory to Novell's NDS," [online], Sep. 1998 [retrieved on May 13, 2003]. Retrieved from the Internet <http://msdn.microsoft.comilibraryien-usidnactdirihtmlimsdn.s—ub.—activedirvsnds.asp?frarne=true>, pp. 1-17.

(56) References Cited

OTHER PUBLICATIONS

Microsoft Corporation, "Introduction to Active Directory Application Mode," Microsoft Server 2003, Aug. 2002, pp. 1-13.

Microsoft Corporation, "Using ADSI, LDAP, and Network Management Functions With Active Directory," [online], Feb. 2002 [retrieved on May 13, 2003]. Retrieved from the <http://msdn.microsoft.comilibraryien-usidnactdirihtml/BuildingADApps.asp?frame=true>, pp. 1-9.

Part I: Active Directory Operations, Active Directory Operations Guide, Microsoft Microsoft Windows 2000, Version 1.5, Published Dec. 5, 2002, pp. 1-187.

Stanek, William R., "Working with Active Directory Domains," from Chapter 5, Microsoft 2000 Administrators Pocket Consultant, (1999). pp. 1-10.

International Search Report for International Application No. PCT/U503/15715, mailed Aug. 14, 2003, 6 pages.

Notice of Allowance, dated Jun. 28, 2011, for related U.S. Appl. No. 11/720,726.

Non-Final Rejection, dated Oct. 7, 2010, for related U.S. Appl. No. 11/720,726.

Final Rejection, dated Aug. 13, 2009, for related U.S Appl. No. 11/321,074.

* cited by examiner

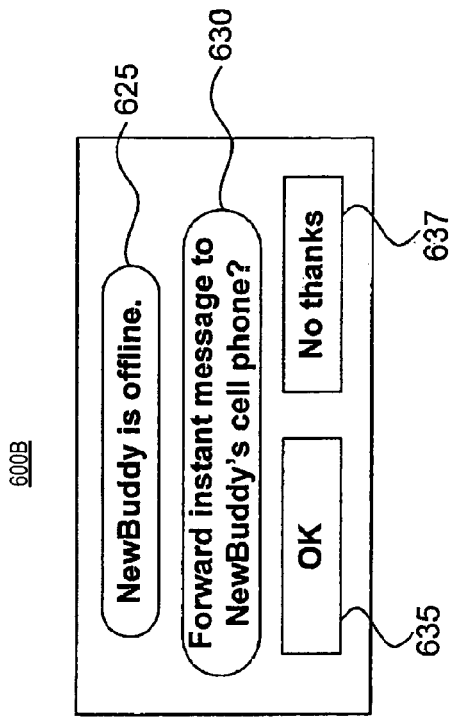
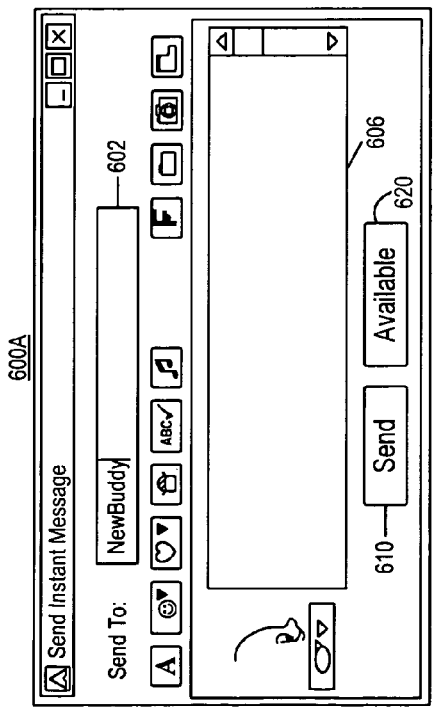
FIG. 6B
FIG. 6A

PROHIBITING MOBILE FORWARDING

CROSS REFERENCE TO RELATED APPLICATIONS

This application is a continuation of U.S. application Ser. No. 11/618,635, filed Dec. 29, 2006 (now allowed). U.S. application Ser. No. 11/618,635 claims the benefit of U.S. Provisional Application No. 60/806,329 filed Jun. 30, 2006, and titled CONDITIONAL FORWARDING, and U.S. Provisional Application No. 60/806,322, filed Jun. 30, 2006, and titled PROHIBITING MOBILE FORWARDING, and is a continuation-in-part of U.S. application Ser. No. 11/321,074, filed Dec. 30, 2005 (now abandoned). U.S. application Ser. No. 11/321,074 claims the benefit of U.S. Provisional Application No. 60/724,883, filed Oct. 11, 2005, and titled MOBILE BLOCKING INDICATORS ON A BUDDY LIST and is a continuation-in-part of U.S. application Ser. No. 11/017,202, filed Dec. 21, 2004. U.S. application Ser. No. 11/017,202 claims the benefit of U.S. Provisional Application No. 60/631,876 filed Dec. 1, 2004, and titled AUTOMATICALLY ENABLING THE FORWARDING OF INSTANT MESSAGES. All of the above applications are incorporated herein by reference to their entireties.

TECHNICAL FIELD

This description relates to communicating using an instant messaging system.

BACKGROUND

Users of an instant messaging service can communicate in virtually real time with other instant messaging users. Users may manually create a buddy list of user names of other users of the instant messaging service, and may establish instant messaging sessions with those other members using the buddy list.

SUMMARY

In one aspect, an incoming message and an indication of a sender-specified destination for the incoming message are received. In addition, a determination is made as to whether a mobile telephone number is known by the sender to be associated with the sender-specified destination. If a mobile telephone number is known by the sender to be associated with the sender-specified destination, a first message that is based on the incoming message is sent to the mobile telephone number. Furthermore, a second message is sent to the mobile telephone number that indicates that the first message was sent to the mobile telephone number based on a determination that the mobile telephone number is known by the sender to be associated with the sender-specified destination.

Implementations may include one or more of the following features. For example, the incoming message may be an instant message, the sender-specified destination may be an instant message identity, and the first message may be a text message based on the instant message. Additionally or alternatively, the second message may be a text message that accompanies the first message, or the first message and the second message may form a single communication.

In some implementations, a determination may be made as to whether the sender-specified destination is available to receive an electronic message using a first mode of communication and sending the first message to the mobile telephone number may be based on a determination that the sender-specified destination is not available to receive an electronic message using the first mode of communication. For example, if the instant message identity is not signed on to an instant message service when the incoming message is received, a determination may be made that the sender-specified destination is not available to receive an electronic message using a first mode of communication. Alternatively, if the instant message identity is signed on to an instant message service but is associated with an idle state when the incoming message is received, a determination may be made that the sender-specified destination is not available to receive an electronic message using a first mode of communication.

In some implementations, a determination whether the mobile telephone number is known by the sender to be associated with the sender-specified destination may be based on identifying, in an electronic collection of contact information associated with the sender, a stored association of the mobile telephone number with the sender-specified destination.

In some implementations, a recipient associated with the mobile telephone number may be able to prohibit sending future messages based on incoming messages to the mobile telephone number. For example, the recipient may be able to prohibit sending future messages based on incoming messages to the mobile telephone number by sending an instruction to prohibit sending messages based on incoming messages to the mobile telephone number. Additionally or alternatively, the second message may enable the recipient to send instructions to prohibit sending future messages based on incoming messages to the mobile telephone number.

An instruction to prohibit sending future messages based on incoming messages to the mobile telephone number may be an instruction to prohibit sending future messages based on incoming messages received from a particular individual, for example, the sender, or an instruction to prohibit sending future messages based on incoming messages to the mobile telephone number may be an instruction to prohibit sending all future communications based on incoming messages to the mobile telephone number. The recipient may be able to send the instruction from a mobile telephone associated with the mobile telephone number and/or the recipient may be able to send the instruction through an instant message service.

An instruction to prohibit sending future messages based on incoming messages to the mobile telephone number may be received and future messages based on incoming messages may be prohibited from being sent to the mobile telephone number in response.

In some implementations, a determination may be made as to whether previous messages based on incoming messages received from the sender have been sent to the mobile telephone number and the second message may be sent to the mobile telephone based on a determination that no previous messages based on incoming messages received from the sender have been sent to the mobile telephone number. Additionally or alternatively, a determination may be made as to whether previous messages based on incoming messages have been sent to the mobile telephone number, and the second message may be sent to the mobile telephone based on a determination that no previous messages based on incoming messages have been sent to the mobile telephone number.

In another aspect, an incoming message and an indication of a sender-specified first destination for the incoming message may be received. In addition, a determination is made as to whether a second destination is associated with the sender-specified first destination and a determination is made as to whether the second destination is available to receive an electronic message. If it is determined that the second destination is associated with the sender-specified first destination and it is determined that the second destination is available to receive an electronic message, a first message that is based on the incoming message is sent to the second destination. In addition, a second message is sent to the second destination that indicates that the first message was sent to the second destination based on the determination that the second destination is associated with the sender-specified first destination and the determination that the second destination is available to receive an electronic message.

Implementations may include one or more of the following features. For example, the electronic message may be an instant message, and the sender-specified destination may be an instant message identity. In some implementations, the second destination may be a mobile telephone number, and the first message may be a text message based on the instant message. In other implementations, the second destination may be an electronic mail address, and the second message may be an electronic mail message. Alternatively, in implementations where the sender-specified destination is an instant message identity, the second destination may be a different instant message identity available through a different instant messaging service than the instant messaging service that is associated with the sender-specified first destination.

In some implementations, a determination that the second destination is available to receive an electronic message may be based on a determination that a recipient associated with the mobile telephone number has enabled text messages based on instant messages to be sent to the mobile telephone number.

Implementations of any of the techniques described may include a method or process, an apparatus or system, or computer software on a computer-accessible medium.

DESCRIPTION OF DRAWINGS

FIGS. 6A, 6B, 6C and 6D are illustrations of an exemplary interface for sending communications to a potential instant message recipient for whom a mobile telephone number is known to the instant messaging sender.

Like reference symbols in the various drawings may indicate like elements.

DETAILED DESCRIPTION

Figure 1:
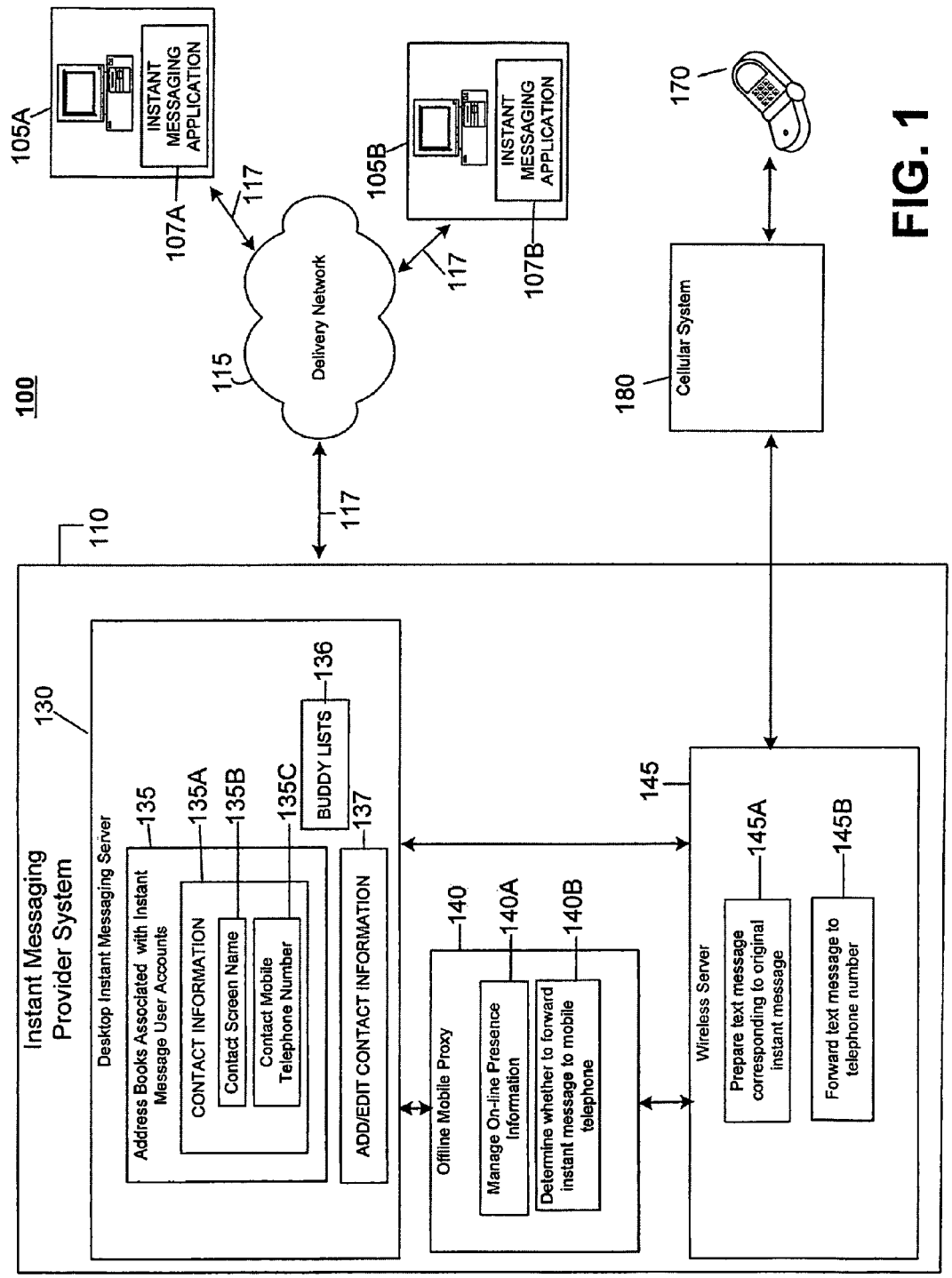
FIG. 1 is a block diagram of a communications system capable of forwarding instant messages based on contact information.

Techniques are described for forwarding an instant message addressed to an intended instant messaging recipient to the recipient's mobile telephone when the recipient's mobile telephone number is known to the instant message sender. In one example, an instant message is forwarded to the intended recipient's mobile telephone number when the instant message sender's contact information for the intended recipient includes an instant message address (e.g., a screen name or other type of instant message identifier) and a mobile telephone number, without dependence upon the intended recipient's presence on the instant message (IM) system or through actual login or registration with an IM forwarding service. In a more particular example, an address book of the instant message sender includes an entry for the intended recipient where the entry includes an instant message address and a mobile telephone number of the intended recipient.

More generally, an instant messaging user may maintain a list (a "buddy list") of user-selected potential instant messaging recipients ("buddies") to identify another instant messaging user with whom instant messages are to be exchanged. More specifically, with reference to one exemplary implementation, a buddy list is a user-definable list of other co-users (i.e., buddies) of an online or network communications systems that enables the user to perceive presence information and changes for the co-users in a unique graphical user interface (GUI) and to track changes to presence status for the co-users in substantially real-time automatically, where presence indicates the status of the co-user with respect to the online or network communications system.

The buddy list also provides the user with a mechanism to initiate communications (e.g., instant messages electronic mail (e-mail), chat, and other communications) with the co-users. When a user is signed on to a system, the set of buddies included in the user's buddy list is presented to the communications system. The communications system attempts to match co-users currently signed on to the system with the entries on the user's buddy list. Any matches are displayed to the user. As co-users sign on or sign off, a user's buddy list is updated to reflect these changes. An indication also may be added to show that a co-user has recently or is currently in the process of signing on or signing off the system. In some implementations, a user identity (e.g., a user account) may have one or more buddy lists of co-users, either with intersecting or disjoint lists of users, and the user may label these buddy lists according to the user's preferences or otherwise. In some implementations, an instant messaging system may be able to forward communications based on instant messages to mobile telephone devices through a cellular system. In such implementations, a user's buddy list may include co-users that have mobile telephone devices and for whom it is possible to send communications based on instant messages to their mobile telephone devices.

The buddy list may also include indications that indicate that a message addressed to a co-user is not to be delivered to the co-user's mobile telephone device. The co-user may prohibit the forwarding of communications based on instant messages to his/her mobile telephone device or the co-user's mobile telephone device may be powered off, not within signal range, or otherwise unable to receive a communication.

In some implementations, a recipient that receives a forwarded instant message on his/her mobile telephone may be informed that the recipient received the forwarded instant message because the instant message sender knows the recipient's mobile telephone number and/or because the recipient's mobile telephone number is associated with the recipient's instant message identity and the recipient's mobile telephone is available to receive a communication. In addition, the recipient may be provided options for blocking the forwarding of instant messages to the recipient's mobile telephone.

For example, the first time an instant message from a particular instant message sender is forwarded as a text message to a recipient's mobile telephone, an accompanying text message may be sent to the recipient's mobile telephone. The accompanying message may indicate that the recipient has received the forwarded instant message as a text message because the instant message sender knows the recipient's mobile telephone number. In addition, the accompanying message may provide the recipient with options for blocking the forwarding of instant messages to the recipient's mobile telephone. The recipient may block the forwarding of all instant messages sent by the particular instant message sender. More generally, the recipient may block the forwarding of all instant messages. The recipient may be able to initiate blocking using the recipient's mobile, telephone or, alternatively, using the recipient's instant message account.

In some implementations, the forwarding of an instant message from a sender to a recipient for whom mobile forwarding is enabled may be conditioned upon one or more factors such as, for example, the geographic location of the recipient; the time of the message; and/or the strength of the relationship between the sender and the recipient. The strength of the relationship between the sender and the recipient may be gauged from the sender's perspective or from the recipient's perspective. In one example, the strength of the relationship between the sender and the recipient may be gauged based on the degree of separation (e.g., the number of links) between the sender and the recipient in a social network. When the strength of the relationship between the sender and the recipient is gauged based on the number of links between the sender and the recipient in a social network, the number of links between the sender and the recipient may be different depending on whether the strength of the relationship is gauged from the sender's perspective or from the recipient's perspective. For instance, if the sender has user A listed in the sender's address book, and user A has the recipient listed in user A's address book, and the strength of the relationship between the sender and the recipient is gauged from the sender's perspective, the sender may be considered to be separated from the recipient by two links (or one degree of separation). In contrast, if the recipient does not have either the sender or user A listed in the recipient's address book, but the recipient has user B listed in the recipient's address book, user B has user A listed in user B's address book, and user A has the sender listed in user A's address book, the recipient may be considered to be separated from the sender by three links (or two degrees of separation), if the strength of the relationship is gauged from the recipient's perspective.

Conditioning the forwarding of instant messages to a recipient's mobile telephone number on factors in addition to or in place of the sender's knowledge of the recipient's mobile telephone number may increase the probability that a forwarded message will be received by the intended recipient while simultaneously potentially decreasing the number of undesired text messages received by the recipient. For example, conditioning the forwarding of an instant message on the geographic location of the recipient may increase the likelihood that the recipient is somewhere where the recipient is likely to receive the forwarded message. Similarly, conditioning the forwarding of an instant message on the time of the message increases the likelihood that the recipient is available to receive the forwarded message (e.g., the recipient is awake). Conditioning the forwarding of an instant message on the strength of the relationship between the sender and the recipient increases the likelihood that the intended recipient desires to receive forwarded instant messages from the sender.

In one implementation, the instant message system may determine, based on the above-listed conditions, that instant messages should not be forwarded to the intended recipient's mobile telephone and, consequently, the sender may be prevented from forwarding instant messages to the intended recipient's mobile telephone. Alternatively, in another implementation, the instant message system may make an initial determination not to forward an instant message to the intended recipient's mobile telephone, but the sender may be provided the option to override the system's decision.

FIG. 1 shows a communications system 100 that is capable of delivering and exchanging messages between each of client systems 105A and 105B, and which includes an instant messaging provider system 110 and a network 115 used to facilitate exchange of such messages. The communications system 100 may be used to send and receive instant messages, and to forward a communication based on an instant message to a mobile telephone device 170 through a cellular system 180. Users of the communications system 100 are distributed geographically and communicate using client systems 105A and 105B. The client systems 105A and 105B are shown as including, respectively, instant message applications 107A and 107B. Network 115 interconnects the client systems 105A and 105B. The client systems 105A and 105B are connected to network 115 through various communication paths 117, such as a modem connected to a telephone line using, for example, serial line interne protocol (SLIP) or point-to-point protocol (PPP) or a direct network connection using, for example, transmission control protocol/internet protocol (TCP/IP). The instant messaging provider system 110 also is connected to the network 115 over communication pathway 117 and is used to facilitate some direct or indirect communications between the client systems 105A and 105B.

Each of the client systems 105A and 105B may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. The client systems 105A and 105B may receive instructions from, for example, a software application, a program, a piece of code, a device, a computer, a computer system, or a combination thereof, which independently or collectively direct operations, as described herein. These instructions may take the form of one or more communications programs that facilitate communications between the users of client systems 105A and 105B. For instance, such communications programs may include e-mail programs, instant message programs, file transfer protocol (FTP) programs, and voice over interne protocol (VoIP) programs. The instructions may be embodied permanently or temporarily in any type of machine, component, equipment, storage medium, or propagated signal that is capable of being delivered to the client systems 105A and 105B.

The client systems 105A and 105B include a communications interface (not shown) used by the communications programs to send communications through network 115. The communications may include e-mail, audio data, video data, general binary data, or text data (e.g., encoded in American Standard Code for Information Interchange (ASCII) format). Client systems also include one or more input devices, such as a keyboard, a mouse, a stylus, or a microphone, as well as one or more output devices, such as a monitor, a touch screen, speakers, or a printer.

The network 115 typically includes a series of portals interconnected through a coherent system. Examples of the network 1020 include the Internet, Wide Area Networks (WANs), Local Area Networks (LANs), analog or digital wired and wireless telephone networks (e.g., a Public Switched Telephone Network (PSTN), an Integrated Services Digital Network (ISDN), or a Digital Subscriber Line of various types (DSL)), or any other wired or wireless network. The network 115 may include multiple networks or subnetworks, each of which may include, for example, a wired or wireless data pathway.

As with the client systems 105A and 105B, the instant message provider system 110 may be implemented using, for example, a general-purpose computer capable of responding to and executing instructions in a defined manner, a special-purpose computer, a workstation, a server, a device, a component, or other equipment or some combination thereof capable of responding to and executing instructions. The instant message provider system 110 may receive instructions from, for example, a software application, a program, a piece of code, a device, a computer, a computer system, or a combination thereof, which independently or collectively direct operations, as described herein. These instructions may take the form of one or more communications programs. Such communications programs may include, for example, e-mail programs, instant message programs, FTP programs, and VoIP programs. The instructions may be embodied permanently or temporarily in any type of machine, component, equipment, storage medium, or propagated signal that is capable of being delivered to the instant message provider system 110.

Further, the instant message provider system 110 includes a communications interface (not shown) used by the communications programs to send communications through network 115. The communications may include e-mail, audio data, video data, general binary data, or text data (e.g., encoded in American Standard Code for Information Interchange (ASCII) format).

The instant message applications 107A and 107B include buddy lists that include communications identities ("buddies") with which instant messages are exchanged using the respective client systems 105A and 105B. More particularly, the instant message applications 107A and 107B include a buddy list for each user that uses the client systems 105A and 105B to send and receive instant messages. The instant message applications 107A and 107B enable the users to send and receive instant messages with the client systems 105A and 105B. Instant messages are sent between users of the client systems 105A and 105B through a desktop instant message server 130 on the instant message provider system 110.

The provider system 110 includes a desktop instant messaging server 130 that operates instant messaging server software configured to process communications sent from and received by users of an instant messaging service. In particular, the desktop instant messaging server 130 is configured to exchange instant messages and communications related to the instant message service between the client systems 105A and 105B and the provider system 110 over the network 115. The desktop instant message server 130 initiates a point-to-point recipient, and/or it may be sent to route instant messages sent with the instant message applications 107A and 107B.

The desktop instant messaging server 110 also includes address books 135 that are associated with instant messaging user accounts (e.g., a screen name or other type of instant message identity identifier). More particularly, an address book is associated with a particular instant message identity (e.g., a sender) and includes contact information 135A for people that are significant to the instant message identity. The people listed in the contact information may be referred to as contacts. Each contact information entry in the address book may identify a screen name 135B (or other type of instant message address or identity identifier) and a mobile telephone number 135C for a contact of the instant message identity to whom the address book applies (e.g., sender). In some implementations, the address book may include additional information, such as a name, mailing address information, and other types of telephone numbers. Some implementations may refer to an address book by other terms, such as contact information or user information.

The desktop instant messaging server 110 also includes buddy lists 136 for instant messaging user accounts. Particular buddy lists may be used by instant messaging application 107A or 107B that are associated with an instant messaging user using the client system 105A or 105B, respectively.

The desktop instant messaging server 130 also includes code segments 137 to enable a user to manage contact information 135A in the user's address book, such as by adding information for a new contact, deleting a contact, or editing information related to a contact. The code segments 137 enable a user to identify a mobile telephone and an instant messaging identity identifier or account (e.g., screen name) for a contact.

An offline mobile proxy 140 represents the online presence and/or availability of a user of the instant messaging system when the user is offline, thus enabling communications to offline users via alternative communication schemes (e.g., text messaging to a text-capable telephone), even if an instant messaging service is configured to restrict messaging to users who reflect online presence. The offline mobile proxy 140 represents to the desktop instant messaging server 130 that a user is capable of receiving an instant message when a user is actually offline. Accordingly, when a user is offline, availability of the user to communicate may be perceived by others and messages sent to them may be received using an alternative communications scheme (e.g., text messaging to a text-capable telephone). For instance, a user who is not signed on to the instant message service (i.e., an offline user) and whose mobile telephone number is included in a potential sender's address book may be perceived as available to receive messages by the potential sender—that is, the user who is offline remains listed as available for messaging on the buddy lists of users who subscribe to the user's online presence and have contact information for the user that includes the user's mobile telephone number and screen name. Moreover, an instant message intended for such an offline user is received by the desktop instant messaging server 130 and provided to the wireless server 145, which communicates a text message based on the original instant message to the mobile telephone device 170 associated with the offline user. The text message is communicated from the wireless server 145 to the mobile telephone device 170 thorough the cellular system 180. The communication of an instant message addressed to an instant message screen name to a mobile telephone as a text message may be referred to as sender-initiated mobile forwarding. Such sender-initiated mobile forwarding may be distinguished from recipient-initiated mobile forwarding in which a recipient configures, or otherwise enables, the recipient's own instant messaging account to forward an instant message as a text message to the recipient's mobile telephone. Sender-initiated mobile forwarding also may be referred to as sender-inspired mobile forwarding. Recipient-initiated mobile forwarding also may be referred to as recipient-inspired mobile forwarding.

The offline mobile proxy 140 includes code segments 140A to manage online presence information. When the desktop instant messaging server 130 detects that a user has signed off the instant messaging service, the desktop instant messaging server 130 communicates the status of the user (e.g., offline) to the offline mobile proxy 140, which executes code segment 140A to indicate to the desktop instant messaging server 130 that the user is online. This enables a user to be perceived by the desktop instant messaging server 130 as online when the user is offline (e.g., not signed in to the instant messaging service). In one implementation, the offline mobile proxy 140 also executes code segment 140A to update, or enable the update of, the screen name associated with a user to show a mobile indicator adjacent to the user's screen name on each of the buddy lists that include the user's screen name. The mobile indicator indicates that the user is available at their mobile device to receive messages inspired through manipulation of the buddy list in the ordinary manner, indicates that the user is not signed on to the desktop instant messaging service, and also indicates that the user has invoked recipient-initiated mobile forwarding, as described more fully in FIG. 3.

The offline mobile proxy 140 also includes code segments 140B that may be executed by the offline mobile proxy 140 to determine whether to forward an instant message addressed to an offline intended recipient to the mobile telephone device 170 associated with the intended recipient of the original instant message. In one example, the offline mobile proxy 140 executing the code segments 140B may determine to forward an instant message when a sender of the instant message knows the potential recipient's mobile telephone number (i.e., the offline mobile proxy 140 directly, or thorough the desktop instant messaging server 130, determines there is an entry in address books 135 for contact information 135A that includes a mobile telephone number associated with the potential recipient's screen name. This may be referred to as determining whether to forward an instant message based on contact information. In another example, the offline mobile proxy 140 may determine to forward the instant message based on contact information and other factors. For example, the offline mobile proxy 140 may determine whether to forward an instant message to a mobile telephone number based on a user state (e.g., only when a user is offline), based on a sender request (e.g., confirmation that the sender wants to send a message to the mobile telephone), or unconditionally (e.g., mirror all instant messages to the mobile telephone even when the user is signed on to the instant message service). Accordingly, the offline mobile proxy 140 executing the code segments 140B may determine to forward the instant message only when the user is offline or it instead may determine to forward the instant message only when the sender has indicated that the instant message should be forwarded. In yet another example, the offline mobile proxy 140 executing the code segments 140B may determine to forward the instant message when the sender has a mobile telephone number for the potential recipient and the potential recipient has not prohibited forwarding of instant messages to the potential recipient's mobile telephone. In any event, when the offline mobile proxy 140 determines that an instant message is to be forwarded to a mobile device, the offline mobile proxy 140 provides the instant message to the wireless server 145.

The wireless server 145 includes code segments 145A configured to prepare, based on an original instant message, a text message that is based on the short message service (SMS) protocol, which is particularly useful in sending and receiving short text messages to mobile devices, such as mobile telephones. The code segments 145A include addressing operations. In one example, the wireless server 145 executing code segments 145A may use contact information 135A in address books 135 to identify the mobile telephone number of the recipient identified in the instant message. To do so, the wireless server 145 executing code segments 145A may identify a contact entry in the address book of the sender of the instant message where the contact entry includes the screen name to whom the instant message is addressed and a mobile telephone number. The addressing operations also may include addressing the text message to the identified mobile telephone number. The addressing operations also may include converting the instant message to a different character set that is used by the text message. For example, an instant message may use an ASCII character set or a Unicode character set, whereas the text message may use a GSM ("Global System for Mobile Communications") character set. In such a case, the wireless server 145 executing code segments 145A also converts the instant message from the ASCII or Unicode character set to the GSM character set.

In addition, the wireless server 145 also includes code segments 145B configured to forward a text message to a telephone number. More particularly, the wireless server 145 executing code segments 145B forwards to the cellular system 180 a text message prepared by executing code segments 145A. This may be referred to as mobile forwarding. If mobile forwarding is inspired by the sender's contact information for the intended recipient, the mobile forwarding may be referred to as sender-initiated mobile forwarding. Similarly, if mobile forwarding is performed based on action by the recipient, then the mobile forwarding may be referred to as recipient-initiated mobile forwarding.

The mobile telephone device 170 is associated with a mobile telephone number to which telephone calls may be routed over the cellular system 180. The mobile telephone device 170 also may be associated with a SMS address that typically is the same as the mobile telephone number associated with the mobile telephone device 170, though this need not necessarily be so. The mobile telephone device 170 is capable of receiving, displaying, processing, and sending text messages over the cellular system 180. The mobile telephone device 170 also may be referred to as a text-capable telephone.

The cellular system 180 may include a cellular network that is capable of transmitting and receiving digital or analog signals using cellular technologies, including Advanced Mobile Telephone System (AMPS), Narrowband Advanced Mobile Telephone Service (NAMPS), Frequency Shift Keying (FSK), Frequency Division Multiple Access (FDMA), Time Division Multiple Access (TDMA), and Code Division Multiple Access (CDMA), or any standard, such as Global System for Mobile Communications (GSM) or Cellular Digital Packet Data (CDPD). Alternatively, the cellular system 180 may be any type of telephone network capable of transmitting text messages to any type of telephone or mobile device.

In general, the communications system 100 may be used to send an instant message sent from a client system 105A or 105B to the instant message provider system 110, which transforms the instant message to a corresponding text message that is routed over the cellular system 180 to the mobile telephone device 170. The original instant message is addressed to a screen name and forwarded to the mobile telephone device 170 based on the sender's contact information for the intended recipient—that is, based on an association, in the sender's contact information 135A of address books 135, of the screen name and the mobile telephone number of the intended recipient, and detection of offline status of the screen name identity (i.e., the user of the mobile telephone device 170).

In some implementations, forwarding an instant message to a mobile telephone may be prohibited by the user of the mobile telephone, even when the sender of the instant message knows the mobile telephone number of the intended recipient of the instant message (e.g., contact information in the sender's address book includes a mobile telephone number associated with the screen name of the intended recipient). Additionally or alternatively, forwarding of an instant message to a mobile telephone may be performed only after confirmation is received from the sender of the instant message.

In some implementations, the client system 105A or 105B may be capable of performing some or all of the operations described as being performed by the instant message provider system 110.

Sender-initiated mobile forwarding may reduce the burden on sender's of instant messages to alleviate, or minimize, effort of monitoring recipient availability to receive an instant message. It may be possible to monitor recipient availability to receive, on the recipient's mobile telephone, a communication based on an instant message. For example, in some implementations, sender-initiated mobile forwarding may only occur when the intended recipient's mobile telephone is activated, within signal range, and able to receive a text message, though this need not necessarily be so. Text messaging to a mobile telephone may be implemented using store-and-forward techniques such that a text message that is sent to a deactivated (e.g., turned off) mobile telephone is delivered to the mobile telephone when the mobile telephone is activated (e.g., turned on) or becomes within receiving range of a mobile signal. In such a case, the recipient having a mobile telephone may be identified as always being available to receive a text message.

In some implementations, a buddy list of potential instant messaging recipients may reflect whether one or more potential instant messaging recipients are available to receive a message forwarded to the potential recipient's mobile telephone. For example, when a potential recipient's mobile telephone is turned off, not within signal range, or is otherwise unable to receive a text message, the buddy list including the instant messaging recipient may reflect the potential recipient's unavailability to receive a message forwarded to the potential recipient's mobile telephone. A buddy list that indicates whether a potential recipient is available to receive a message forwarded to the potential recipient's mobile telephone may be applicable to sender-initiated mobile forwarding and may be applicable to recipient-controlled mobile forwarding.

Figure 2:
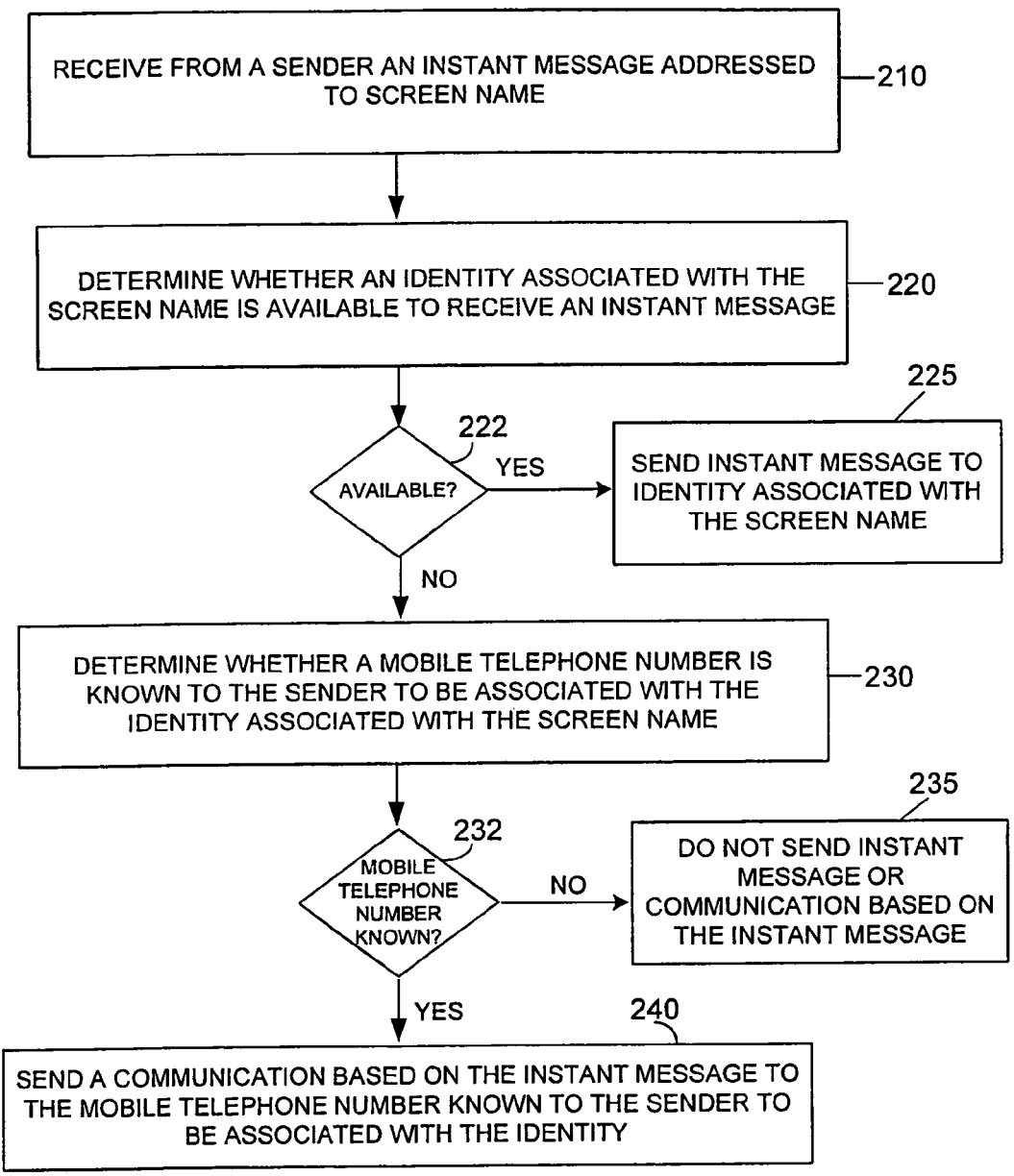
FIGS. 2 and 8 are flow charts of processes for forwarding an instant message based on contact information.

FIG. 2 illustrates a process 200 for forwarding an instant message, based on contact information for an intended recipient, to a mobile telephone device capable of receiving, processing, displaying and transmitting text messages. The process 200 may be performed, for example, by a processor on the provider system 110 of FIG. 1 or may be performed by an instant messaging application, such as instant messaging application 107A or 107B of FIG. 1. For convenience, the processor performing the process 200 may be referred to as an instant messaging system.

The process 200 begins when a user creates an instant message addressed to a screen name, and the instant message is received by the instant messaging system (step 210). The user, who may be referred to as a sender, may do so using an instant messaging application to identify a buddy from within their buddy list and enter text or other content for the instant message. Accordingly, the instant message is addressed to a screen name of an identity listed on the sender's buddy list. Alternatively, the screen name of the intended recipient of the instant message may be a identified by the user by entering a screen name (rather than selecting a buddy from the sender's buddy list).

The instant messaging system determines whether an identity associated with the screen name is available to receive an instant message (step 220). This may be accomplished, for example, by the instant messaging system checking whether the identity associated with the screen name is signed on to the instant message system. When the identity associated with the screen name is available to receive an instant message (step 222), the instant messaging system sends the instant message to the identity associated with the screen name (step 225). For example, the instant message system may forward the instant message to the client system, such as 105A or 105B of FIG. 1, used by the identity.

When the identity associated with the screen name is not available to receive an instant message (step 222), the instant messaging system determines whether a mobile telephone number is known by the sender to be associated with the identity associated with the screen name. In one example, the instant messaging system identifies a collection of contact information (i.e., an address book, a contact list, or a buddy list) that is associated with the sender of the instant message and searches the identified collection for an entry that includes a screen name that matches the screen name to which the instant message is addressed. If such a match is found, the instant messaging system determines whether a mobile telephone number is included in the contact information entry, and, when so, the instant messaging system determines that a mobile telephone number is known to the sender to be associated with the identity associated with the screen name to which the instant message is addressed.

When the instant message system determines that a mobile telephone number is not known by the sender to be associated with the identity associated with the screen name (e.g., contact information for the identity is not included in the sender's address book or contact information for the identity is included in the sender's address book and the contact information does not include a mobile telephone number) (step 232), the instant message system does not send the instant message to the intended recipient and does not send a communication based on the instant message (e.g., does not forward a text message to a mobile telephone number) (step 235).

When the instant message system determines that a mobile telephone number is known by the sender to be associated with the identity associated with the screen name (e.g., contact information for the identity is included in the sender's address book, where the contact information includes a mobile telephone number and identifies a screen name) (step 232), the instant message system sends a communication based on the instant message to the mobile telephone number known to the sender to be associated with the identity (step 240). This may be accomplished, for example, by preparing and forwarding a text message based on the instant message to the mobile telephone number for the identity, directly or indirectly, thorough a cellular system, as described previously with respect to FIG. 1.

In some implementations, the determination as to whether an identity is available may include, when the identity is signed on to the instant message system, making a determination that the identity is available only when the identity is not idle (e.g., the identity has not interacted with the client system running the instant message application program in a predetermined or user-configurable amount of time). In such a case, a communication based on the instant message may be sent to a mobile telephone number known to the sender to be associated with the identity when the identity is not signed on and/or is idle. Alternatively or additionally, an instant message account or instant message application may be configured to identify conditions when sender-initiated mobile forwarding occurs—such as, only when a recipient is not signed on to the instant message application, or when a recipient is not signed on to the instant message application or is idle.

Figures 3, 4:
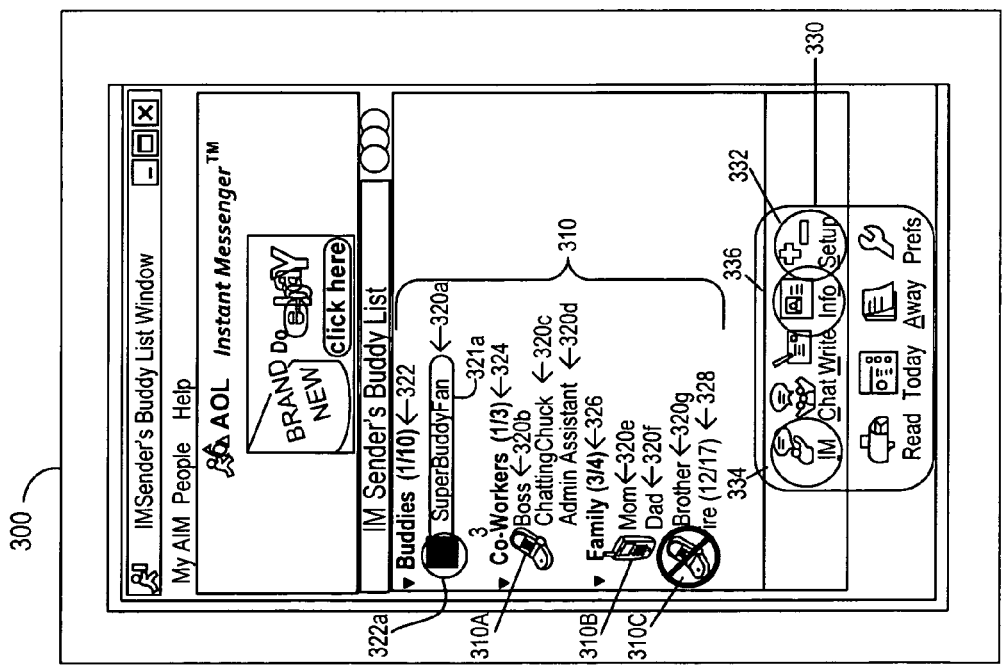
FIG. 3 is an illustration of an exemplary interface for showing a buddy list that identifies buddies for whom a mobile telephone number is known to the instant messaging identity associated with the buddy list.
FIGS. 4 and 5 are illustrations of exemplary interfaces for associating, in contact information, a mobile telephone number known to an instant message identity with a screen name.

Referring to FIG. 3, a graphical user interface 300 displays a buddy list for an instant messaging identity (e.g., an instant message sender) where the buddy list identifies buddies for whom a mobile telephone number is known to the instant messaging identity (e.g., the instant message sender).

The graphical user interface 300 includes an instant message sender-selected list 310 of potential instant messaging recipients 320a-320g. The graphical user interface 300 may be referred to as an instant message buddy list window 300, an instant message buddy list interface 300, or, more simply, a buddy list window 300 or a buddy list interface 300, and the list 310 may be referred to as a buddy list 310. In some implementations, the buddy list also may be referred to as a participant list, a contact list or a friends list. Thus, buddies typically are contacts who are known to the potential instant message sender (here, IMSender). A buddy is identified by a screen name or other type of identity identifier, such as an account name, a user name, a user identity, or an alias of an identity identifier. In particular, the user IMSender is an instant message sender using the buddy list interface 300. The buddy list interface 300 is rendered on the display of a computing device or a communication device on which an instant messaging client program is executed, such as the client system 105A or 105B of FIG. 1.

In the buddy list 310, the representations 320a-320g include text identifying the screen names of the buddies included in buddy list 310; however, additional or alternative information may be used to represent, and be associated with, one or more of the buddies, such as an avatar or other type of graphical image, that is reduced in size and either still or animated. In one example, a buddy icon is a small, two-dimensional graphical image that may be used for self-expression by the associated buddy (e.g., used to express an interest of the buddy), and which may be a still or animated image or graphic. For example, the representation 320a includes the screen name 321a and corresponding buddy icon 322a of the instant message recipient named SuperBuddyFan1. The buddy icon typically is selected by the party identified by the screen name, but it may be selected instead by the buddy list owner. For convenience, each of the representations 320a-320g may be referred to as a screen name 320a-320g. In some implementations, one or more of the representations 320a-320g may be an alias of a screen name rather than a screen name itself. The representations 320a-320g may provide connectivity information to the instant message sender about the buddy, such as whether the buddy is online, how long the buddy has been online, whether the buddy is away from the client system executing the instant messaging client application, or whether the buddy is available through a mobile device.

Buddies may be grouped by an instant message sender into one or more user-defined or pre-selected groupings ("groups"). As shown, the instant message buddy list window 300 has three groups, Buddies 322, Co-Workers 324, and Family 326. SuperBuddyFan1 320a belongs to the Buddies group 322, and ChattingChuck 320c belongs to the Co-Workers group 324. When a buddy's instant message client program is able to receive communications, the representation of the buddy in the buddy list is displayed under the name or representation of the buddy group to which the buddy belongs. As shown, at least potential instant messaging recipients 320a-320g are online. In contrast, when a buddy's instant message client program is not able to receive communications, the representation of the buddy in the buddy list may not be displayed under the group with which it is associated, but it may instead be displayed with representations of buddies from other groups under the heading Offline 328, or it may otherwise be visually distinguished from other buddies who then have available/present instant message client programs. All buddies included in the buddy list 310 that are displayed in the messaging mode are displayed either under one of the groups 322, 324, or 326, or under the heading Offline 328.

The buddy list 310 also includes a mobile indicator 310A that reflects the existence of a mobile telephone number for the identity is known to the user (i.e., IMSender) and, as such, is a means for contacting the identity associated with the screen name 320b (i.e., Boss) adjacent to the mobile indicator 310A. Thus, the mobile indicator 310A may indicate that a message addressed to the screen name 320b is to be forwarded to a mobile telephone number associated with the screen name 320b based on an association of a mobile telephone number with the screen name 320b in the user's (i.e., IMSender) contact information. The mobile indicator 310A also may be referred to as a sender-initiated forwarding indicator. Generally, the mobile indicator 310A is displayed only when the identity associated with the screen name 320b is not available to receive an instant message (e.g., is offline and/or is idle), though this need not necessarily be so. In some implementations, the mobile indicator 310A may indicate only that a mobile telephone number is associated with the screen name and not provide an indication as to whether an instant message sent to the corresponding screen name is to be forwarded to the mobile telephone number.

The buddy list 310 also includes a mobile indicator 310B that reflects that the identity associated with the screen name 320e (i.e., Mom) adjacent to the mobile indicator 310B has enabled recipient-initiated mobile forwarding of instant messages to the identity's mobile telephone. In contrast to the sender-initiated forwarding indicator 310A, the mobile telephone number of the identity need not necessarily be known to the user (i.e., IMSender). Mobile indicator 310B may be referred to as a recipient-initiated forwarding indicator. Generally, the mobile indicator 310B is displayed only when the identity associated with the screen name 320e is not available to receive an instant message (e.g., is offline and/or is idle), though this need not necessarily be so. Although the recipient-initiated forwarding indicator 310B is shown with a different presentation style from the presentation style of the sender-initiated forwarding indicator 310A, some implementations may use the same presentation style for both types of mobile indicators.

A mobile blocking indicator 310C on the buddy list 310 reflects that the identity associated with the screen name 320g (i.e., Brother) prohibits forwarding of instant messages to the identity's mobile telephone, even though the mobile telephone number associated with the identity may be known to the user. Generally, though not necessarily, the mobile blocking indicator 310C is displayed only when the identity associated with the screen name 320g is not available to receive an instant message (e.g., is offline and/or is idle). Alternatively, in contrast to displaying a mobile indicator 310C, some implementations may simply use the presence of a user's screen name to indicate their availability (by mobile forwarding or otherwise) to receive messages, and the absence of mobile indicators 310A and 310B to indicate an otherwise potential recipient's lack of availability due to either of an absence of their mobile forwarding information/registration or their expressed reluctance to receive messages at their mobile device. For example, some implementations may not display a mobile indicator 310A adjacent to a screen name when the sender has the mobile telephone number for the identity, the identity is offline, and the identity prohibits mobile forwarding. In such a case, for example, the screen name of the user may simply appear under the Offline group 328, even though the sender has their mobile forwarding information.

The mobile blocking indicator 310C may be particularly useful when applied to the Offline group 328. In such a case, the mobile blocking indicator 310C would inform the sender of the identities who are available to receive instant messages sent as text messages to the identities' mobile telephones. For example, when a potential recipient's mobile telephone is turned off, not within signal range, or is otherwise unable to receive a text message, the buddy list may include a mobile blocking indicator 310C to reflect the potential recipient's unavailability to receive a message forwarded to the potential recipient's mobile telephone.

A determination to display the mobile blocking indicator 310C may be made when a determination is made that the identity associated with the screen name 320g (i.e., Brother) is offline and/or is idle. For example, when the identity signs off of the host system providing the instant messaging service, the host system may determine whether the identity prohibits forwarding of instant messages to the identity's mobile telephone. To do so, for example, the host system may check configuration information associated with the screen name 320g and make a determination based on the configuration information. When the host system determines that forwarding of instant messages is prohibited by the identity, the host system may make that determination available to the client system or may make available an updated buddy list that includes the mobile blocking indicator 310C. This may be accomplished, for example, by sending the updated buddy list, sending a message that indicates the identity associated with the screen name prohibits forwarding of instant messages, or otherwise pushing the buddy list or determination to the client system that displays the buddy list 310. In another example, the host system enables the client system to access the updated buddy list with the mobile blocking indicator 310C; the determination that a mobile blocking indicator 310C is appropriate, or otherwise enabling the client system to pull the updated buddy list or determination that a mobile blocking indicator 310C is appropriate from the host system. The buddy list window 300 also includes controls 330 that a user may use to initiate functions related to instant messaging. In particular, a setup control 332 allows for configuration of the currently displayed buddy list. Selecting the setup control 332 enables functionality including the addition and deletion of screen names, such as screen names 320a and 320b, and groups, such as groups 322 and 324, to the buddy list 310.

When an online screen name from the buddy list 310 has been selected, activating an instant messaging control 334 displays an interface for communicating with the account corresponding to the selected screen name. Activating the instant messaging control 334 without selecting an online screen name in the buddy list 310 causes the display of an interface for communicating and allows a user to identify an instant messaging user that is not on the user's buddy list.

An info control 336 displays contact information related to a screen name selected on the buddy list 310 when contact information is available about the buddy. Such information may include, for example, a mobile telephone number, a work telephone number, and a home telephone number. In some implementations, information other than contact information may be displayed, such as, for example, name, geographic location, interests and hobbies, and occupation of the buddy. The contact information may be entered by the identity (i.e., buddy) and, optionally, the identity may control whether some or all such information is displayed to other users. Additionally or alternatively, the contact information for the buddy may be entered by the user (i.e., IMSender). The contact information may be displayed, for example, in a user interface 400 of FIG. 4.

FIG. 4 illustrates an example of an interface 400 for associating, in contact information, a mobile telephone number with a screen name. The interface 400 may be displayed, for example, in response to a user activating a control to associate telephone numbers with an instant message identity identified on the user's buddy list. The interface 400 identifies the screen name 410 of an identity (i.e., "Steve Clark") with whom telephone numbers 420 are to be associated. The interface 400 enables a user to enter a mobile telephone number 425 to be associated with the screen name 410, which serves to inform the instant messaging service that the mobile telephone number associated with the screen name 410 is known to the user.

The interface 400 also includes controls. A control 432 is operable to associate the entered mobile telephone number 425 with the identified screen name 410 and remove the interface 400 from display on a computing device or communication device operating the instant messaging application. In contrast, a control 434 is operable to remove the interface 400 from display without associating the entered mobile telephone number 425 with the identified screen name 410.

In some implementations, an instant messaging user may enter the user's own mobile telephone number in the interface 400 and, in doing so, make known the user's own mobile telephone number to other instant messaging users. Thus, in doing so, the user enables instant messages sent to the user from other instant messaging users to be forwarded to the user's mobile telephone number when the user is offline. This may be a convenient method for a user to enable mobile forwarding to the user's mobile telephone.

This or a similar interface may be used to display a mobile telephone number that is associated with a screen name and, hence, known to the user displaying the interface. For example, with reference to FIG. 3, when a screen name is selected on the buddy list 310, activation of the control 336 may cause the display of an interface the same as or similar to interface 400.

Figure 5:
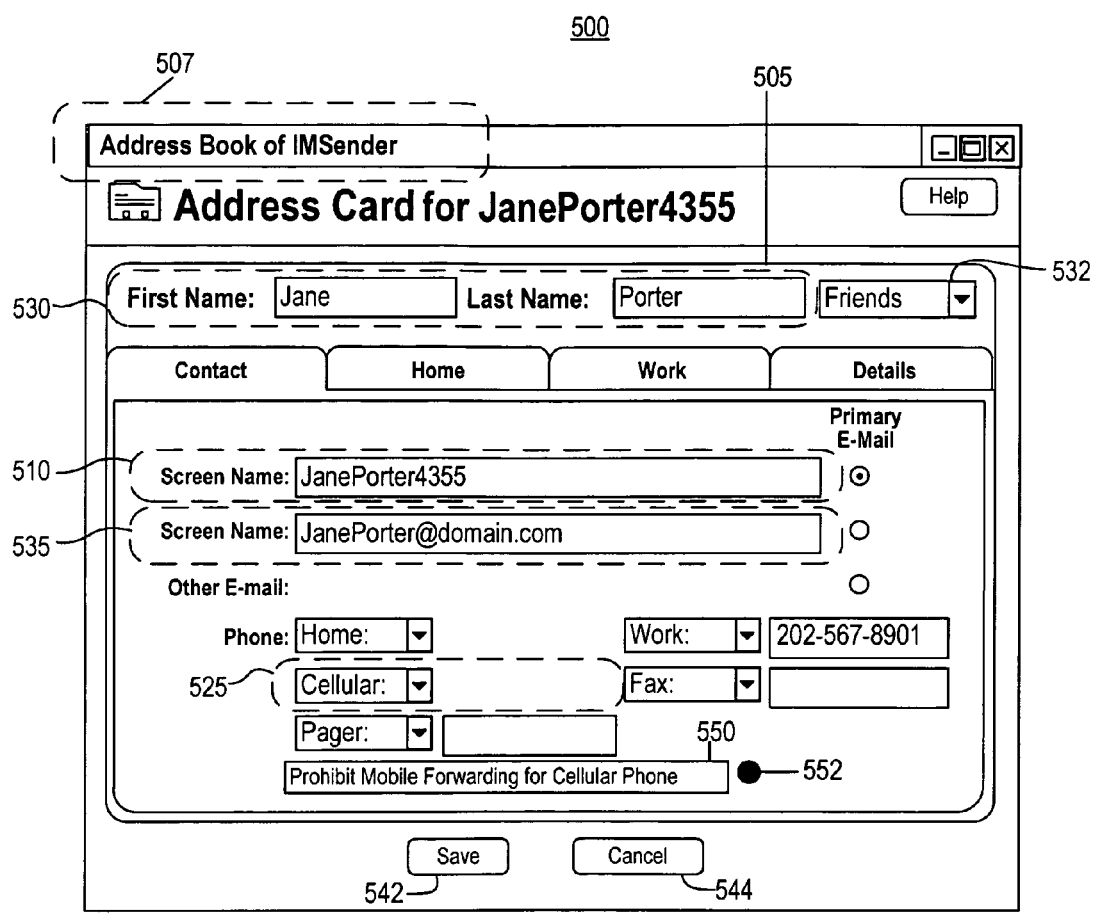

FIG. 5 depicts another example of an interface 500 for associating, in contact information, a mobile telephone number with a screen name, which serves to inform the instant messaging service that the mobile telephone number associated with the screen name is known to the particular user associated with the address book.

In contrast to the interface 400 of FIG. 4, the interface 500 presents an address card in an address book of an instant messaging user. More particularly, the interface 500 includes address card information 505 for a contact in an address book associated with the screen name of a particular instant messaging sender (i.e., IMSender) and title bar 507. The address card information 505 includes a screen name 510 and a mobile telephone number 525 of the contact who is the subject of the address card. Thus, when a user enters and stores a screen name 510 and mobile telephone number 525 for the contact in the address card information 505, the instant messaging service is informed that the mobile telephone number 525 of the contact is known to the instant message sender (i.e., IMSender) with whom the address book is associated For example, with reference to FIG. 2, the existence of a mobile telephone number in a sender's general contact list may be used, at step 230, as the basis for determining whether a mobile telephone number is known by the sender to be associated with an identity associated with a screen name. Such a determination may be made even in the absence of a screen name in the contact list of the sender if the mobile telephone number of other general contact lists is associated with some other indicia also linked to the recipient screen name in the buddy list or otherwise (e.g., name).

As illustrated, the address card information 505 also includes other types of information, such as the name of the contact 530, a category 532 of contacts with whom the contact is associated (i.e., a Friends category), and an e-mail account identifier 535 of e-mail accounts other than an e-mail account associated with the screen name 510.

The interface 500 also includes a control 542 to save address card information in electronic storage, such as address books 135 of FIG. 1 and remove the interface 500 from display, and a control 544 to remove the interface 500 from display without saving newly entered address card information.

In some implementations, the interface 500 also may include a control 550 operable to expressly prohibit sender-initiated mobile forwarding to the cellular phone number 525 associated with the screen name 510 (e.g., prohibit forwarding an instant message sent to the screen name 510 to the cellular phone number 525 when the identity associated with the screen name is not signed on to the instant messaging service) and an indicator 552 representing whether sender-initiated mobile forwarding to the cellular phone number 525 is prohibited. The ability for a user to control whether sender-initiated mobile forwarding is prohibited for a particular contact in the user's address book may be useful. For example, a user may store in the user's address book a cellular phone number for a contact for whom the user would not want to forward an instant message when the contact is offline. In one example, a user may wish to store a cellular phone number 525 for a contact where the contact owns a cellular phone corresponding to cellular phone number for emergency use only and customarily does not power on the cellular phone. In such a case, the user may wish to prohibit sender-initiated mobile forwarding to the cellular phone. In some implementations, the control 550 may be operable to expressly prohibit both sender-initiated and recipient-initiated mobile forwarding (if the contact has configured the contact's instant message user account to enable recipient-initiated mobile forwarding).

In some implementations, other sender-configuration options may be provided. For example, a user may be able to select whether sender-initiated mobile forwarding based on contact information is enabled (or prohibited) for all contacts or contacts belonging to one or more contact categories. Similarly, a user may be able to select whether sender-initiated mobile forwarding based on contact information is enabled (or prohibited) as a default option for all contacts, or contacts belonging to one or more contact categories, unless overridden by user instruction. One example of such a user instruction is the control 550 operable to prohibit sender-initiated mobile forwarding to the mobile telephone number of the identified contact. Another example is the response of a user to a prompt inquiring whether the user wants to forward a particular instant message to a recipient, as described more fully later with respect to FIG. 6B.

Additionally or alternatively, recipient-configuration options may be provided for enabling a recipient to control whether an instant message is forwarded to the recipient's mobile telephone. For example, a user may configure the user's instant messaging account such that instant messages are not forwarded to the user's mobile telephone even when a sender has the user's mobile telephone number in the sender's contact information. More particularly, a user who is an intended recipient of an instant message may prohibit sender-initiated mobile forwarding from any sender, a particular sender and/or a sender that is associated with one of one or more buddy groups on the recipient's buddy list.

FIG. 6A shows an exemplary interface 600A for sending messages to a potential instant message recipient for whom a mobile telephone number is known to the instant messaging sender. More particularly, the interface 600A includes a recipient indicator 602 that indicates a screen name of a potential recipient of the messages sent with the interface 600A. The screen name of the potential recipient may be identified by selecting a screen name from a buddy list, such as buddy list 310 of FIG. 3, or may be entered by the user directly into the recipient indicator 602. As illustrated, the interface 600A is used to send communications to the screen name NewBuddy 602. In some implementations, the interface 600A also may include a sender indicator (not shown) that indicates a sender of the messages sent with the interface 600A.

The interface 600A includes a message compose text box 606 that enables text to be entered for a message and displays the text of a message to be sent from the sender and to the identified recipient 602. Once specified in the message compose text box 606, the message may be sent by selecting a send button 610. In some implementations, the interface 600A may include a message transcript text box (not shown) that displays the text of messages sent between the sender and the recipient.

The interface 600A includes an available control 620 operable to display a user interface indicating whether the potential recipient is available to receive an instant message and, if not, to prompt the user to indicate whether the instant message is to be forwarded to the mobile telephone number associated with the screen name (when a mobile telephone number is available for the screen name), such as user interface 600B of FIG. 6B.

FIG. 6B shows a user interface 600B that may be presented to inform an instant message sender that the intended recipient of the instant message is not available to receive the instant message (e.g., the intended recipient is offline) and request confirmation from the instant message sender as to whether the instant message should be forwarded to a mobile telephone number associated with the intended recipient and known to the instant message sender.

More particularly, the interface 600B displays availability information 625 for the intended recipient. As illustrated, the availability information 625 indicates that the intended recipient is offline. Another example of availability information 625 is information that the intended recipient is idle (e.g., has not interacted with the client system running the instant message application program in a predetermined or user-configurable amount of time). Yet another example of availability information 625 is information that the intended recipient is away from the client system running the instant message application program (e.g., that the intended recipient has set an away indicator to be displayed when an instant message is sent to the intended recipient). Availability information 625 also may provide notification that the intended recipient is offline and has enabled recipient-initiated mobile forwarding where a text message based on the instant message is to be sent to a mobile telephone number identified by the intended recipient.

The interface 600B also includes a prompt 630 for the user to indicate whether the instant message sender wishes to forward the instant message to the intended recipient's mobile telephone number. The prompt 630 may be displayed based on the association, in the instant message sender's collection of contact information (e.g., address book), of a mobile telephone number with the screen name of the intended recipient. In some implementations, the prompt 630 also may be displayed when the intended recipient is offline and has enabled recipient-initiated mobile forwarding to receive a text message on the intended recipient's mobile telephone number.

A control 635 is operable to enable mobile forwarding of a text message to a mobile telephone number associated with the intended recipient and remove the interface 600B from display. In contrast, a control 637 is operable to remove the interface 600B without sending to a mobile telephone number associated with the intended recipient a text message based on the instant message.

Figure 6C:
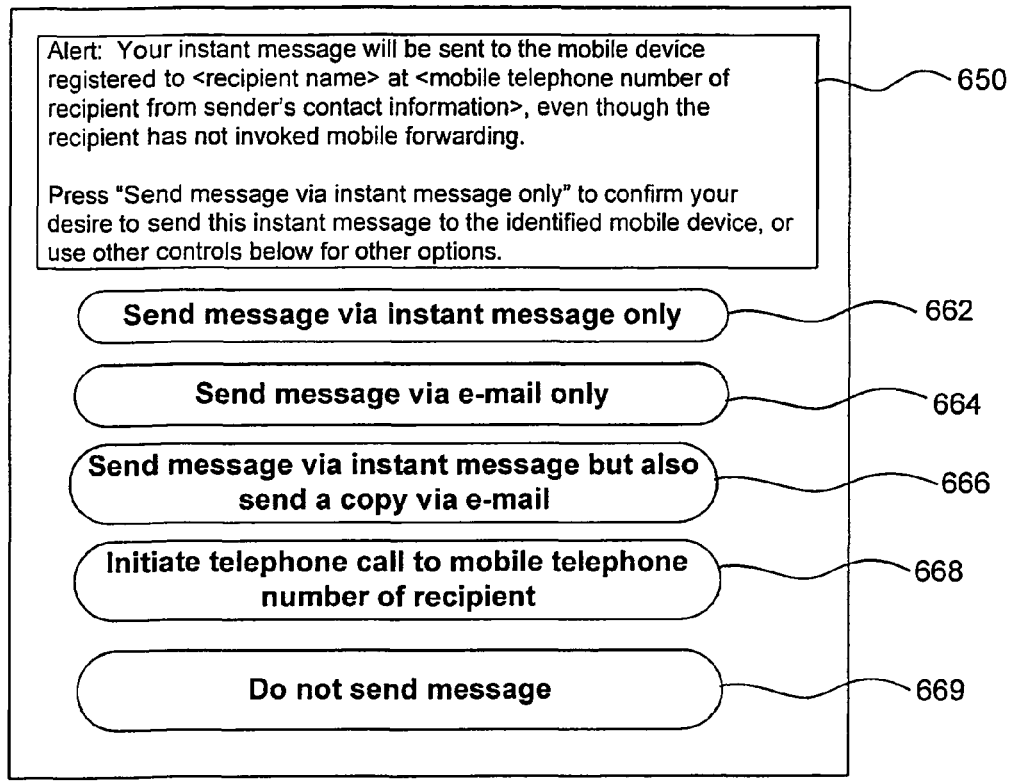

FIG. 6C shows another exemplary user interface 600C that may be presented to inform an instant message sender that the intended recipient of the instant message is not available to receive the instant message (e.g., the intended recipient is offline) and request confirmation from the instant message sender as to whether the instant message should be forwarded to a mobile telephone number associated with the intended recipient and known to the instant message sender. In contrast to FIG. 6B, the user interface 600C provides communication scheme options other than sender-initiated mobile forwarding to communicate with the intended recipient.

More particularly, the interface 600C includes a text box 650 informing the sender that the instant message is to be sent to the mobile device registered to the intended recipient and identifying the mobile telephone number to which the message is to be sent. The interface 600C also includes controls 662, 664, 666, 668 and 669 to identify the desired disposition of the message. In particular, the control 662 is operable to send the message content identified in the instant message via instant message only—that is, forward a text message to the mobile telephone number of the intended recipient and remove the interface 600C from the display.

The control 664 is operable to send the message content identified in the instant message as an electronic mail (e-mail) message directed to an e-mail address associated with the intended recipient in the sender's contact information for the recipient, such as other e-mail address 535 of FIG. 5, and remove the interface 600C from the display.

Similarly, the control 666 is operable to send the message content both as a text message forwarded to a mobile telephone number of the recipient and as an e-mail message directed to the intended recipient, as well as to remove the interface 600C from the display.

The control 668 is operable to initiate a telephone call (e.g., a voice-based telephone call) to the mobile telephone number of the intended recipient and remove the interface 600C from the display.

The control 669 is operable to remove the interface 600C from the display without sending the instant message.

Figure 6D:
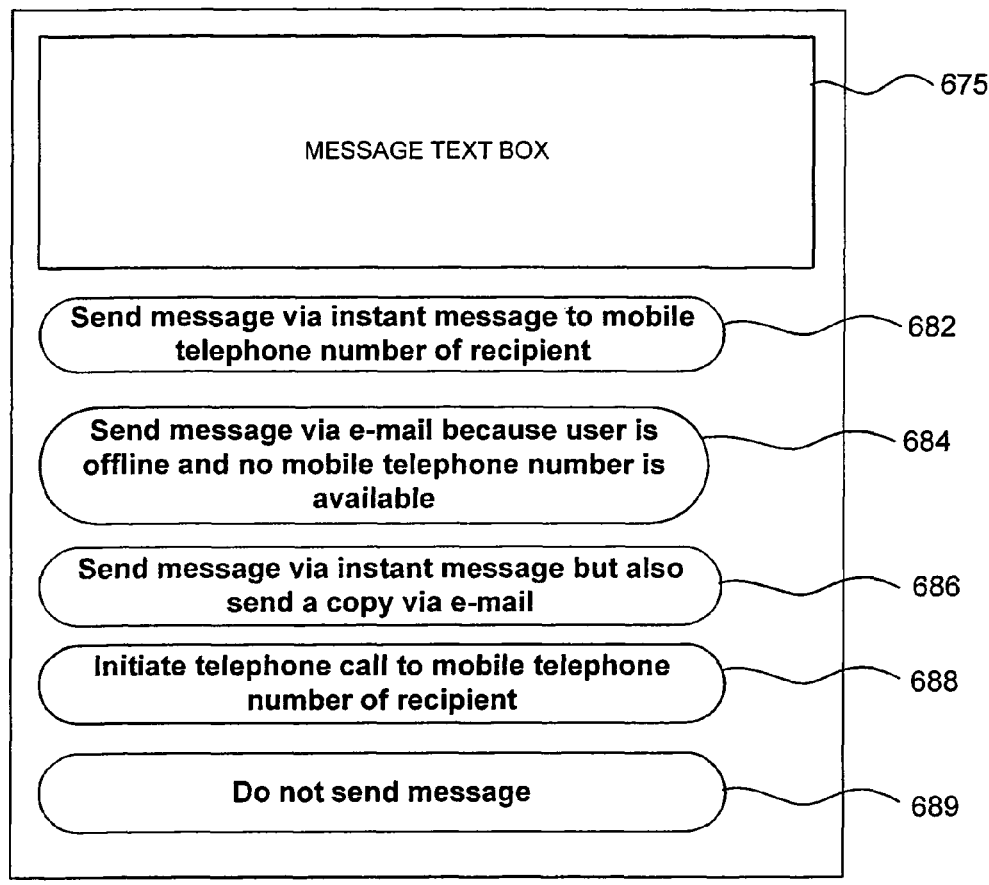

FIG. 6D shows yet another exemplary user interface 600D that may be presented to inform an instant message sender that the intended recipient of the instant message is not available to receive the instant message (e.g., the intended recipient is offline) and request confirmation from the instant message sender as to whether the instant message should be forwarded to a mobile telephone number associated with the intended recipient and known to the instant message sender. In contrast to FIG. 6C, the user interface 600D includes message content of the instant message in a message text box 675 that may be, for example, an implementation of message compose text box 606 of FIG. 6A.

Like the interface 600C of FIG. 6C, the interface 600D controls 682, 684, 686, 688 and 689, which may be implementations of controls 662, 664, 666, 668 and 669 of FIG. 6C, respectively.

Figure 7:
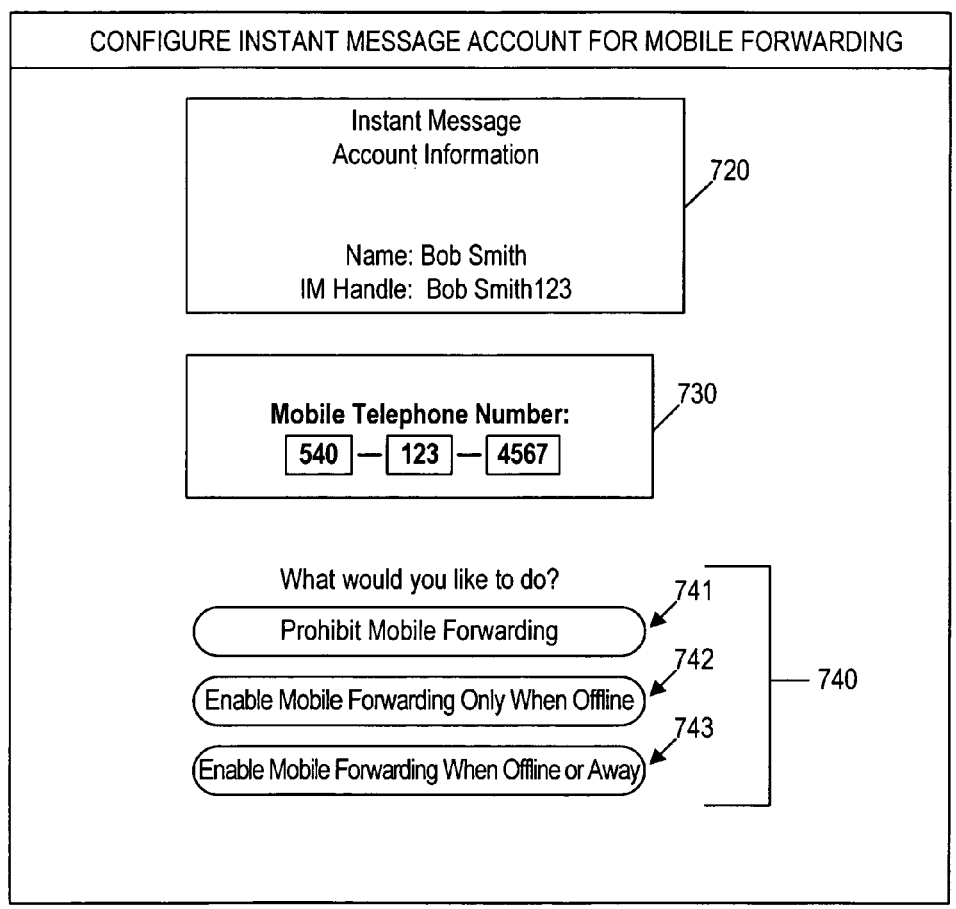
FIG. 7 is an illustration of an exemplary interface for enabling an instant message identity to prohibit mobile forwarding to the identity's mobile telephone.

Referring to FIG. 7, an exemplary user interface 700 may be presented to a user upon initiation of a process to configure the user's instant messaging account to enable or prohibit sender-initiated mobile forwarding. The user interface 700 includes profile information 720 for the instant messaging account being configured. The profile information 720 includes the name 722 of the identity (i.e., "Bob Smith") and the IM handle or screen name 724 of the identity (i.e., "BobSmith123"). The user interface 700 also includes the mobile telephone number 730 to which the configuration is to apply. In some implementations, the mobile telephone number 730 may be included in the profile information 720.

The user interface 700 also includes a set of option buttons 740 that may be selected by the user to configure the user's instant messaging account to react to requests by a sender to forward messages to the mobile telephone number 730 based on the user's mobile telephone number in the sender's contact information for the user. The option buttons 740 may include, for example, an option button 741 to prohibit sender-initiated mobile forwarding (e.g., messages are not to be forwarded to the mobile telephone number when the user is not signed on to the instant messaging system), an option button 742 to enable sender-initiated mobile forwarding only when the user is offline, and an option button 743 to enable sender-initiated mobile forwarding when the user is offline or when the user is signed on and away (e.g., the user is signed on to the instant messaging account and an away message is enabled for the account to provide an indication to potential message senders that the user is not available to receive a message).

The user interface 700 allows sender-initiated mobile forwarding of instant messages to a user's mobile telephone number to be controlled according to recipient preferences. Thus, when a user configures the user's instant message account to prohibit sender-initiated mobile forwarding, the host system does not send a communication to the user's mobile telephone number even when the sender has the user's mobile telephone number and the user is not available. In some implementations, the user's mobile telephone number 730 is informational only, such as when option 741 is selected to prohibit mobile forwarding.

In some implementations, the interface 700 also may include an indication as to the configuration of the user's account—e.g., whether sender-initiated mobile forwarding is prohibited, is enabled only when the user is offline, or is enabled when the user is offline or away.

Figure 8:
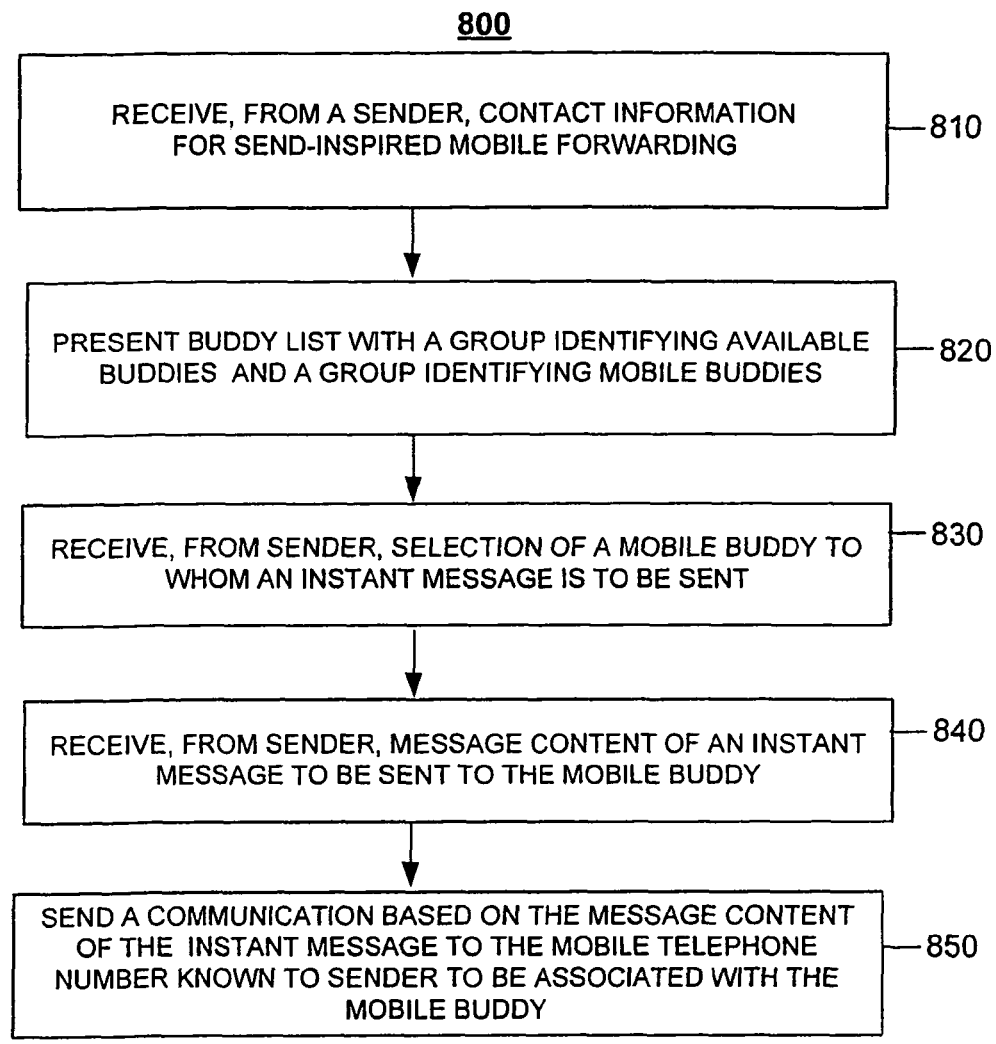

FIG. 8 shows a process 800 for forwarding an instant message, based on contact information for an intended recipient, to a mobile telephone device capable of receiving, processing, displaying and transmitting text messages. Like the process 200 of FIG. 2, the process 800 may be performed, for example, by a processor on the provider system 110 of FIG. 1 or may be performed by an instant messaging application, such as instant messaging application 107A or 107B of FIG. 1. For convenience, the processor performing the process 800 may be referred to as an instant messaging system.

The process 800 begins when a user identifies contact information for one or more instant message users, which is received by the instant messaging system (step 810). The user, who may be referred to as a sender, may do so using the interface 500 of FIG. 5 to enter an address card in an address book.

The instant messaging system presents a buddy list with a group of buddies that identifies available buddies and a group of buddies that identifies mobile buddies who are not available but for whom a mobile telephone number is known by the sender (e.g., the mobile telephone number has been entered in the sender's address book) (step 820). This may be accomplished, for example, by the instant messaging system checking whether an identity associated with each screen name on the buddy list is signed on to the instant message system and whether a mobile telephone number is known to the sender for each identity. When the identity is signed on, the identity is grouped in the available group, whereas when the identity is not signed on but a mobile telephone number is known to the sender, the identity is associated with the mobile buddies group. In some implementations, the buddy list may also present a group of buddies that are offline and for whom a mobile telephone number is not known by the sender.

In some implementations, a user may have the option of configuring a buddy list to include a buddy group that includes identities who are able to receive instant messages forwarded to a mobile device. Such a group may be referred to as a mobile buddy group or mobile buddies. For example, a user may be able to set a preference for including an identity who is able to receive instant messages forwarded to a mobile device in a mobile buddy group, or, conversely, maintaining such an identity's integration within other known buddy groups. In another example, a user may be able to configure a buddy list to include such an identity both in a mobile buddy group and another buddy group. The instant messaging system receives, from the sender, a selection of a mobile buddy to whom an instant message is to be sent (step 830). For example, the sender may select a buddy from the buddy as described previously with respect to FIG. 3.

The instant message system received, from the sender, message content of an instant message to be sent to the identified mobile buddy (step 840). For example, the sender may identify text in the message compose text box 606 of FIG. 6.

The instant message system sends a communication based on the instant message to the mobile telephone number known to the sender to be associated with the identity (step 850). This may be accomplished, for example, by preparing and forwarding a text message based on the instant message to the mobile telephone number for the identity, directly or indirectly, thorough a cellular system, as described previously with respect to FIGS. 1 and 2.

Figure 9A:
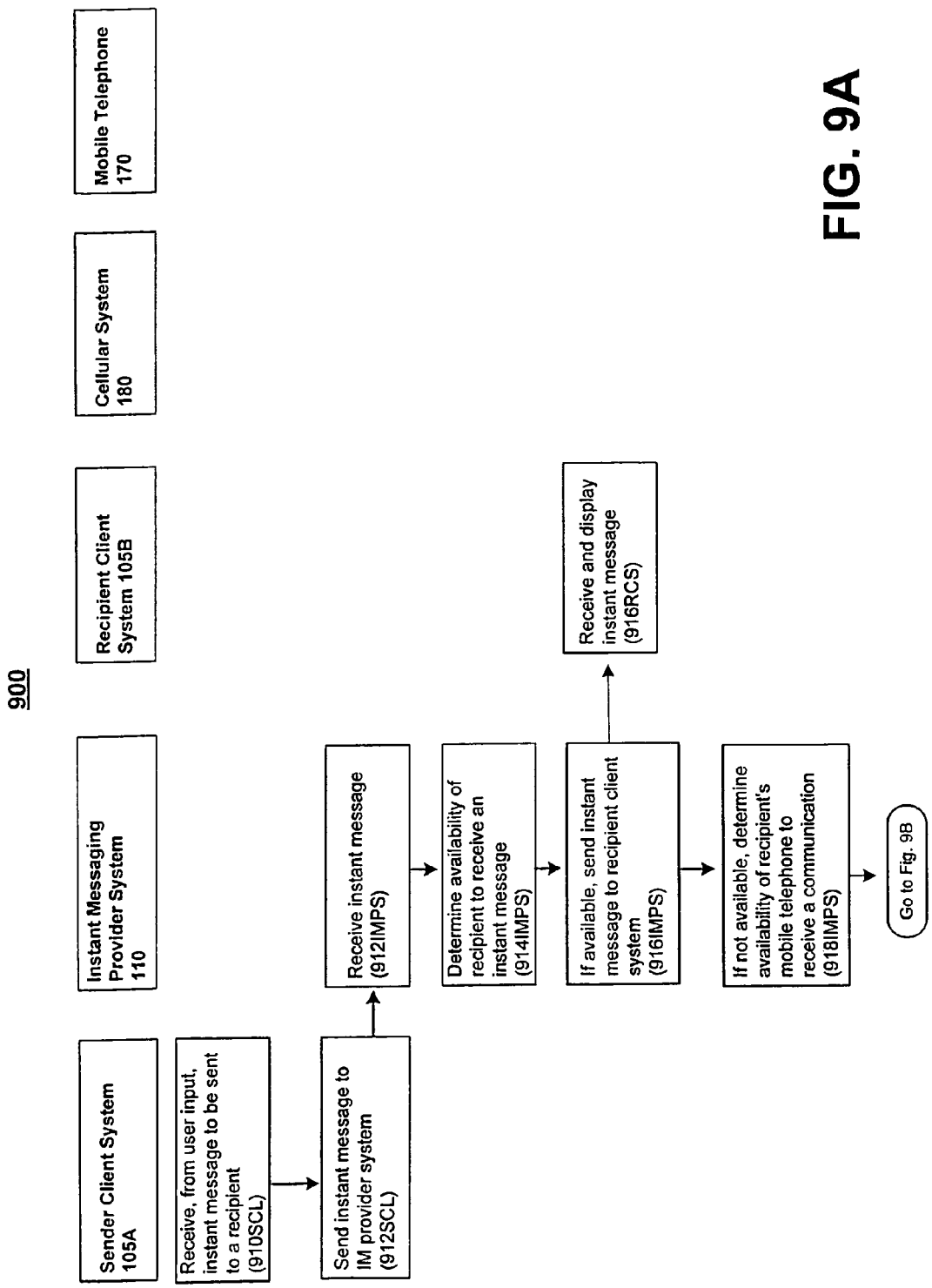
FIG. 9 is a diagram of a process for forwarding an instant message to a mobile telephone.
Figure 9B:
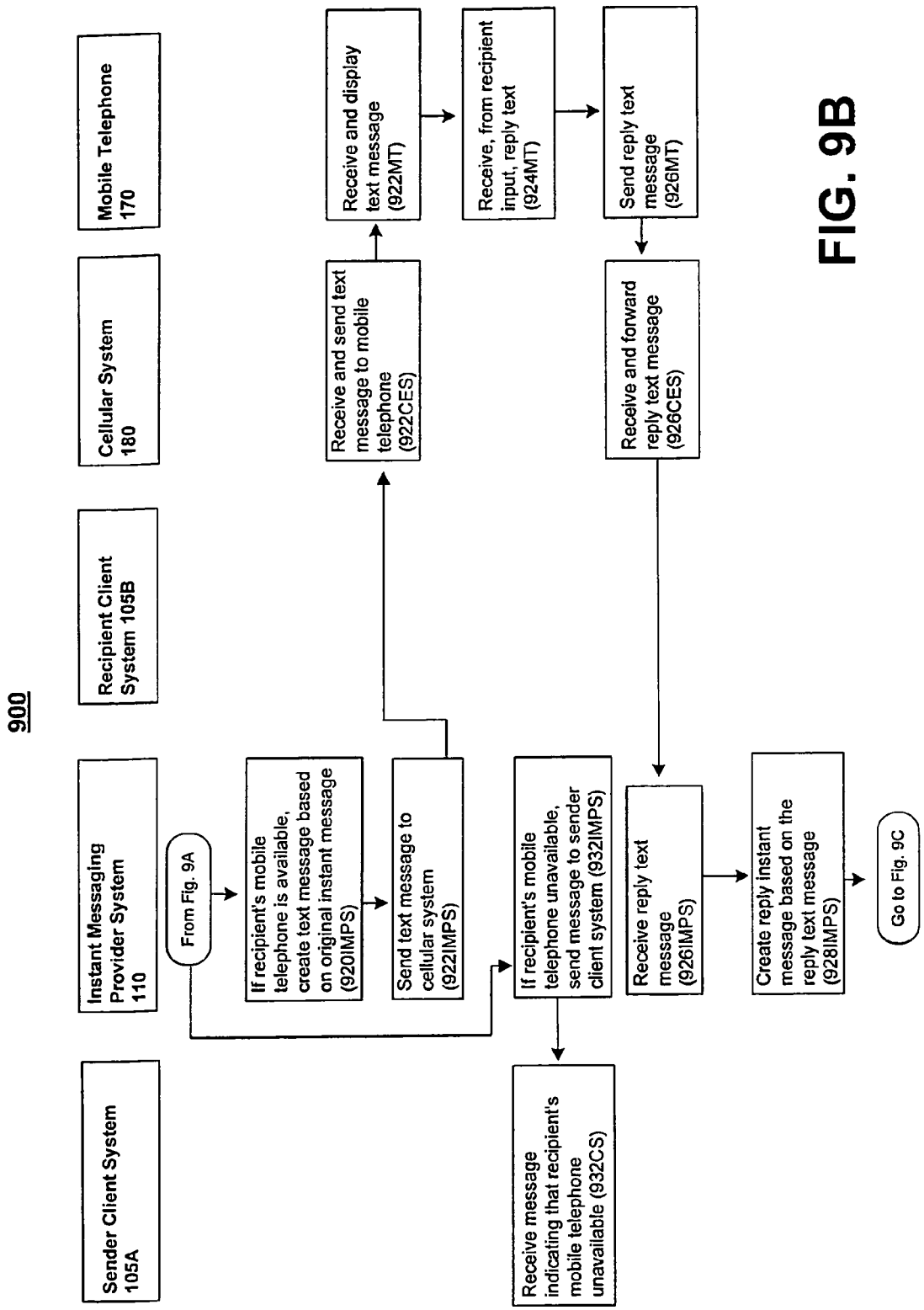

FIGS. 9A and 9B show a process 900 by which an instant message addressed to a potential recipient is forwarded to a mobile telephone 170 associated with the potential recipient and by which a reply to the instant message is returned to the instant message sender. The process 900 forwards the instant message to the mobile telephone conditioned upon the unavailability of the recipient to receive the instant message (e.g., is not signed on to the instant messaging provider system) and the availability of the recipient's mobile telephone to receive a communication. The process 900 involves a sender client system 105A, an instant messaging provider system 110, a recipient client system 105B, a cellular system 180 and a mobile telephone 170 enabled with text messaging capabilities. In general, the process 900 enables an instant message sent by the sender client system 105A and addressed to an intended message recipient to be converted into a text message based on the original instant message and forwarded to the mobile telephone 170 associated with the intended message recipient. The intended message recipient receives the text message based on the original instant message and replies to the text message using the mobile telephone 170 text messaging capability. The cellular system 180 receives the reply text message and sends it to the instant messaging provider system 110 which converts the reply text message into a reply instant message based upon the reply text message and delivers the reply instant message to the sender client system 105A.

More particularly, an instant message user associated with the sender client system 105A identifies an intended recipient of an instant message by entering the intended message recipient's screen name and enters text for the instant message, which is received by the client system 105A (step 910SCL). Other methods may exist for identifying the intended recipient of an instant message. For example, an instant message user may identify an intended recipient by selecting a screen name from the user's buddy list.

The sender client system 105A sends the instant message to the instant messaging provider system 110 (step 912SCL).

The instant messaging provider system 110 receives the instant message (step 912IMPS) and determines whether the intended recipient is available to receive an instant message (step 914IMPS). Different criteria for determining whether the intended recipient is available to receive an instant message may be used. For example, the instant messaging provider system 110 may determine that the intended recipient is unavailable to receive an instant message if the intended recipient is not signed on to the instant messaging provider system 110. Alternatively, the instant messaging provider system 110 may determine that the intended recipient is unavailable to receive an instant message if the intended message recipient is idle or away, or if they have engaged a hidden state whereupon their presence is unknown to the sender. To determine whether the intended recipient is available to receive an instant message, the instant messaging provider system 110, for example, may access presence information that identifies screen names of users who are presently signed onto the instant message provider system 110.

If the instant messaging provider system 110 determines that the intended message recipient is available to receive an instant message, the instant messaging provider system 110 sends the instant message to the recipient client system 105B associated with the intended recipient (step 916IMPS), and the recipient client system 105B receives and displays the instant message (step 916RCS).

If the intended message recipient is not available to receive an instant message, the instant messaging provider system 110 determines whether a mobile telephone 170 associated with the intended recipient is available to receive a communication (step 918IMPS). Different criteria for determining whether a mobile telephone 170 associated with the intended recipient is available to receive a communication may be used. For example, the instant messaging provider system 110 may determine that a mobile telephone 170 associated with the intended recipient is not available to receive a communication if the mobile telephone 170 is powered off, the mobile telephone 170 is not within signal range, or the mobile telephone 170 is otherwise unavailable to receive a communication. In another example, the instant messaging provider system 110 may determine that a mobile telephone 170 associated with the intended recipient is not available to receive a communication if the intended recipient prohibits message forwarding to the mobile telephone 170. In yet another example, the instant messaging provider system 110 may determine that a mobile telephone associated with the intended recipient is not available to receive a communication if the instant message sender does not know the intended recipient's mobile telephone number or if the sender is otherwise deemed unknown to the recipient or alternatively is not deemed to be known to the recipient.

Referring also to FIG. 9B, if the instant messaging provider system 110 determines that a mobile telephone 170 associated with the intended recipient is not available to receive a communication, the instant messaging provider system 110 may send a message, or some other alternative indication, to the sender indicating that a mobile telephone 170 associated with the intended recipient is not available to receive a communication (step 932IMPS). The sender may receive the message indicating that the mobile telephone 170 associated with the intended recipient is not available to receive a communication and decide to send (step 932CS) the message anyway.

In some implementations, if the mobile telephone 170 associated with the intended recipient is not available to receive a communication, the instant messaging provider system 110 may still create a text message based on the original instant message (step 920IMPS). The instant messaging provider system 110 may store the text message for later delivery to the mobile telephone 170 when the mobile telephone 170 is available or to the user at the user's IM address if the user becomes available for receipt at the user's IM address before becoming available for text message delivery at the user's mobile telephone 170. Such operation is tantamount to a conditional "pounce" feature, where message delivery awaits a user and the delivery mechanism to be used for message delivery is made conditioned upon factors such as the first of at least two systems to become available, where a first system is instant message availability and a second system is mobile telephone availability. The instant messaging provider system 110 may send periodic queries to the cellular system 180 to determine when the mobile telephone 170 is available to receive the stored test message.

Alternatively or additionally, the instant messaging provider system 170 may send the text message to the cellular system 180 (step 922IMPS), which stores the text message for later delivery when the mobile telephone is available to receive a text message.

If the instant messaging provider system 110 determines that a mobile telephone 170 associated with the intended recipient is available to receive a communication, the instant messaging provider system 110 creates a text message based on the original instant message (step 920IMPS) and sends the text message to the cellular system 180 (step 922IMPS).

The cellular system 180 receives the text message from the instant messaging provider system 110 and sends the text message to the mobile telephone 170 associated with the intended recipient (step 922CES). The mobile telephone 170 receives and displays the text message to the intended message recipient (step 922MT).

Figure 9C:
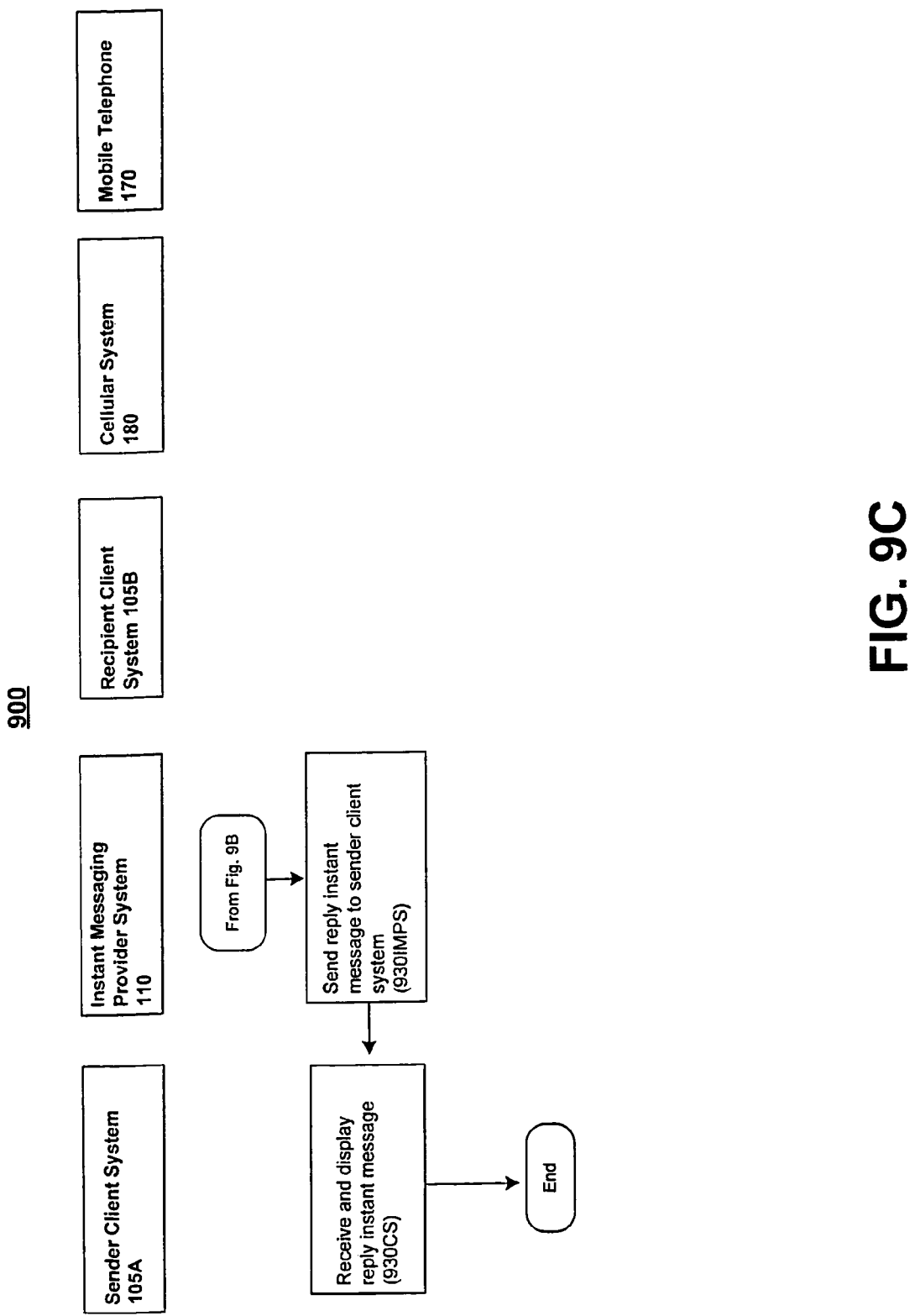

The intended message recipient may reply to the text message. If the intended message recipient replies to the text message, the mobile telephone 170 receives reply text (step 924MT) and sends the reply text message to the cellular system 180 (step 926MT). The cellular system 180 receives the reply text message and forwards the reply text message to the instant messaging provider system 110 (step 926CES). The instant messaging provider system 110 receives the reply text message (step 926IMPS) and creates a reply instant message based on the reply text message (step 928IMPS). Referring also to FIG. 9C, the instant messaging provider system 110 sends the reply instant message to the sender client system 105A (step 930IMPS) and the sender client system 105A receives and displays the reply instant message (step 930CS).

In some implementations, even if the intended message recipient is available to receive an instant message and the instant messaging provider system 110 sends the instant message to the recipient client system 105B, the instant messaging provider system 110 may also determine whether a mobile telephone 170 associated with the intended recipient is available to receive a communication and send a text message based on the instant message to the mobile telephone 170.

In some implementations, the mobile telephone 170 may determine whether the sender is still available to receive a reply to the text message delivered to the mobile telephone 170. This may be particularly useful in scenarios in which there has been a delay between the time when the original instant message was sent and the time when the text message was delivered.

Figure 10:
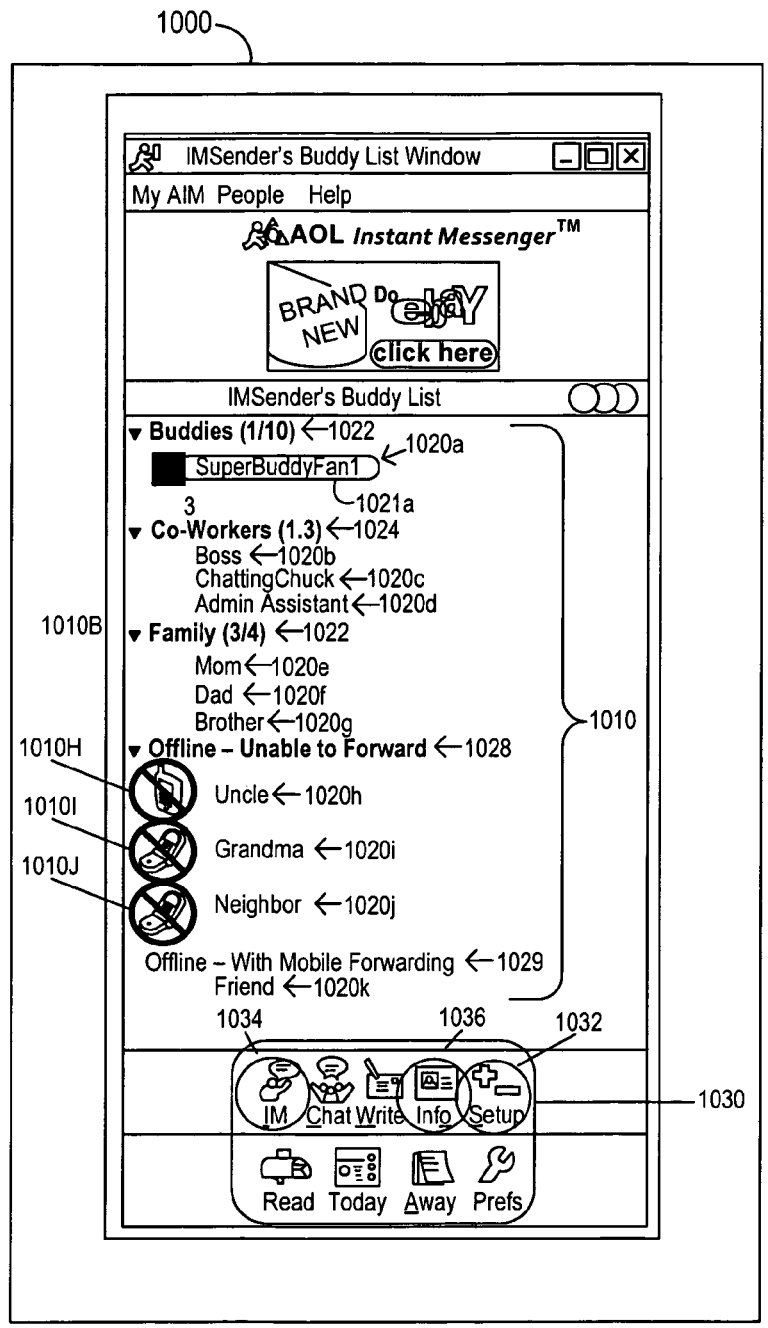
FIG. 10 is an illustration of an exemplary interface showing a buddy list that identifies buddies for whom a mobile telephone number is known to the instant messaging identity associated with the buddy list but for whom message forwarding is not available.

Referring to FIG. 10, a graphical user interface 1000 displays a buddy list for an instant messaging identity (e.g., an instant message sender) where the buddy list identifies buddies for whom a mobile telephone number is known to the instant messaging identity (e.g., the instant message sender) but for whom message forwarding is not available. In general, the buddy list includes an Offline group that indicates buddies for visually distinguishes buddies who are offline and whose mobile telephones are unable to receive a communication, who have prohibited forwarding of instant messages, or otherwise are not able to receive instant messages forwarded to a mobile telephone.

More particularly, the graphical user interface 1000 includes a buddy list 1010 of screen names 1020a-1020k. As shown, the buddy list 1010 has four groups, Buddies 1022, Co-Workers 1024, Family 1026 and Offline—Unable to Forward 1028. SuperBuddyFan1 1020a belongs to the Buddies group 1022. Boss 1020b, ChattingChuck 1020c, and Admin Assistant 1020d each belong to the Co-Workers group 1024. Mom 1020e, Dad 1020f and Brother 1020g each belong to the Family group 1026.

The Offline—Unable to Forward group 1028, in contrast with the heading offline 328 of FIG. 3, visually distinguishes buddies who are offline and whose mobile telephones are unable to receive a communication, who have prohibited forwarding of instant messages, or otherwise are not able to receive instant messages forwarded to a mobile telephone.

As shown, the Offline group—Unable to Forward 1028 includes Uncle 1020*h*, Grandma 1010*i* and Neighbor 1020*j*. A mobile blocking indicator 1010H indicates that a mobile telephone associated with the identity associated with the screen name 1020*h* is unable to receive a communication (e.g., the mobile telephone is turned off or out of signal range). The mobile blocking indicator 1010H may be referred to as a device-based mobile blocking indicator.

The buddy list 1010 includes mobile blocking indicators 1010I and 1010J, which indicate that the identity associated with the screen name 1020*i*, or 1020*j*, respectively, prohibits forwarding of instant messages to the identity's mobile telephone. The mobile blocking indicators 1010I and 1010J each may be referred to as a recipient-based mobile blocking indicator.

The device-based mobile blocking indicator 1010H is shown with a different presentation style from the presentation style of the recipient-based mobile blocking indicators 1010I and 1010J. The use of different presentation styles may inform as to the reason instant messages are not to be forwarded (e.g., a mobile telephone is unable to receive a text message in contrast to a recipient blocking receipt of text messages).

In some implementations, the Offline—Unable to Forward group 1028 may include one or more buddies for whom the sender has indicated instant messages are not to be forwarded.

The buddy list 1010 also includes an offline heading 1029 that includes one or more buddies who are offline (e.g., when a buddy's instant message client program is not able to receive communications) and for whom mobile forwarding is enabled. As shown, Friend 1020*k* is offline and believed to be able to receive messages forwarded to a mobile telephone.

The use of the Offline—Unable to Forward group 1029 and an offline heading 1029 may visually distinguish buddies who are offline and to whom instant messages are not forwarded (e.g., a buddy in an Offline group) from buddies who are offline and to whom instant messages are to be forwarded (e.g., a buddy who appears in association with an offline heading). That distinction may be useful, for example, when a substantial number of buddies on a buddy list have mobile forwarding enabled or when a buddy list does not display mobile forwarding indicators, such as the mobile indicator 310A or mobile indicator 310B, both of FIG. 3.

A determination to display mobile blocking indicator 1010I or 1010J may be made when a determination is made that the identity associated with the screen name 1020*i* (i.e., Grandma) or 1020*j* (i.e., Neighbor) is Offline and/or is idle. For example, when the identity signs off of the host system providing the instant messaging service, the host system may determine whether the identity prohibits forwarding of instant messages to the identity's mobile telephone. To do so, for example, the host system may check configuration information associated with the screen name 1020*i* or 1020*j* and make a determination based on the configuration information.

When the host system determines that forwarding of instant messages is prohibited by the identity associated with the screen name 1020*i* (i.e., Grandma) or 1020*j* (i.e., Neighbor), the host system may make that determination available to the client system or may make available an updated buddy list that includes the recipient-based mobile blocking indicator 1010I or 1010J. This may be accomplished, for example, by sending the updated buddy list, sending a message that indicates the identity associated with the screen name prohibits forwarding of instant messages, or otherwise pushing the buddy list or determination to the client system that displays the buddy list 1010. In another example, the host system enables the client system to access the updated buddy list with the mobile blocking indicator 1010I or 1010J or the determination that a recipient-based mobile blocking indicator 1010I or 1010J is appropriate, or the host otherwise enables the client system to pull the updated buddy list or determination that a recipient-based mobile block indicator 1010I or 1010J is appropriate from the host system.

A determination to display mobile blocking indicator 1010H may be made when a determination is made that the identity associated with the screen name 1020*h* (i.e., Uncle) is offline and/or is idle. For example, when the identity signs off of the host system providing the instant messaging service, the host system may determine whether a mobile telephone associated with the identity is available to receive a communication. To do so, for example, the host system may query the cellular system 180 to determine whether the identity's mobile telephone is turned off, not within signal range, or otherwise unable to receive a text message.

When the host system determines that a mobile telephone associated with the identity associated with the screen name 1020*h* (i.e., Uncle) is unavailable to receive a communication, the host system may make that determination available to the client system or may make available an updated buddy list that includes the device-based mobile blocking indicator 1010H. This may be accomplished, for example, by sending the updated buddy list, sending a message that indicates that a mobile telephone associated with the identity is unavailable to receive a communication, or otherwise pushing the buddy list or determination to the client system that displays the buddy list 1010. In another example, the host system enables the client system to access the updated buddy list with the device-based mobile blocking indicator 1010H or the determination that a device-based mobile blocking indicator 1010H is appropriate, or the host otherwise enables the client system to pull the updated buddy list or determination that a device-based mobile blocking indicator 1010H is appropriate from the host system.

The buddy list window 1000 also includes controls 1030 that a user may use to initiate functions related to instant messaging. As illustrated, the controls 1030 include a setup control 1032, an instant messaging control 1034 and an info control 1036.

Figure 11A:
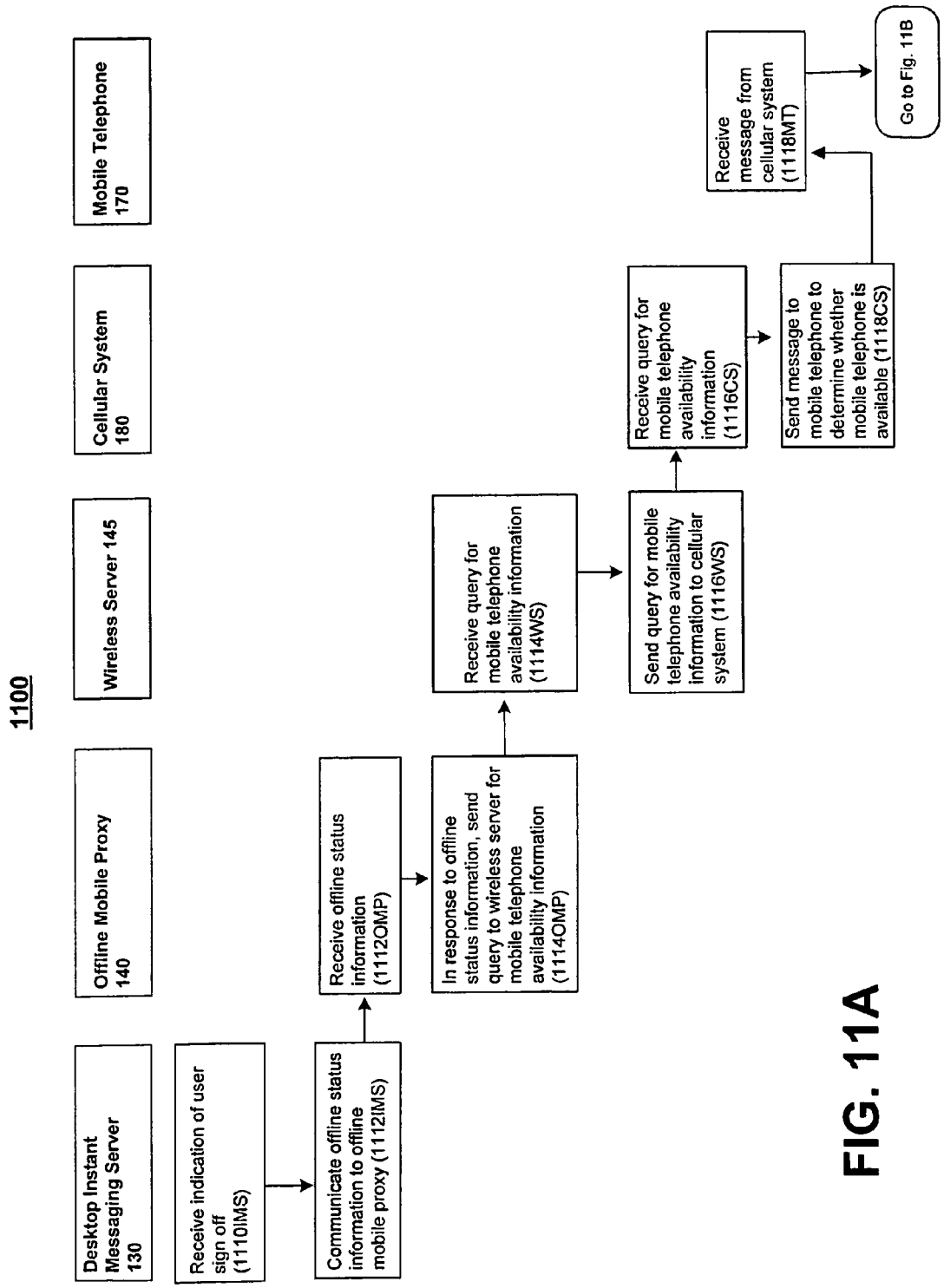
FIG. 11 is a diagram of a process for updating on-line presence information in a buddy list window based on a determination of the availability of a mobile telephone associated with a potential message recipient to receive a communication.
Figure 11B:
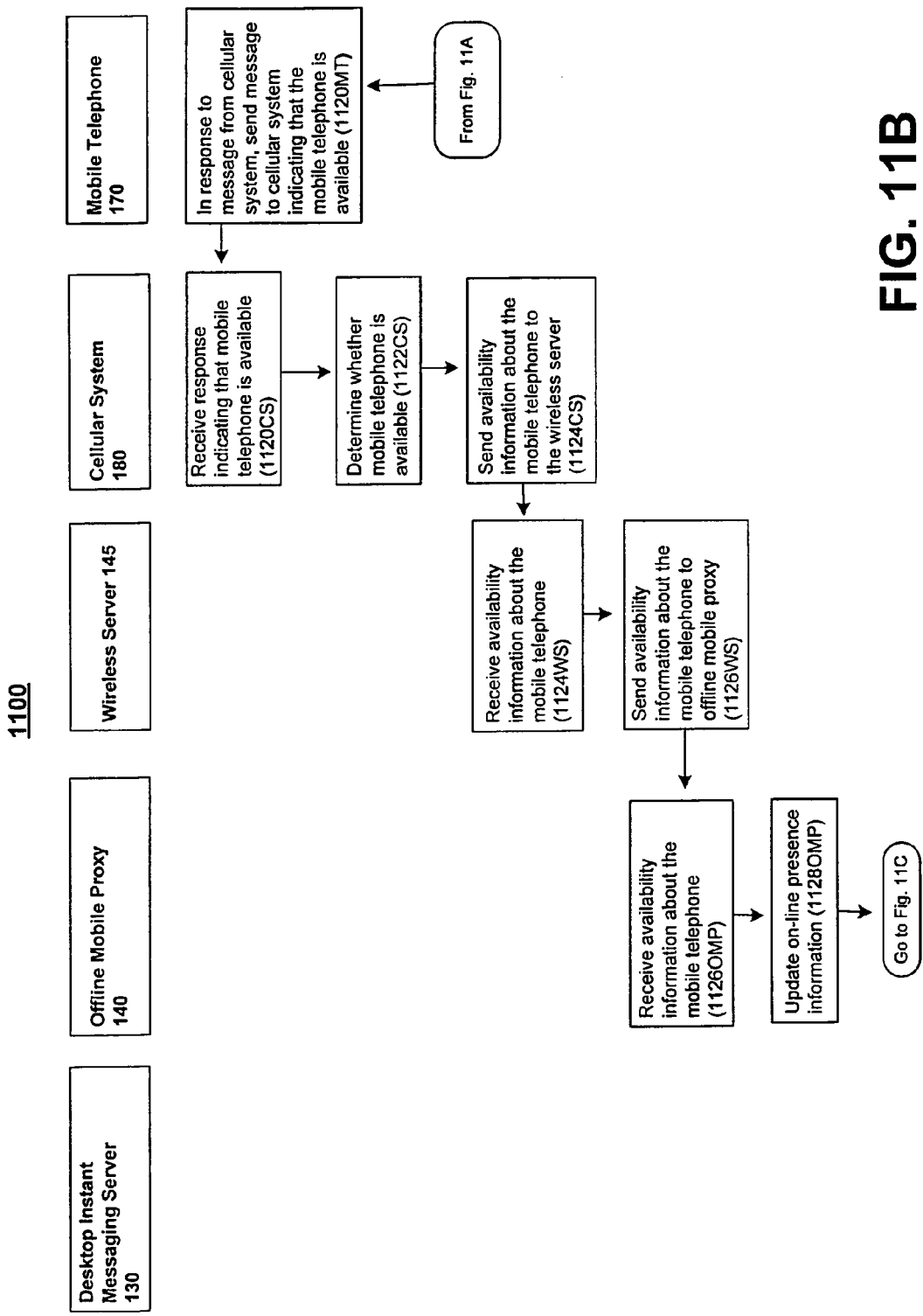
Figure 11C:
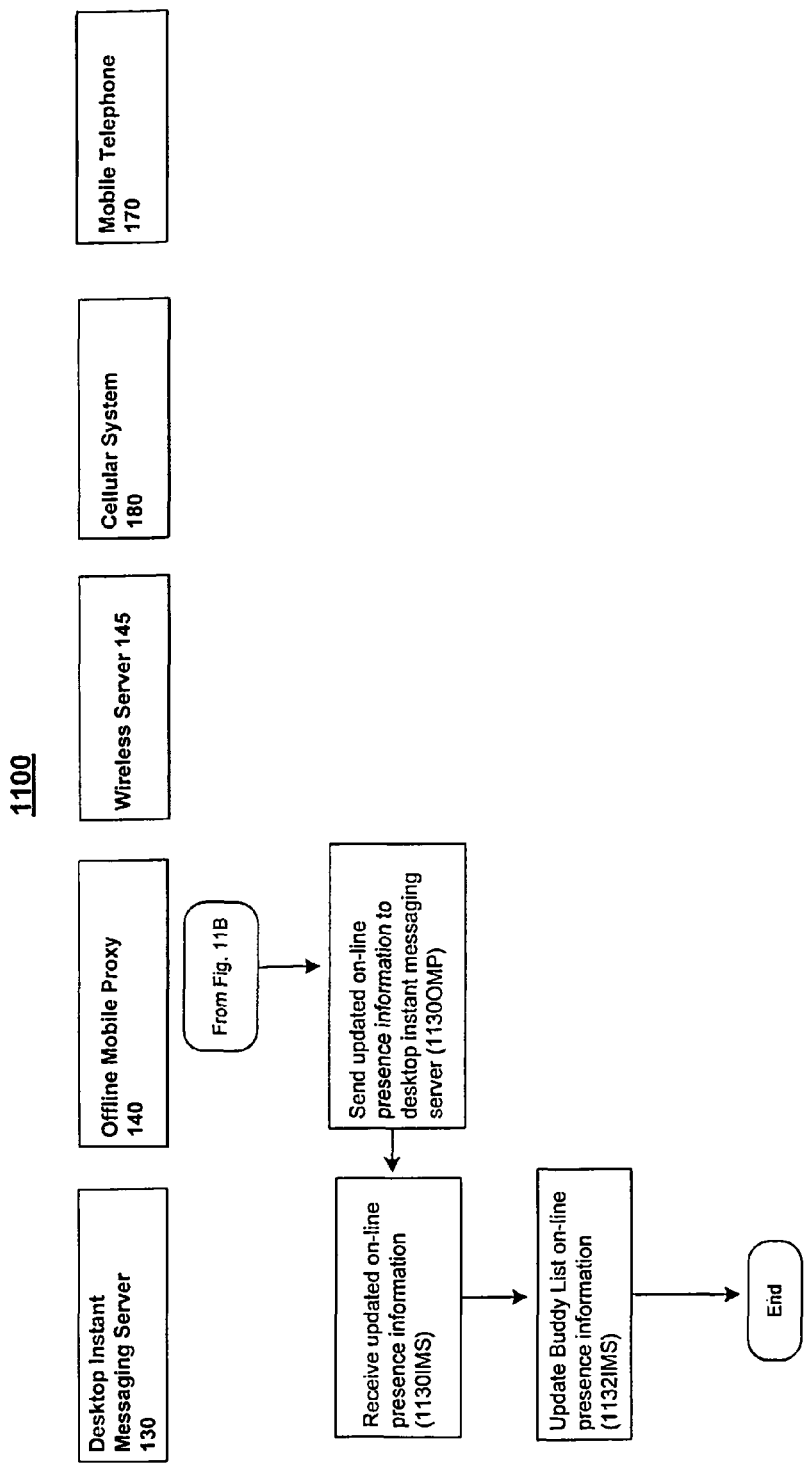

FIGS. 11A-11C show a process 1100 by which the on-line presence information of a buddy list window 1000 is updated to reflect the availability of a mobile telephone 170 associated with a potential message recipient to receive a text communication. The process 1100 involves a desktop instant messaging server 130, an offline mobile proxy 140, a wireless server 145, a cellular system 180 and a mobile telephone 170. In general, the process 1100 queries the cellular system 180 for mobile telephone availability information and, in response, the cellular system 180 determines whether the mobile telephone 170 is available to receive a communication. The cellular system 180 sends the availability information to the offline mobile proxy 140, which causes the desktop instant messaging server 130 to update the on-line presence information of buddy lists that include a screen name of an identity associated with the mobile telephone 170.

More particularly, the desktop instant messaging server 130 receives an indication that an instant message user, who is associated with the mobile telephone 170, has signed off, or is signing off from the instant message system (step 1110IMS).

The desktop instant messaging server 130 communicates the offline status of a potential message recipient to the offline mobile proxy 140 (step 1112IMS). The offline mobile proxy 140 receives the offline status of a potential message recipient (step 1112OMP) and determines whether a mobile telephone 170 associated with the potential message recipient is available to receive a communication. In one example, the offline mobile proxy may make the determination of whether a mobile telephone 170 associated with the potential message recipient is available to receive a communication based on whether the instant message user knows the potential message recipient's mobile telephone number. In another example, the offline mobile proxy 140 may make the determination of whether a mobile telephone 170 associated with the potential message recipient is available to receive a communication based on whether the potential message recipient prohibits message forwarding to the potential message recipient's mobile telephone 170. In a third implementation, the offline mobile proxy 140 initiates a query to determine whether a mobile telephone associated with the potential message recipient is available to receive a communication. In particular, the offline mobile proxy 140 sends a query for mobile telephone availability information to the wireless server 145 (step 1114OMP).

The wireless server 145 receives the query for mobile telephone availability information from the offline mobile proxy 140 (step 1114WS) and forwards the query to the cellular system 180 (step 1116WS). The cellular system 180 receives the query for mobile telephone availability information (step 1116CS) and sends a message to the mobile telephone 170 associated with the potential message recipient to determine whether the mobile telephone 170 is available (step 1118CS).

If the mobile telephone 170 associated with the potential message recipient is available to receive a communication (e.g., is powered on and within signal range), the mobile telephone receives the message (step 1118MT). Referring also to FIG. 11B, in response to the message from the cellular system 180, the mobile telephone 170 sends to the cellular system 180 a message indicating that the mobile telephone is available to receive a communication (step 1120MT). The cellular system 180 receives the response from the mobile telephone 170 (step 1120CS). If the mobile telephone 170 associated with the potential message recipient is not available to receive a communication (e.g., is not powered on or is not within signal range), the mobile telephone 170 does not receive the message from the cellular system 180, and, consequently, the cellular system 180 does not receive a response from the mobile telephone 170.

The cellular system 180 determines whether the mobile telephone 170 is available to receive a communication (step 1122CS). Based on a response from the mobile telephone 170, the cellular system 180 determines that the mobile telephone is available to receive a communication. Alternatively, if the cellular system 180 does not receive a response from the mobile telephone 170 after a predetermined amount of time has passed since the message was sent to the mobile telephone, the cellular system 180 determines that the mobile telephone is unavailable to receive a communication. Alternatively or additionally, the mobile telephone 170 may send periodic availability indications to the cellular system 180 indicating that the mobile telephone 170 is available to receive a communication when the mobile telephone 170 is powered on, within signal range, and otherwise available to receive a communication. The cellular system 180 is able to determine whether the mobile telephone 170 is available to receive a communication based upon the most recently received availability indication from the mobile telephone 170.

The cellular system 180 sends to the wireless server 145 availability information about the mobile telephone 170 (step 1124CS). The wireless server 145 receives the availability information from the cellular system (step 1124WS) and forwards the availability information to the offline mobile proxy 140 (step 1126WS). The offline mobile proxy 140 receives the availability information (step 1126OMP) and, in response, updates the on-line presence information of the potential message recipient associated with the mobile telephone 170 (step 1128OMP). For example, if the mobile telephone 170 associated with the potential message recipient is available to receive a communication, the offline mobile proxy 140 updates the on-line presence information of the potential message recipient to indicate that the potential message recipient is available. If the mobile telephone 170 associated with the potential message recipient is not available to receive a communication, the offline mobile proxy 140 updates the on-line presence information of the potential message recipient to indicate that the potential message recipient is unavailable (step 1128 OMP). Referring also to FIG. 11C, the offline mobile proxy 140 sends the updated on-line presence information to the desktop instant messaging server 130 (step 1130OMP).

The desktop instant messaging server 130 receives the updated on-line presence information (step 1130IMS) and updates the on-line presence information of the buddy list window 1000 accordingly. If the updated on-line presence information indicates that the potential message recipient is available, the desktop instant messaging server 130 may update the on-line presence information of the buddy list window 1000 to indicate that the potential message recipient is available. Several different mechanisms for updating the on-line presence information of the buddy list to reflect that the intended message recipient is available may exist. For example, the identity associated with the potential message recipient may be displayed under the name or representation of the buddy group to which the potential message recipient belongs. Additionally, or alternatively, a mobile indicator may be displayed adjacent to the identity associated with the potential message recipient.

If the updated on-line presence information indicates that the potential message recipient is unavailable, the desktop instant messaging server 130 may update the on-line presence information of the buddy list to indicate that the potential message recipient is unavailable. Several different mechanisms for updating the on-line presence information of the buddy list to reflect that the intended message recipient is unavailable may exist. For example, the identity associated with the potential message recipient may be displayed under the Offline group 1028 in the buddy list window 1000. Alternatively, a mobile blocking indicator, such as a device-based mobile blocking indicator, may be displayed adjacent to the identity associated with the potential message recipient in the buddy list window.

As illustrated in FIGS. 11A-C, the process 1100 for updating the on-line presence information of a buddy list window 1000 to reflect the availability of a mobile telephone 170 associated with a potential message recipient to receive a text message may be triggered by the user associated with the mobile telephone 170 signing off of the instant message system. After the user associated with the mobile telephone 170 has signed off, the process 1100 may be repeated periodically to determine the availability of the mobile telephone 170.

Figure 12A:
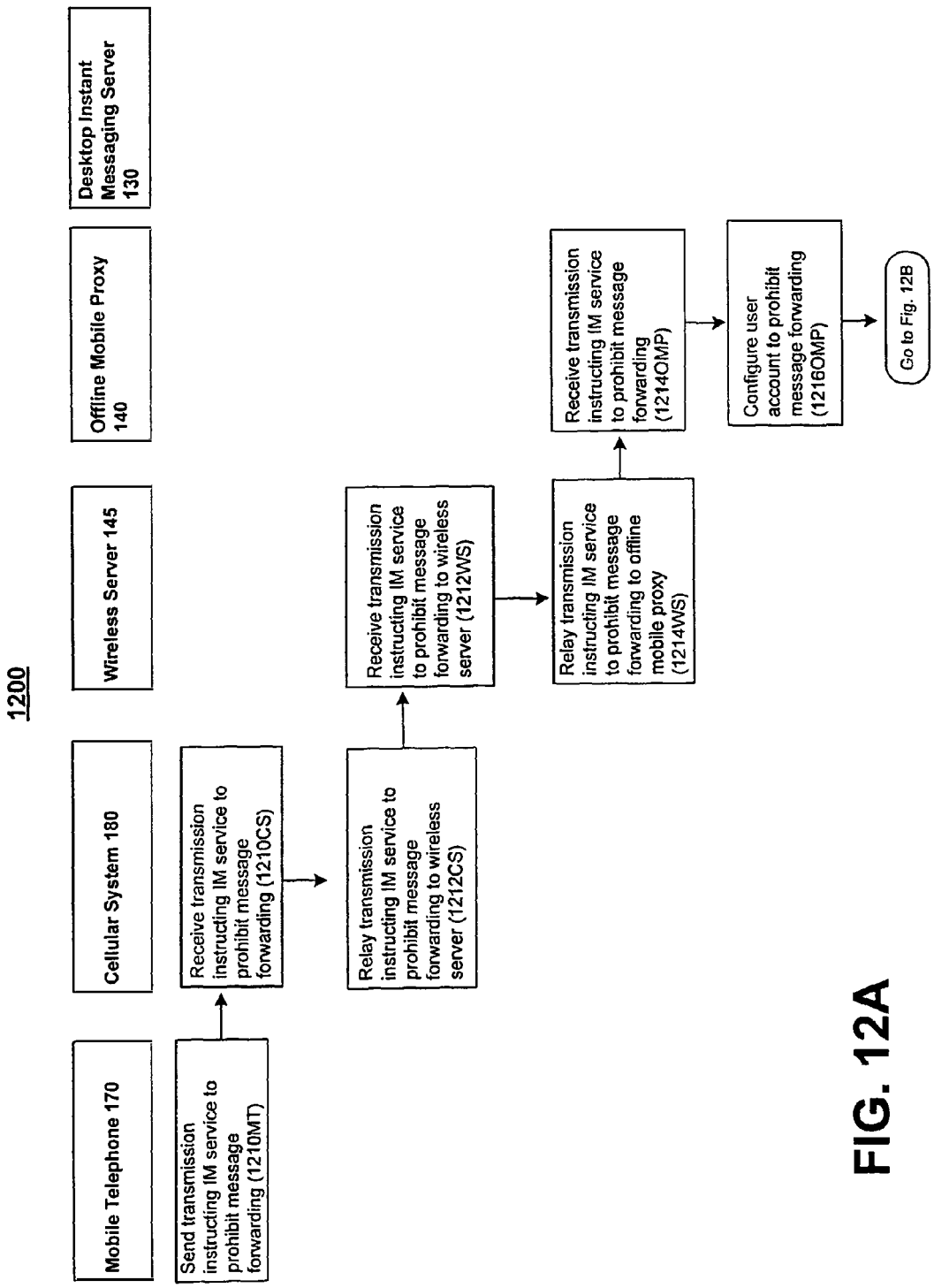
FIG. 12 is a flow chart of a process for using a mobile telephone to instruct an instant messaging service to prohibit forwarding of instant messages to the mobile telephone.
Figure 12B:
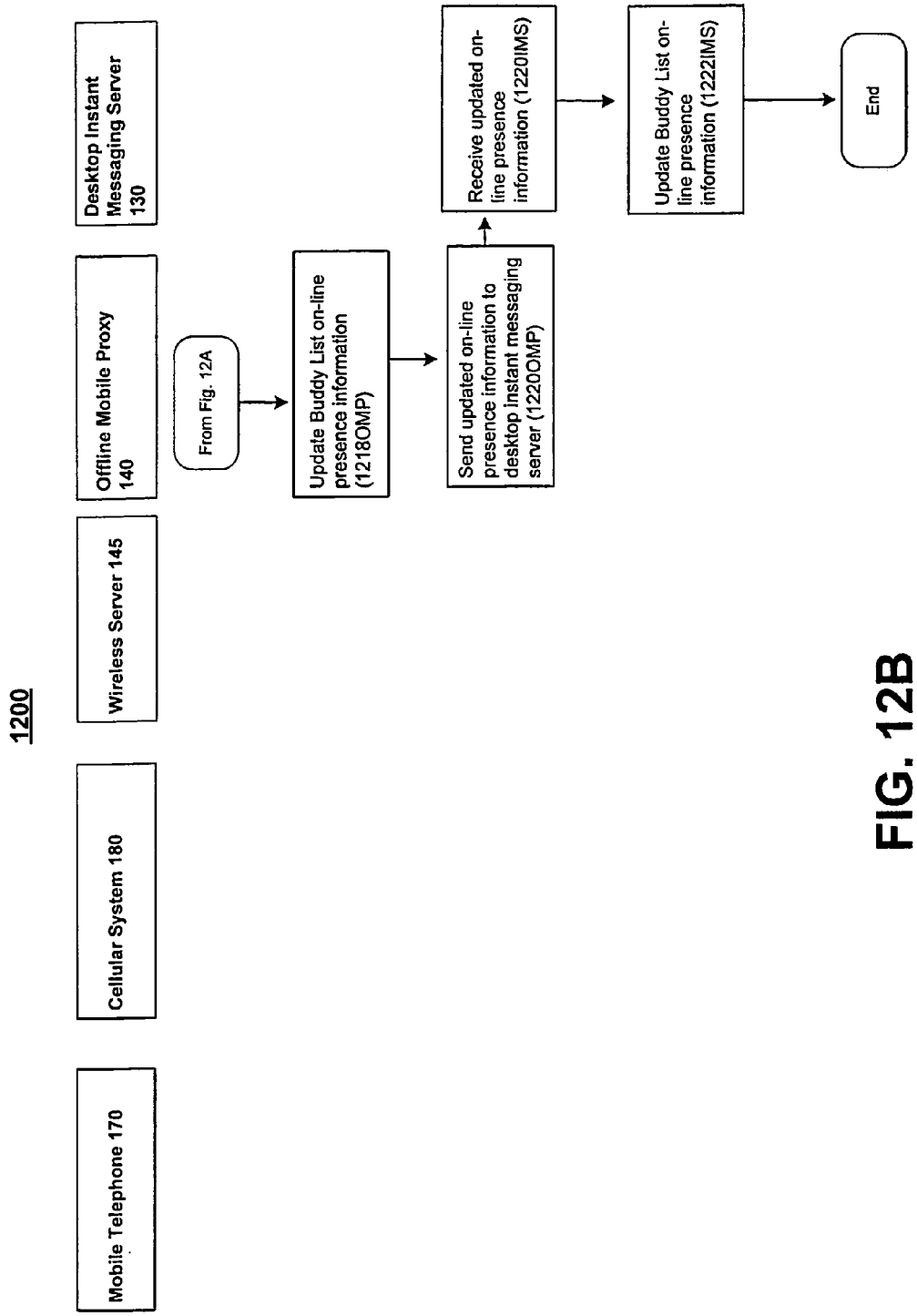

FIGS. 12A and 12B show a process 1200 by which a mobile telephone user can use a mobile telephone 170 to configure an instant messaging service so as to prohibit the forwarding of instant messages to the mobile telephone 170 from the instant messaging service. The process 1200 involves a mobile telephone 170, a cellular system 180, a wireless server 145, an offline mobile proxy 140 and a desktop instant messaging server 130. In general, the process 1200 enables the user of a mobile telephone to send a transmission from the mobile telephone 170 to the cellular system 180, in which the transmission indirectly instructs the instant messaging service to prohibit the forwarding of instant messages to the mobile telephone 170. The cellular system 180 receives the transmission from the mobile telephone 170 and forwards the instruction to the wireless server 145, which relays the instruction to the offline mobile proxy 140. The offline mobile proxy configures the mobile telephone user's instant messaging service user account so as to prohibit the forwarding of instant messages to the mobile telephone 170 from the instant messaging service. The offline mobile proxy also causes the mobile telephone user's online presence information to be updated based upon the mobile telephone user's instruction to prohibit the forwarding of instant messages to the mobile telephone 170 from the instant messaging service.

More particularly, referring to FIG. 12A, the mobile telephone user causes the mobile telephone 170 to send a transmission to the cellular system 180 instructing the instant messaging service to prohibit the forwarding of instant messages to the mobile telephone 170 from the instant messaging service (step 1210MT). The instruction may be to prohibit the forwarding of instant messages to the mobile telephone 170 from the instant messaging service irregardless of the sender of the instant message, or, alternatively, the instruction may be to prohibit the forwarding of instant messages to the mobile telephone 170 from the instant messaging service when the messages are sent by one or more particular users of the instant messaging service.

The cellular system 180 receives the transmission instructing the instant messaging service to prohibit the forwarding of instant messages to the mobile telephone 170 (step 1210CS) and relays the instruction to the wireless server 145 (step 1212CS). The wireless server 145 receives the transmission instructing the instant messaging service to prohibit the forwarding of instant messages to the mobile telephone 170 (step 1212WS) and relays the instruction to the offline mobile proxy 140 (step 1214WS). The offline mobile proxy 140 receives the transmission instructing the instant messaging service to prohibit the forwarding of instant messages to the mobile telephone 170 (step 1214OMP) and, in response, configures the user's account (i.e., the mobile telephone user's instant messaging service account) to prohibit the forwarding of instant messages to the mobile telephone 170 (step 1216OMP). Based on the instruction, the offline mobile proxy 140 may configure the user's account so as to prohibit the forwarding of all instant messages from the instant messaging service to the mobile telephone 170, or the offline mobile proxy 140 may configure the user's account so as to prohibit the forwarding of instant messages sent by particular users of the instant messaging service.

Referring also to FIG. 12B, after configuring the user's account to prohibit the forwarding of instant messages to the mobile telephone 170, the offline mobile proxy 140 updates the user's on-line presence information (step 1218OMP) and sends the updated on-line presence information to the desktop instant messaging server 130 (step 1220OMP). The desktop instant messaging server 130 receives the updated on-line presence information (step 1220IMS) and updates the on-line presence information of the mobile telephone user in the buddy list window 1000 (step 1222OMP).

Several different mechanisms for updating the on-line presence information of the buddy list window 1000 to reflect that the mobile telephone user has instructed the instant messaging service to prohibit the forwarding of instant messages to the mobile telephone 170 exist. For example, a mobile blocking indicator may be displayed adjacent to the identity associated with the mobile telephone user in the buddy list window 1000. Alternatively, the identity associated with the mobile telephone user may be displayed under the Offline group 1028 in the buddy list window 1000.

Figure 13:
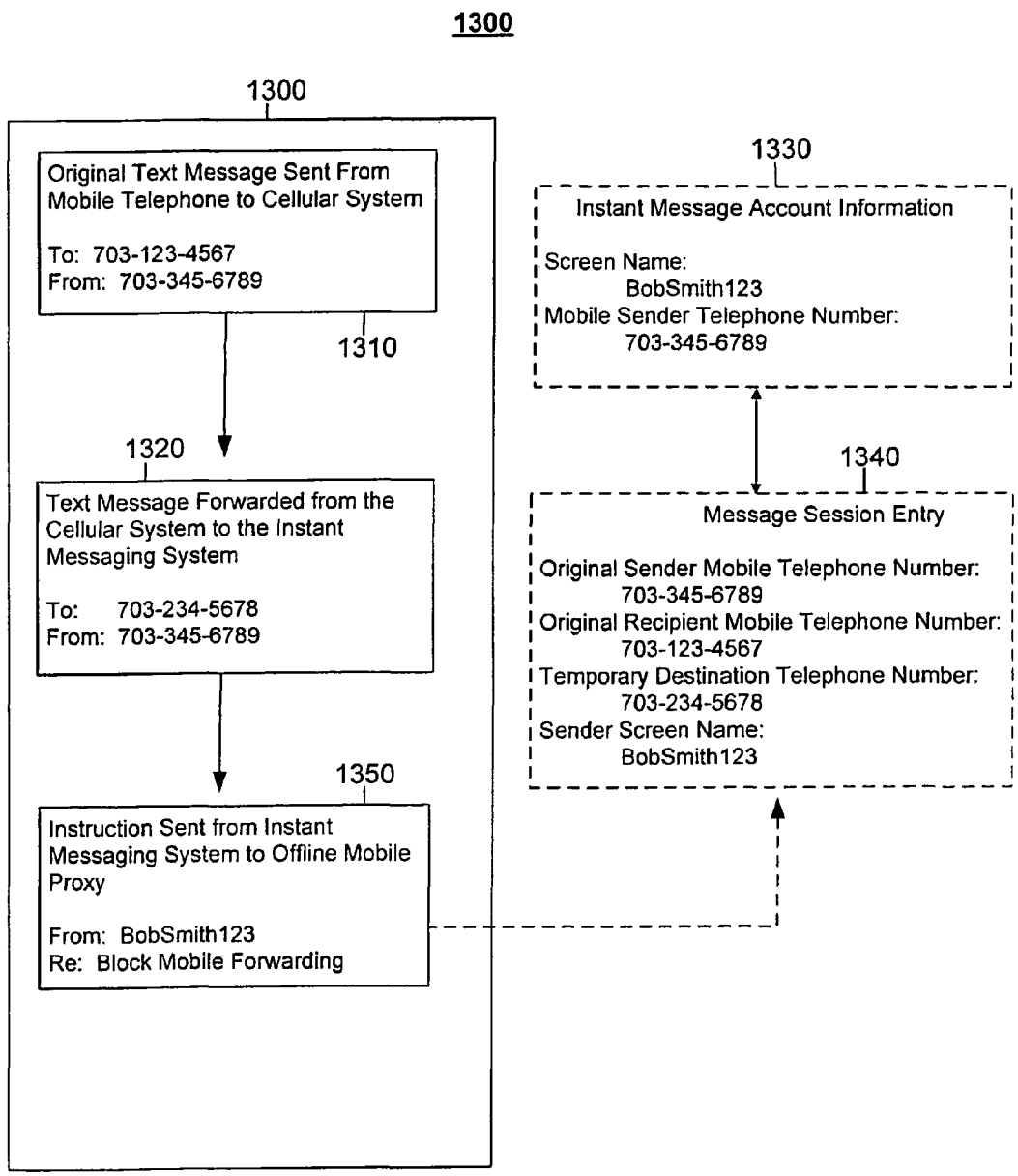
FIG. 13 is an illustration of exemplary transmissions that may be sent from a mobile telephone to an instant messaging service to prohibit the forwarding of instant messages to the mobile telephone.

FIG. 13 illustrates a flow 1300 of exemplary transmissions that may be sent, for example, according to the process 1200 of FIGS. 12A-12B, to instruct the instant messaging service to prohibit the forwarding of instant messages to a mobile telephone.

The flow 1300 includes a message 1310 that represents an original text message sent by a sender from a mobile telephone having the telephone number 703-345-6789 to the telephone number 703-123-4567.

The telephone number 703-123-4567 may be assigned to the instant messaging service and the instant messaging service may have enabled call forwarding to the temporary destination telephone number 703-234-5678, as shown in message 1320. The message 1320 is forwarded from the cellular system to the instant messaging system.

The instant messaging system receives the message 1320. Based on the mobile telephone number from which the original message was sent, the instant messaging system is able to identify the instant message account information 1330 and screen name BobSmith123 associated with the mobile telephone number from which the original message 1310 was sent. The instant messaging system creates a message session entry 1340 identifying the mobile telephone number of the sender of the original message 1310, the mobile telephone number to which the original message 1310 was sent, the temporary destination telephone number, and the screen name BobSmith123 associated with the mobile telephone number from which the original message 1310 was sent. The message session entry 1340 and the instant message account information 1330 are not part of the message flow 1300 but are used to create and process messages in the flow 1300.

The flow also includes a message 1350 that represents an instruction generated by the instant message system based on the message 1320 and the identified screen name BobSmith123 associated with the mobile telephone number from which the original message 1310 was sent. The instruction 1340 is directed to the offline mobile proxy 140 and identifies the screen name BobSmith123 associated with the mobile telephone number from which the original message 1310 was sent as the sender. The message 1350 instructs the offline mobile proxy 140 to prohibit the forwarding of instant messages to the mobile telephone number associated with the screen name BobSmith123. The offline mobile proxy 140 receives the message 1350 and configures the instant message account associated with the screen name BobSmith123 to prohibit the forwarding of instant messages to the mobile phone associated with BobSmith123's instant message account.

Figure 14:
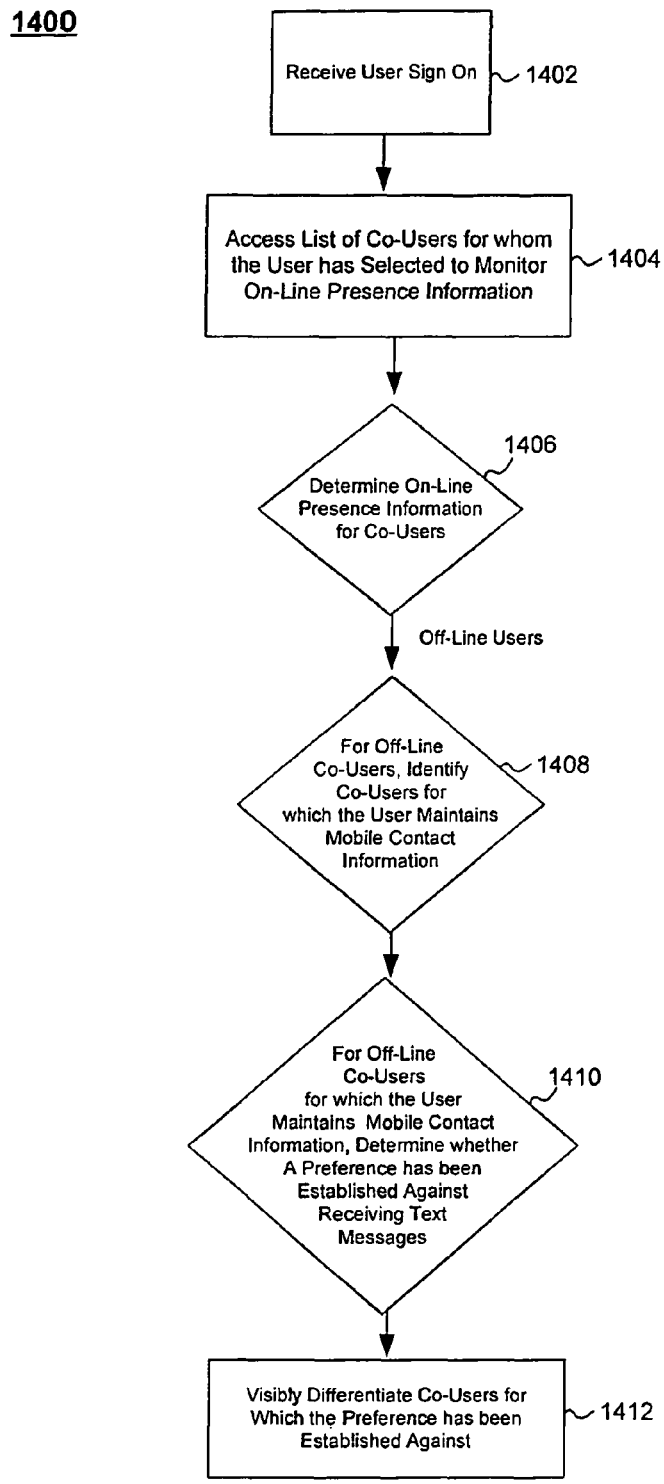
FIG. 14 is a flow chart of a process for updating the on-line presence information for a list of co-users.

Referring to FIG. 14, an example of a process 1400 for updating the on-line presence information for a list (e.g., participant list) of co-users (e.g., instant message identities) is illustrated. The process is initiated upon receipt of a user (e.g., instant message identity) sign on (e.g., submission of identification and/or authentication parameters to enable on-line presence) (step 1402). A list of co-users for whom the user has selected to monitor on-line presence information is accessed (step 1404) and the on-line presence information for the co-users is determined (step 1406). Co-users that are determined to be on-line may be populated to the co-user list, likely within categories shown by the list, as able to receive messages. For co-users determined to be off-line, co-users for which the user maintains contact information (e.g., mobile telephone number within the user's address book) are identified (step 1408). For each off-line co-user for which the user maintains contact information, it is determined whether a preference has been established against receiving text messages (e.g., SMS messages) based on electronic messages (e.g., instant messages) (step 1410). The co-users for which the preference against receiving text messages is established are visibly differentiated from the co-users for which the preference against receiving text messages has not been established (step 1412). For example, co-users for which the preference against has been established may be populated to an offline user category (e.g., such as shown at 328 of FIG. 3) or to a co-user category that visibly reflects the preference against (e.g., such as that shown at 310*c* of FIG. 3, or 1010H, 1010I, or 1010J of FIG. 10). Additionally or alternatively, an icon may be placed adjacent to a user identifier of co-users for which the preference against has been established to visibly reflect the preference against. In addition, if neither a preference for nor against receiving text messages based on electronic messages is established for a co-user, the user identifier of the co-user may be populated to a buddy list group as able to receive messages.

Figure 15A:
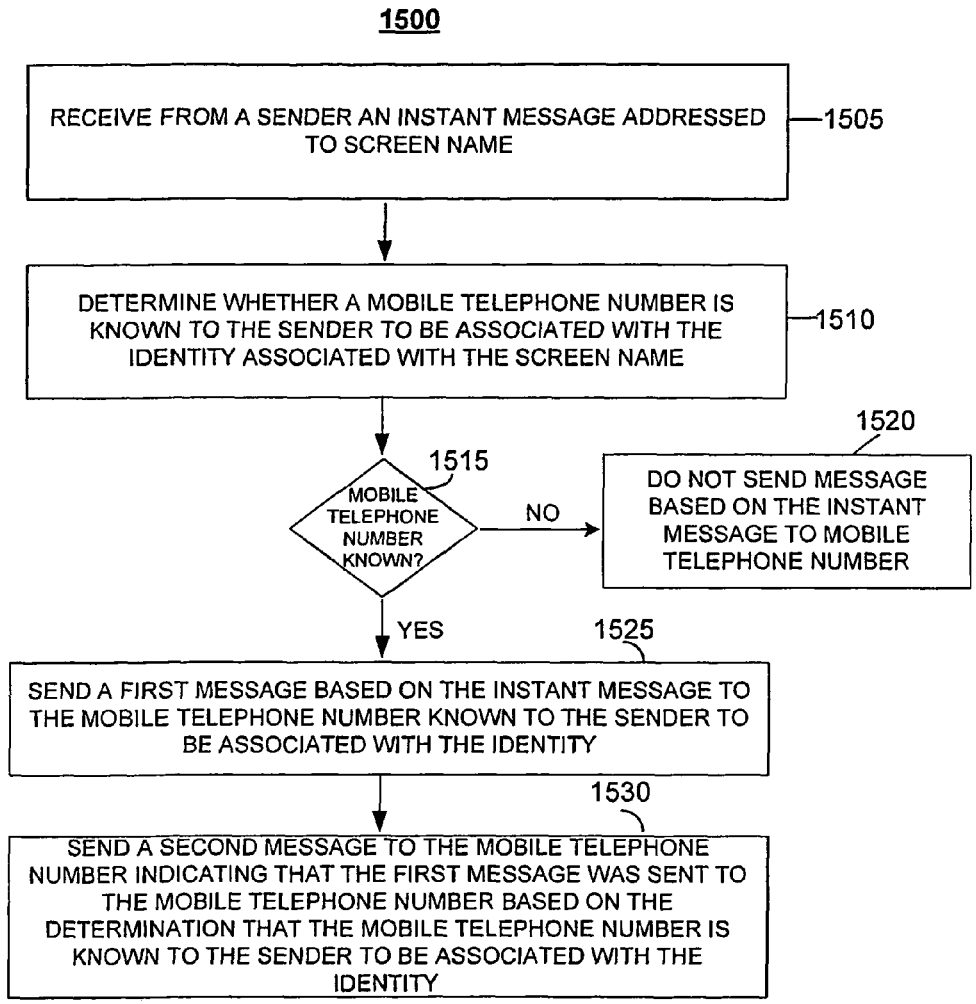
FIGS. 15A, 15B, 16A, and 16B are flow charts of processes for sending messages to a mobile telephone number.

FIG. 15A illustrates a process 1500 for forwarding an instant message to a mobile telephone number and sending a second message to the mobile telephone number indicating that the instant message was forwarded to the mobile telephone number because the mobile telephone number is known by the sender to be associated with the intended recipient. The process 1500 may be performed, for example, by a processor on the provider system 110 of FIG. 1 or the process may be performed by an instant messaging application, such as instant messaging application 107A or 107B of FIG. 1. For convenience, the processor performing the process 1500 may be referred to as an instant messaging system.

The process 1500 begins when a user creates an instant message addressed to a screen name, and the instant message is received by the instant messaging system (1505). The user, who may be referred to as a sender, may do so using an instant messaging application to identify a buddy from within the user's buddy list and enter text or other content for the instant message. Accordingly, the instant message is addressed to a screen name of an identity listed on the sender's buddy list. Alternatively, the screen name of the intended recipient of the instant message may be identified by the user by entering a screen name (rather than selecting a buddy from the sender's buddy list).

The instant messaging system determines whether a mobile telephone number is known by the sender to be associated with the identity associated with the screen name (1510). In one example, the instant messaging system identifies a collection of contact information (i.e., an address book, a contact list, or a buddy list) that is associated with the sender of the instant message and searches the identified collection for an entry that includes a screen name that matches the screen name to which the instant message is addressed. If such a match is found, the instant messaging system determines whether a mobile telephone number is included in the contact information entry, and, when so, the instant messaging system determines that a mobile telephone number is known to the sender to be associated with the identity associated with the screen name to which the instant message is addressed.

When the instant messaging system determines that a mobile telephone number is not known by the sender to be associated with the identity associated with the screen name (e.g., contact information for the identity is not included in the sender's address book or contact information for the identity is included in the sender's address book and the contact information does not include a mobile telephone number) (1515), the instant messaging system does not send a message based on the instant message to the mobile telephone number (e.g., does not forward a text message to a mobile telephone number) (1520).

When the instant messaging system determines that a mobile telephone number is known by the sender to be associated with the identity associated with the screen name (e.g., contact information for the identity is included in the sender's address book, where the contact information includes a mobile telephone number and identifies a screen name) (1515), the instant messaging system sends a first message based on the instant message to the mobile telephone number known to the sender to be associated with the identity (1525). This may be accomplished, for example, by preparing and forwarding a text message based on the instant message to the mobile telephone number for the identity, directly or indirectly, thorough a cellular system, as described previously, for example, with respect to FIG. 1.

The instant messaging system also sends a second message to the mobile telephone number indicating that the first message was sent to the mobile telephone number based on the determination that the mobile telephone number is known to the sender to be associated with the identity (1530). A second message may be sent to the mobile telephone number every time a message based on an instant message is sent to the mobile telephone number. Alternatively, a second message may be sent to the mobile telephone number only the first time a message based on an instant message from a particular sender is sent to the mobile telephone number. In addition, other triggers and/or conditions for sending a second message to a mobile telephone number in addition to a first message based on an instant message may be used.

In some implementations, the second message may be separate from the first message. In such cases, the second message may accompany the first message (e.g., the second message may be sent substantially simultaneously to the first message) or the second message may be sent before or after sending the first message. In such implementations, the second message may be displayed separately from the first message by the mobile telephone. For example, a second message may appear in the recipient's text message inbox or a pop-up window presenting the second message may be displayed on the mobile telephone's display. Additionally or alternatively, the mobile telephone may incorporate, or otherwise combine, the second message within the first message such that the mobile telephone displays what appears to be a single communication including both the first message and the second message to the recipient.

Alternatively, the second message may be prefixed to, appended to, or otherwise incorporated within the first message such that the first message and the second message form a single communication. For example, additional lines of text indicating that the first message was sent to the mobile telephone number because the mobile telephone number is known to the sender to be associated with the identity may be added to the first message.

In addition, in some implementations, the second message may provide the recipient with options for prohibiting subsequent messages based on instant messages from being sent to the mobile telephone number. For example, the second message may enable the recipient to block instant messages from being forwarded to the mobile telephone number as text messages by responding to the second message by entering a certain keystroke or series of keystrokes on the touchpad of the mobile telephone in response to the second message.

Additionally or alternatively, the second message may include instructions that enable the recipient to block subsequent messages based on instant messages from being sent to the mobile telephone number. For instance, the second message may include instructions for prohibiting the forwarding of instant messages from the mobile telephone, for example, in accordance with the techniques discussed above in connection with FIGS. 12A, 12B, and 13. Additionally or alternatively, the second message may include instructions for prohibiting the forwarding of instant messages from the recipient's instant message account, for example, in accordance with the techniques discussed above in connection with FIG. 7.

The second message may provide the recipient with options for prohibiting subsequent messages based on instant messages from the sender from being sent to the mobile telephone number. Additionally or alternatively, the second message may provide the recipient with options for prohibiting subsequent messages based on instant messages from all users of the instant messaging system or a particular subset of the users of the instant messaging system from being sent to the mobile telephone number.

Figure 15B:
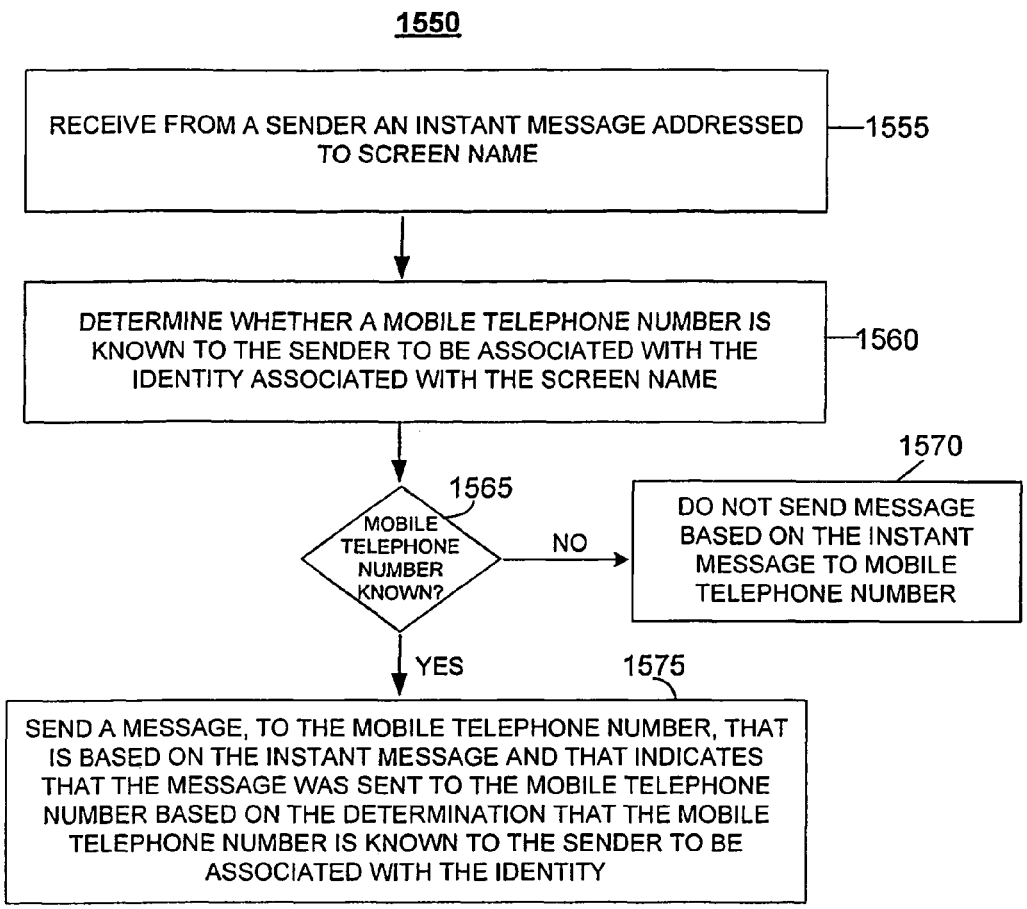

FIG. 15B illustrates a process 1550 for forwarding an instant message to a mobile telephone number and informing the intended recipient that the instant message was forwarded to the mobile telephone number because the mobile telephone number is known by the sender to be associated with the intended recipient. The process 1550 may be performed, for example, by a processor on the provider system 110 of FIG. 1 or the process may be performed by an instant messaging application, such as instant messaging application 107A or 107B of FIG. 1. For convenience, the processor performing the process 1550 may be referred to as an instant messaging system.

The process 1550 begins when a user creates an instant message addressed to a screen name, and the instant message is received by the instant messaging system (1555). The user, who may be referred to as a sender, may do so using an instant messaging application to identify a buddy from within the user's buddy list and enter text or other content for the instant message. Accordingly, the instant message is addressed to a screen name of an identity listed on the sender's buddy list. Alternatively, the screen name of the intended recipient of the instant message may be identified by the user by entering a screen name (rather than selecting a buddy from the sender's buddy list).

The instant messaging system determines whether a mobile telephone number is known by the sender to be associated with the identity associated with the screen name (1560). In one example, the instant messaging system identifies a collection of contact information (i.e., an address book, a contact list, or a buddy list) that is associated with the sender of the instant message and searches the identified collection for an entry that includes a screen name that matches the screen name to which the instant message is addressed. If such a match is found, the instant messaging system determines whether a mobile telephone number is included in the contact information entry, and, when so, the instant messaging system determines that a mobile telephone number is known to the sender to be associated with the identity associated with the screen name to which the instant message is addressed.

When the instant messaging system determines that a mobile telephone number is not known by the sender to be associated with the identity associated with the screen name (e.g., contact information for the identity is not included in the sender's address book or contact information for the identity is included in the sender's address book and the contact information does not include a mobile telephone number) (1565), the instant messaging system does not send a message based on the instant message to the mobile telephone number (e.g., does not forward a text message to a mobile telephone number) (1570).

When the instant messaging system determines that a mobile telephone number is known by the sender to be associated with the identity associated with the screen name (e.g., contact information for the identity is included in the sender's address book, where the contact information includes a mobile telephone number and identifies a screen name) (1565), the instant messaging system sends a message, to the mobile telephone number, that is based on the instant message and that indicates that the message was sent to the mobile telephone number based on the determination that the mobile telephone number is known to the sender to be associated with the identity (1575). This may be accomplished, for example, by preparing a text message that is based on the instant message and that indicates that the message was sent to the mobile telephone number based on the determination that the mobile telephone number is known to the sender to be associated with the identity. For instance, additional text may be added to, or otherwise incorporated within, the text of the original instant message indicating that the message was sent to the mobile telephone number based on the determination that the mobile telephone number is known to the sender to be associated with the identity. After the text message that is based on the instant message and that indicates that the message was sent to the mobile telephone number based on the determination that the mobile telephone number is known to the sender to be associated with the identity is prepared, it may be forwarded to the mobile telephone number known to be associated with the identity, directly or indirectly, thorough a cellular system, as described previously, for example, with respect to FIG. 1.

Figure 16A:
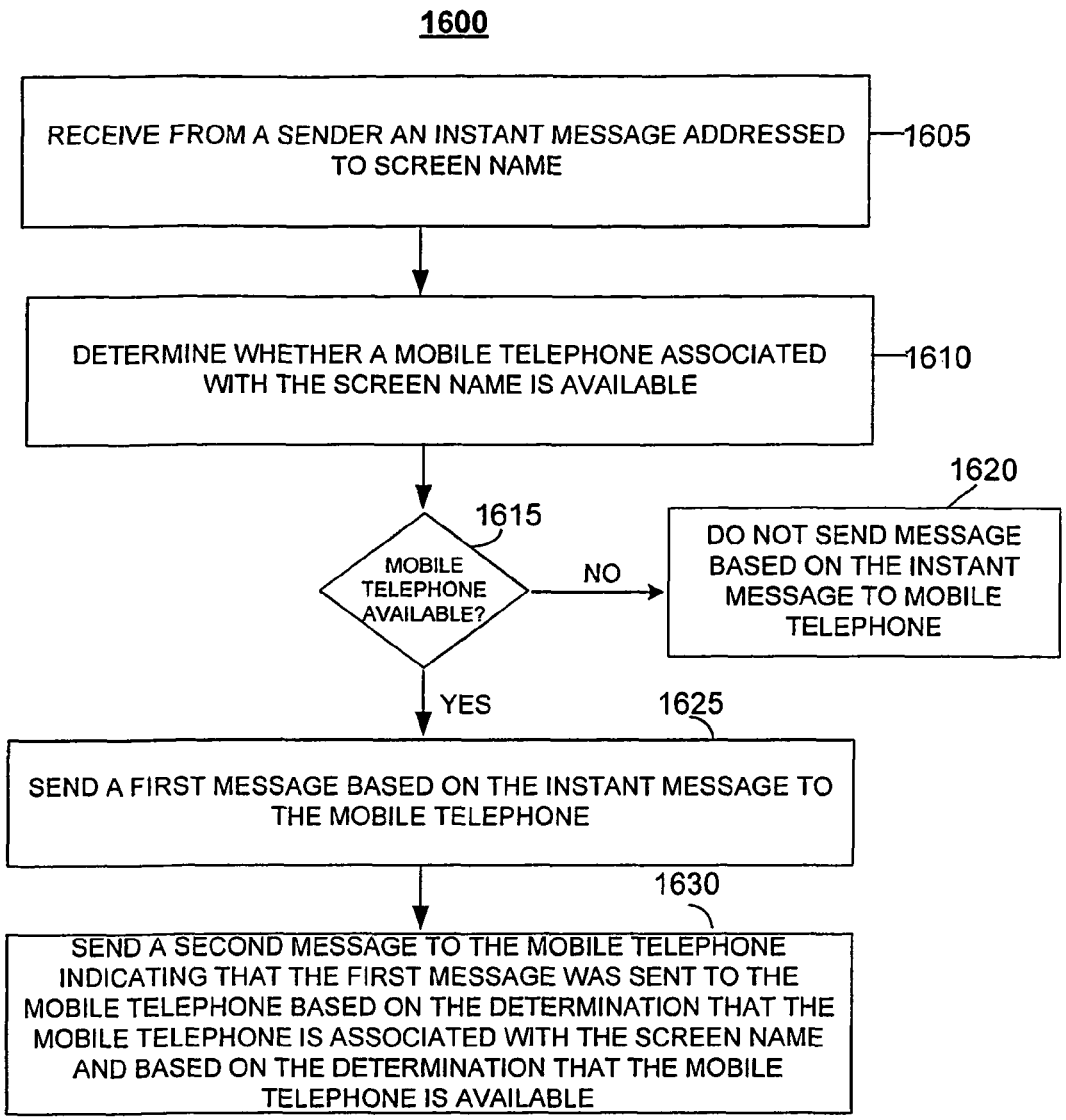

FIG. 16A illustrates a process 1600 for forwarding an instant message to a mobile telephone and sending a second message to the mobile telephone indicating that the instant message was forwarded to the mobile telephone because the mobile telephone is associated with the intended recipient and the mobile telephone is available to receive communications. The process 1600 may be performed, for example, by a processor on the provider system 110 of FIG. 1 or the process may be performed by an instant messaging application, such as instant messaging application 107A or 107B of FIG. 1. For convenience, the processor performing the process 1600 may be referred to as an instant messaging system.

The process 1600 begins when a user creates an instant message addressed to a screen name, and the instant message is received by the instant messaging system (1605). The user, who may be referred to as a sender, may do so using an instant messaging application to identify a buddy from within the user's buddy list and enter text or other content for the instant message. Accordingly, the instant message is addressed to a screen name of an identity listed on the sender's buddy list. Alternatively, the screen name of the intended recipient of the instant message may be identified by the user by entering a screen name (rather than selecting a buddy from the sender's buddy list).

The instant messaging system determines whether a mobile telephone associated with the screen name is available to receive a communication (1610). In one example, the instant messaging system determines whether the intended recipient has associated a mobile telephone number with the screen name. If the intended recipient has associated a mobile telephone number with the screen name, the instant messaging system determines whether the mobile telephone associated with the mobile telephone number is available to receive a communication. The instant messaging system may determine whether the mobile telephone is available to receive a communication by determining whether the intended recipient has enabled recipient-inspired mobile forwarding. Additionally or alternatively, the instant messaging system may determine whether the mobile telephone is available to receive a communication by determining whether the mobile telephone is powered on, within signal range, or otherwise able to receive a communication.

When the instant messaging system determines that a mobile telephone associated with the identity is not available to receive a communication (1615), the instant messaging system does not send a message based on the instant message to the mobile telephone number (e.g., does not forward a text message to a mobile telephone number) (1620).

When the instant messaging system determines that a mobile telephone associated with the identity is available to receive a communication (1615), the instant messaging system sends a first message based on the instant message to the mobile telephone (1625). This may be accomplished, for example, by preparing and forwarding a text message based on the instant message to the mobile telephone for the identity, directly or indirectly, through a cellular system, as described previously, for example, with respect to FIG. 1.

The instant messaging system also sends a second message to the mobile telephone number indicating that the first message was sent to the mobile telephone because the mobile telephone is associated with the screen name and the mobile telephone is available to receive a communication (1530). A second message may be sent to the mobile telephone every time a message based on an instant message is sent to the mobile telephone. Alternatively, a second message may be sent to the mobile telephone only the first time a message based on an instant message from a particular sender is sent to the mobile telephone. In addition, other triggers and/or conditions for sending a second message to a mobile telephone in addition to a first message based on an instant message may be used.

In some implementations, the second message may be separate from the first message. In such cases, the second message may accompany the first message (e.g., the second message may be sent substantially simultaneously to the first message) or the second message may be sent before or after sending the first message. In such implementations, the second message may be displayed separately from the first message by the mobile telephone. For example, a second message may appear in the recipient's text message inbox or a pop-up window presenting the second message may be displayed on the mobile telephone's display. Additionally or alternatively, the mobile telephone may incorporate, or otherwise combine, the second message within the first message such that the mobile telephone displays what appears to be a single communication including both the first message and the second message to the recipient.

Alternatively, the second message may be prefixed to, appended to, or otherwise incorporated within the first message such that the first message and the second message form a single communication. For example, additional lines of text indicating that the first message was sent to the mobile telephone because the mobile telephone is known to the sender to be associated with the screen name may be added to the first message.

In addition, in some implementations, the second message may provide the recipient with options for prohibiting subsequent messages based on instant messages from being sent to the mobile telephone. For example, the second message may enable the recipient to block instant messages from being forwarded to the mobile telephone number as text messages by responding to the second message by entering a certain keystroke or series of keystrokes on the touchpad of the mobile telephone in response to the second message.

Additionally or alternatively, the second message may include instructions that enable the recipient to block subsequent messages based on instant messages from being sent to the mobile telephone number. For instance, the second message may include instructions for prohibiting the forwarding of instant messages from the mobile telephone, for example, in accordance with the techniques discussed above in connection with FIGS. 12A, 12B, and 13. Additionally or alternatively, the second message may include instructions for prohibiting the forwarding of instant messages from the recipient's instant message account, for example, in accordance with the techniques discussed above in connection with FIG. 7.

The second message may provide the recipient with options for prohibiting subsequent messages based on instant messages from the sender from being sent to the mobile telephone. Additionally or alternatively, the second message may provide the recipient with options for prohibiting subsequent messages based on instant messages from all users of the instant message system or a particular subset of the instant message system from being sent to the mobile telephone.

Figure 16B:
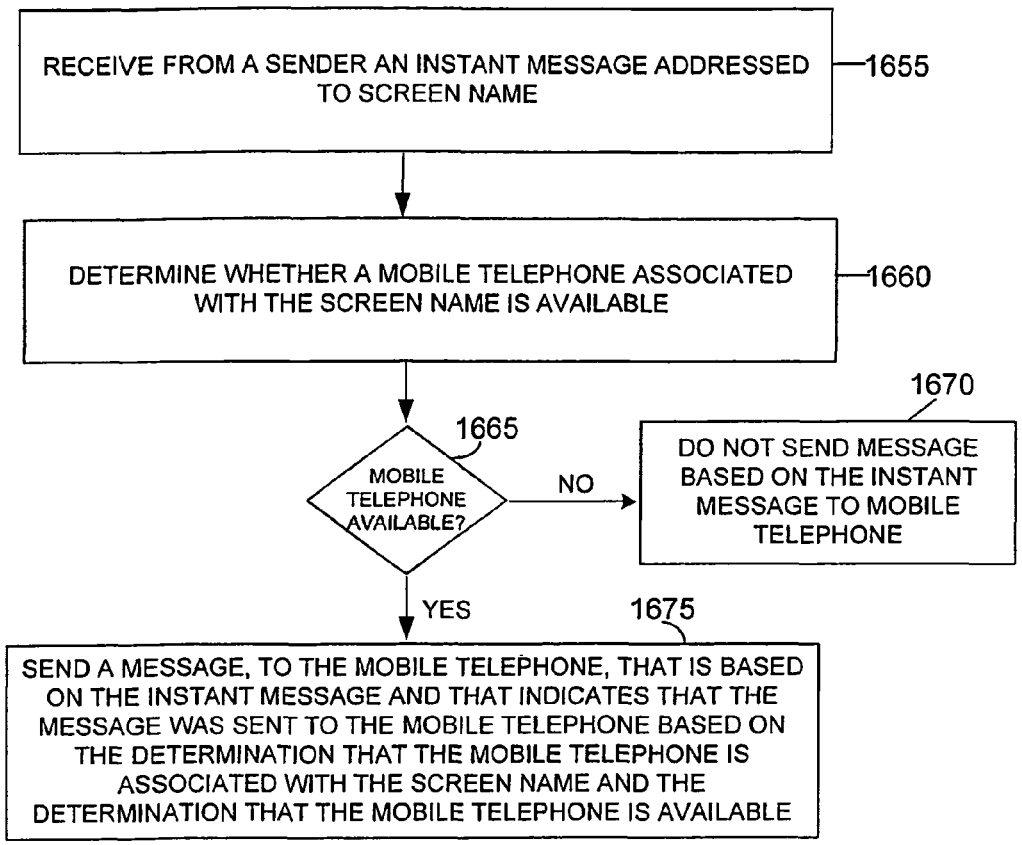

FIG. 16B illustrates a process 1650 for forwarding an instant message to a mobile telephone and informing the intended recipient that the instant message was forwarded to the mobile telephone because the mobile telephone is associated with the screen name of the intended recipient and the mobile telephone is available to receive communications. The process 1650 may be performed, for example, by a processor on the provider system 110 of FIG. 1 or the process may be performed by an instant messaging application, such as instant messaging application 107A or 107B of FIG. 1. For convenience, the processor performing the process 1650 may be referred to as an instant messaging system.

The process 1650 begins when a user creates an instant message addressed to a screen name, and the instant message is received by the instant messaging system (1655). The user, who may be referred to as a sender, may do so using an instant messaging application to identify a buddy from within the user's buddy list and enter text or other content for the instant message. Accordingly, the instant message is addressed to a screen name of an identity listed on the sender's buddy list. Alternatively, the screen name of the intended recipient of the instant message may be identified by the user by entering a screen name (rather than selecting a buddy from the sender's buddy list).

The instant messaging system determines whether a mobile telephone associated with the screen name is available to receive a communication (1660). In one example, the instant messaging system determines whether the intended recipient has associated a mobile telephone number with the screen name. If the intended recipient has associated a mobile telephone number with the screen name, the instant messaging system determines whether the mobile telephone associated with the mobile telephone number is available to receive a communication. The instant messaging system may determine whether the mobile telephone is available to receive a communication by determining whether the intended recipient has enabled recipient-inspired mobile forwarding. Additionally or alternatively, the instant messaging system may determine whether the mobile telephone is available to receive a communication by determining whether the mobile telephone is powered on, within signal range, or otherwise able to receive a communication.

When the instant messaging system determines that a mobile telephone associated with the identity is not available to receive a communication (1665), the instant messaging system does not send a message based on the instant message to the mobile telephone (e.g., does not forward a text message to a mobile telephone) (1670).

When the instant messaging system determines that a mobile telephone associated with the identity is available to receive a communication (1665), the instant messaging system sends a message, to the mobile telephone, that is based on the instant message and that indicates that the message was sent to the mobile telephone based on the determination that the mobile telephone is associated with the screen name and the determination that the mobile telephone is available (1675).

This may be accomplished, for example, by preparing a text message that is based on the instant message and that indicates that the message was sent to the mobile telephone based on the determination that the mobile telephone is associated with the screen name and the determination that the mobile telephone is available. For instance, additional text may be added to, or otherwise incorporated within, the text of the original instant message indicating that the message was sent to the mobile telephone based on the determination that the mobile telephone is associated with the screen name and the determination that the mobile telephone is available. After the text message that is based on the instant message and that indicates that the message was sent to the mobile telephone based on the determination that the mobile telephone is associated with the screen name and the determination that the mobile telephone is available is prepared, it may be forwarded to the mobile telephone, directly or indirectly, thorough a cellular system, as described previously, for example, with respect to FIG. 1.

Although the processes described in FIGS. 15A, 15B, 16A and 16B generally are described in the context of forwarding instant messages to mobile telephones, other implementations are contemplated. More particularly, in any context in which a first message is sent to an intended recipient using a first mode of communication and then forwarded to another destination or communication device using a second form of communication, it may be useful to send a second message to the alternative destination or communication device explaining to the recipient why the first message was forwarded to the destination or communication device and enabling the recipient to prohibit future messages sent using a first mode of communication from being forwarded to the destination or communications device. For example, an instant messaging system may enable instant messages sent to a recipient's instant message identity to be forwarded to an electronic mail ("e-mail") address associated with the recipient, an alternative instant message identity associated with the recipient, and/or a voicemail account associated with the recipient. In all of these contexts, it may be useful for the instant messaging system to send a second message to the recipient indicating why the instant message was forwarded and enabling the recipient to block future instant messages from being forwarded.

An instant message sent by a sender may be forwarded to an intended instant messaging recipient's mobile telephone even when the sender does not store, in the sender's address book or otherwise, a mobile telephone number for the recipient. Moreover, the sender and recipient may not have a direct relationship to another, but may nevertheless be linked to one another through intermediate identities based on a personal, business or other relationship among the identities and the intermediary identities. For example, a user A may have a friend, user B, who also uses the instant messaging service. Similarly, user B also may have a friend, user C, who also uses the instant messaging service. Thus, because user A is friends with user B and user B is friends with user C and because user A, user B, and user C all use the instant messaging service, user A is linked to user C through user B, and, consequently, may be deemed to know user C. Such interpersonal interactions or relationships may generally be referred to as a social network. How many intermediary identities are needed to link one identity with another identity may be referred to as the degree of separation between those two identities and may serve as a measure of the strength of the relationship between the two identities.

Contact lists (e.g., address books or buddy lists of instant messaging services) may be used to determine the links and degree of separation between a sender and a recipient. For example, an identity A may list identity B in identity A's address book, identity B may list identity C in identity B's address book, and identity C may list identity D in identity C's address book. Here, identity D is linked to identity A by two degrees of separation (with identity B as the first degree and identity C as the second degree). Identity A is related to identity C by one degree of separation (identity B), and identity B is separated from identity D by one degree of separation (identity C). Identities A and B, identities B and C, and identities C and D are each respectively separated by zero degrees of separation.

Thus, a system may identify a first identity's social network (e.g., the entire social network or a portion of the social network up to a designated number of degrees of separation) by evaluating the first identity's contact list(s), evaluating the contact list(s) of those identities listed in the first identity's contact list, and so forth until the desired number of degrees have been reached or the entire social network has been identified. For example, an identity A may list identities B and C in identity A's address book. The system may evaluate and determine that identities B and C are so listed and construct a social network map (which may be visually displayed and/or stored for later use) that indicates that identities B and C are linked to identity A. The system may then evaluate identity B's address book and identity C's address book to determine additional identities with whom identity. B or identity C are linked. For example, the system may evaluate identity B's address book and determine that identities D and E are listed in identity B's address book and, consequently, that identity B is linked to identities D and E. The system then may refine the social network to indicate that identity A is linked directly to identities B and C and that identity A also is linked to identities D and E through identity B.

Figure 17:
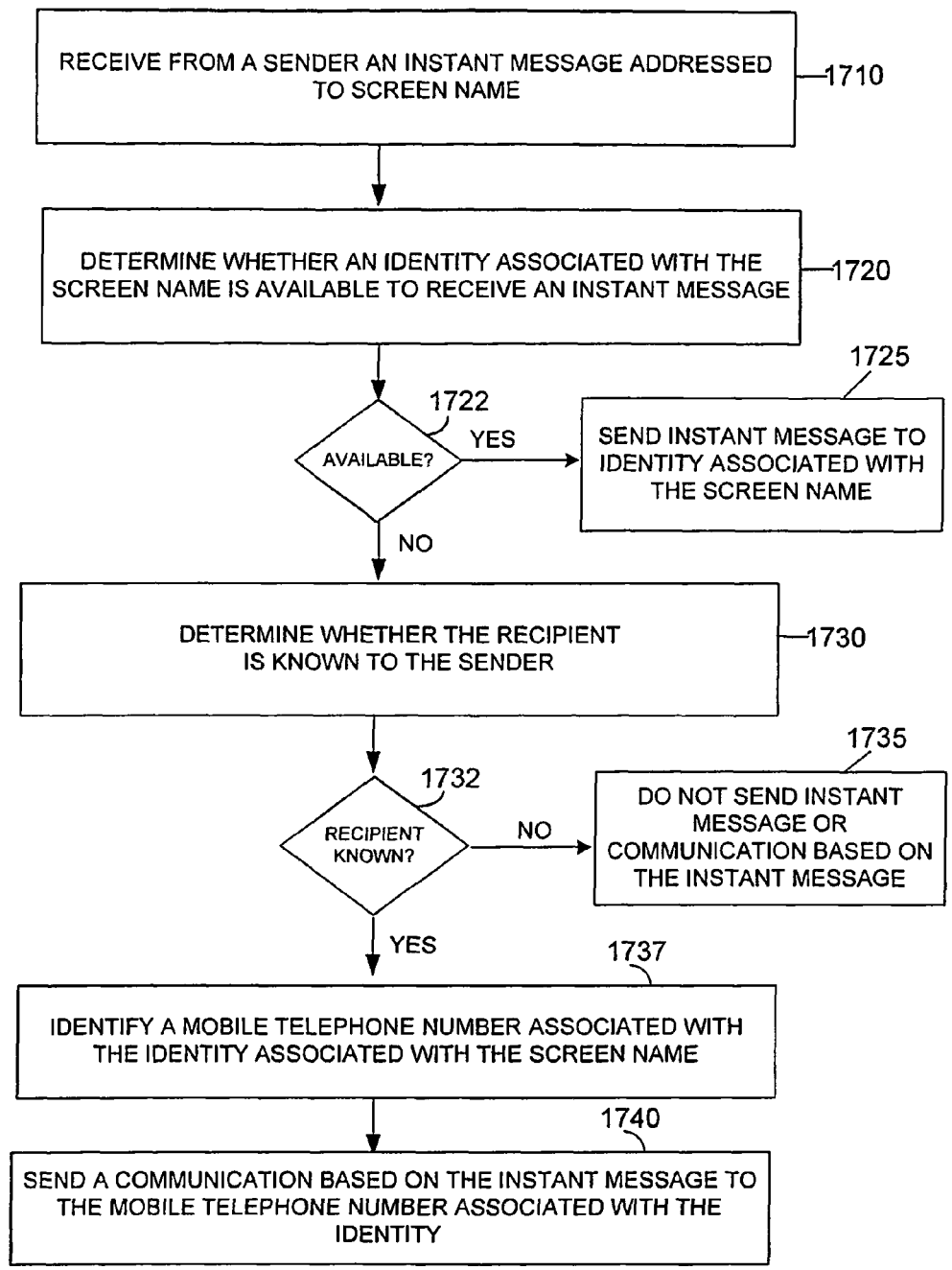
FIG. 17 is a flow chart of a process for forwarding an instant message only to people a sender is determined to know.

FIG. 17 illustrates a process 1700 for forwarding an instant message, based on an intended recipient being known to the sender, to a mobile telephone device capable of receiving, processing, displaying and transmitting text messages. In contrast to the process 200 of FIG. 2, the process 1700 forwards an instant message based on a mobile telephone number associated with the intended recipient that is not necessarily included in the sender's own contact information for the intended recipient. The process 1700 may be performed, for example, by a processor on the provider system 110 of FIG. 1 or the process 1700 may be performed by an instant messaging application, such as instant messaging application 107A or 107B of FIG. 1. For convenience, the processor performing the process 1700 may be referred to as an instant messaging system.

The process 1700 begins when a user creates an instant message that is addressed to a screen name, and the instant message is received by the instant messaging system (1710). The user, who may be referred to as a sender, may do so using an instant messaging application to identify a screen name of an intended recipient and to enter text or other content for the instant message. Accordingly, the instant message is addressed to a screen name of an identity identified by the sender.

The instant messaging system determines whether an identity associated with the screen name is available to receive an instant message (1720). This may be accomplished, for example, by the instant messaging system checking whether the identity associated with the screen name is signed on to the instant message system. When the identity associated with the screen name is available to receive an instant message (1722), the instant messaging system sends the instant message to the identity associated with the screen name (1725). For example, the instant message system may forward the instant message to the client system, such as 105A or 105B of FIG. 1, used by the identity.

When the identity associated with the screen name is not available to receive an instant message (1722), the instant messaging system determines whether the recipient is known by the sender (1730). In one example, the instant messaging system identifies a collection of contact information (e.g., an address book, a contact list, or a buddy list) that is associated with the sender of the instant message and searches the identified collection for an entry that includes a screen name that matches the screen name to which the instant message is addressed. If a match is not found, the instant messaging system searches collections of contact information of identities that are included in the sender's social network map for an entry that includes a screen name that matches the screen name to which the instant message is addressed. If a match is found, the instant messaging system determines that the recipient is known to the sender.

If the recipient is not known to the sender (1732), the instant message system does not send the instant message to the intended recipient and does not send a communication based on the instant message (e.g., does not forward a text message to a mobile telephone number) (1735).

If the recipient is known to the sender (1732), the instant message system identifies a mobile telephone number associated with the identity associated with the screen name to which the instant message is addressed (1737). To do so, for example, the instant message system searches for, and identifies, collections of contact information associated with identities who are included in the sender's social network map. In another example, the instant message system may search for the mobile telephone number of the identity associated with the screen name to which the instant message is addressed in user contact or account information that is not necessarily associated with a particular identity (e.g., is not an address book or buddy list of a user of the instant message system).

The instant message system sends a communication based on the instant message to the mobile telephone number associated with the recipient (1740). This may be accomplished, for example, by preparing and forwarding a text message based on the instant message to the mobile telephone number for the identity, directly or indirectly, through a cellular system, as described previously with respect to FIG. 1.

Figure 18:
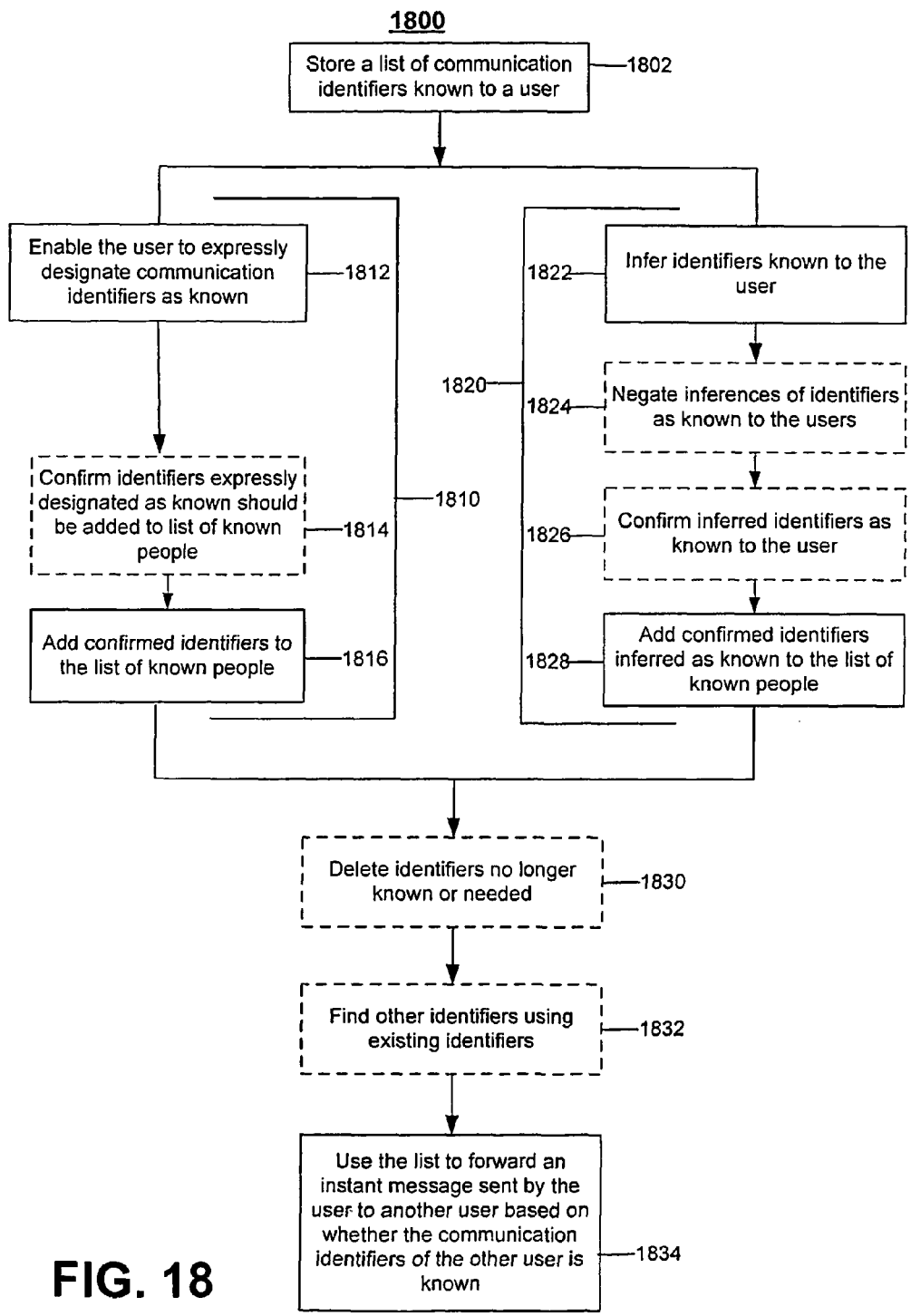
FIG. 18 is a flow chart of a process for maintaining a list of known people and for using the list to forward instant messages only to known people.

Referring to FIG. 18, a process 1800 is used to maintain a list of known people and to use the list of people known to a user to forward instant messages only to know people. A list of people known to a user is stored (1802). Communication identifiers are stored in the list to indicate the known people.

The user can make manual additions to the list of known people (1810). To that end, the user is made able to expressly designate communication identifiers as known (1812). For example, a graphical user interface (GUI) that allows the user to enter communication identifiers may be provided. There also may be a speech-based interface that allows the user to add communications identifiers to the list of known people by saying them. These interfaces may allow the user to augment the list of known people indirectly by allowing them to make additions to a contact list such as, for example, a custom sender list, an address book, or a buddy list.

However, the user may want to manually add a person to a contact list but not to the list of known people. An interface optionally may be presented to enable the user to confirm that the manually entered communication identifiers should be added to the list of known people (1814). The confirmation may be enabled by way of a GUI that allows the user to select the entered communication identifiers that the user actually wants to be included in the list of known people. This confirmation may occur after a predetermined number of communication identifiers have been entered, or at login or logoff to seek confirmation of any people entered during the previous online session. Those identifiers that the user confirms then are added to the list (1816). When a confirmation interface is not presented, all entered communication identifiers are added to the list of known people. Alternatively, there may be an interface that allows the user to directly enter identifiers into the list of known people.

On the other hand, communication identifiers may be inferred as being known based on the actions of the user (1820). First, the communication identifiers known to the user are inferred (1822). For example, a communication identifier may be inferred as known if an e-mail message to that communication identifier is sent. When an instant messaging program is used, the communication identifier of the person with whom the user is communicating may be designated as known to the user.

One user's knowledge of another or their corresponding identifiers may be inferred based on user interactions with a received message. For example, a communication identifier also may be inferred as known if a message from that communication identifier is read, replied to, forwarded, saved, or printed. Likewise, the communication identifier that sent the e-mail message may be designated as known if the message is moved from the "inbox" to a folder that is not marked for deletion or for spam, or if the message is left open for a predetermined amount of time.

Known communication identifiers also may be inferred based on indicia other than user actions. As an example, the people designated as known to the people the user knows may be designated as being "known" to the user. For instance, if a person B is designated as someone user A knows, then the people designated as known to person B also may be designated as "known" to user A. One way this may be implemented is, for example, to designate the people in an address book and/or buddy list of person B as known to user A.

When inferring known people, some actions may be taken into account to negate an inference that the person is known (1824). For instance, if an e-mail received from a person is forwarded to an e-mail address that has been designated for reporting spam, then the inference that the user knows the person may be negated. As another example, an inference that a person is known may be negated if the person is included on an explicit black list of people with which communication should not occur, created by the user or the network administrator.

After known communication identifiers are inferred, an interface optionally may be presented to enable the user to confirm that the inferred communication identifiers are in fact known (1826). The confirmation may be enabled by way of a GUI that allows the user to select inferred communication identifiers that the user actually knows or wants to be included in the list of known people. This confirmation may occur after a predetermined number of communication identifiers have been inferred as known, or at login or logoff to seek confirmation of any people identified in the previous online session. Those identifiers that the user confirms then are added to the list (1828). When a confirmation interface is not presented, the inferred identifiers are added to the list.

Branches 1810 and 1820 may occur simultaneously or sequentially. After at least one of the branches has occurred, the user optionally may view the list of known people, and he or she may delete those users that are no longer known or needed (1830). In addition, communication identifiers in the list of known people can be used optionally to find other communication identifiers for that person (1832). For example, a person's e-mail address may be obtained from a profile associated with a screen name. Similarly, if the e-mail address is known, it may be used to obtain the screen name. The screen name, e-mail, or other determined communication identifiers may be used to determine other ways in which the known person may communicate with the user or in which the user may communicate with the known person.

Figure 19:
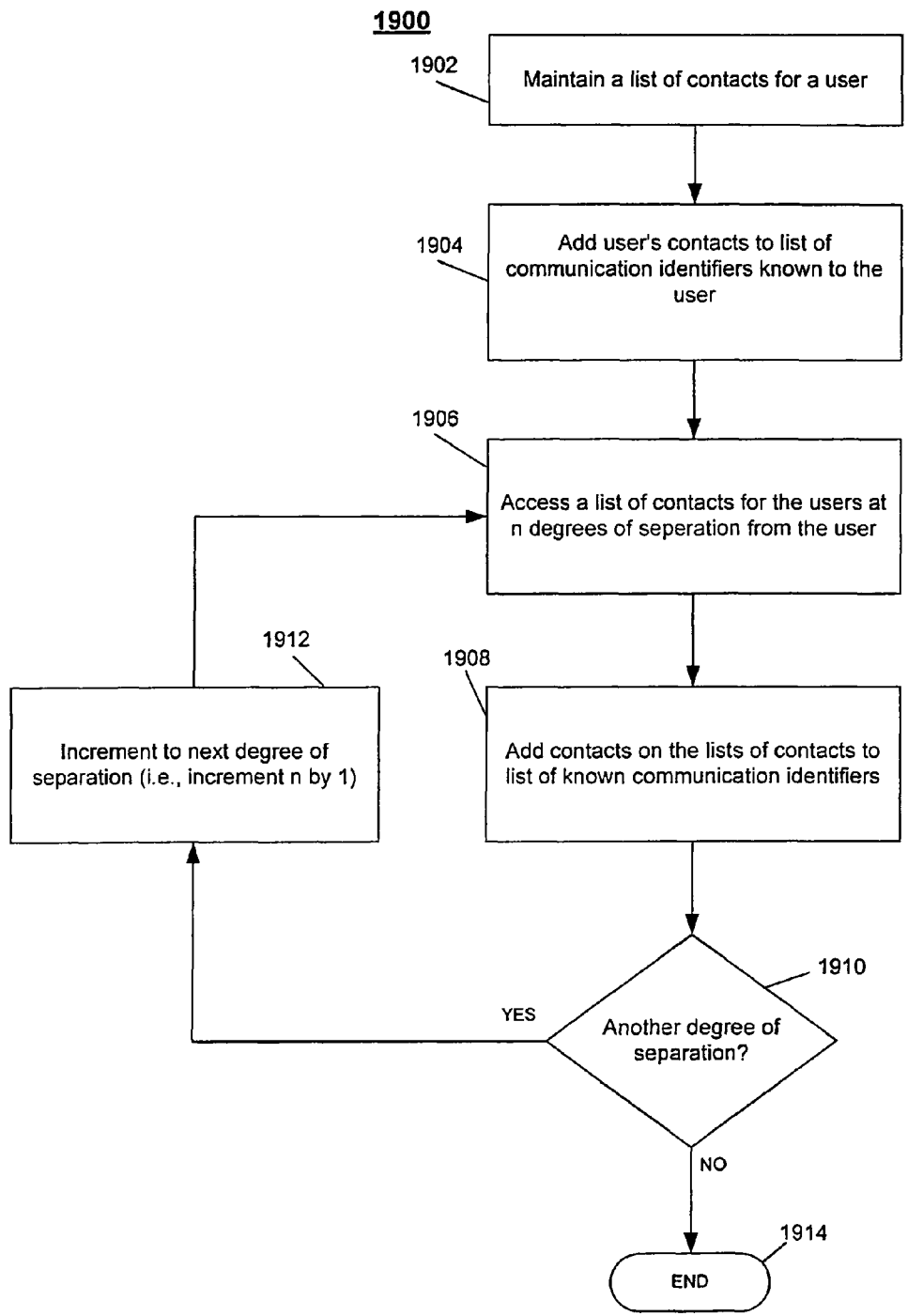
FIG. 19 is a flow chart of a process for inferring contacts of other users as known.

At this point, the list can be used to forward an instant message sent by the user to another user based on whether the communication identifier of the other user is known (1834). For example, the list can be used to determine whether the intended recipient of an instant message is known to a sender. If so, a mobile telephone number associated with the intended recipient may be identified, for example, by using contact information associated with other known users or by using a collection of contact information maintained by the instant messaging system (e.g., a user profile or user account information). The instant message may be forwarded to the intended recipient:

Referring to FIG. 19, a process 1900 may be used to infer people within a certain number of degrees of separation from the user as known to the user. The degree of separation between two entities describes a relationship between those entities. Typically, the characteristics of user contact lists (e.g., address book, buddy list, and/or white list that identifies users from whom communications are to be received) are evaluated to determine the number of degrees (or hops) that are required to link or relate two users.

A list of contacts is maintained for the user (1902). The list of contacts may be any personally maintained list or lists, for example, an address book, a buddy list for instant messaging, and/or a white list. For convenience, the rest of process 1900 will be described using an address book as an example of a list of contacts. The contacts in the user's address book are added to the user's list of known people (1904).

Next, the contacts linked to the user (i.e., up to a desired degree of separation) are identified and added to the user's list of known people. To do so, the address books of each contact in the user's address book are accessed (1906). These address books are not normally configured for direct access by the user. The other users' address books typically include communication identifiers selected by the other users.

The contacts in the user's contacts' address books (i.e., the contacts separated by one degree) then are added to the list of known people (1908). If another degree of separation is desired (1910), the degree of separation is incremented (1912) such that the address books of the contacts that are separated from the user by one degree are accessed (1906) and the contacts in those address books are added to the list of known people list (1908). When a contact is added to the list of known people list, the contact's degree of separation from the user also may be added. The addition of contacts continues until the desired degree of separation is reached (1910). Once the desired degree of separation has been reached, all of the contacts within that desired degree of separation from the user have been inferred as known to the user (1914).

The desired degrees of separation may be a system parameter or, in some implementations, the user may be provided with the ability to set the desired degrees of separation. For example, the user may be provided with an interface that allows the user to decide whether degrees of separation will be used, and, if so, how many degrees should be used. Alternatively, the desired degrees of separation may be both a system parameter and adjustable by the user. For example, the system may include a default degree of separation that can be adjusted by the user if he or she so desires.

Process 1900 may result in the list of known people not being updated when any users related to the intended user update their contact lists. That is, if a user related to the intended user adds a contact to the user's contact list, the new contact may not be reflected in the intended user's list of known people. This situation may not be overly detrimental, particularly in implementations where the list of known people is used as a white list to exempt certain e-mails from spam filtering. However, repeating process 1900 on a periodic or a non-periodic basis may mitigate this situation. Another manner of mitigating this situation is to use an update system in which changes to contact lists are tracked and lists of known people are updated accordingly in an incremental fashion or by triggering an update or re-initiation of process 1900 when an update occurs.

Figure 20:
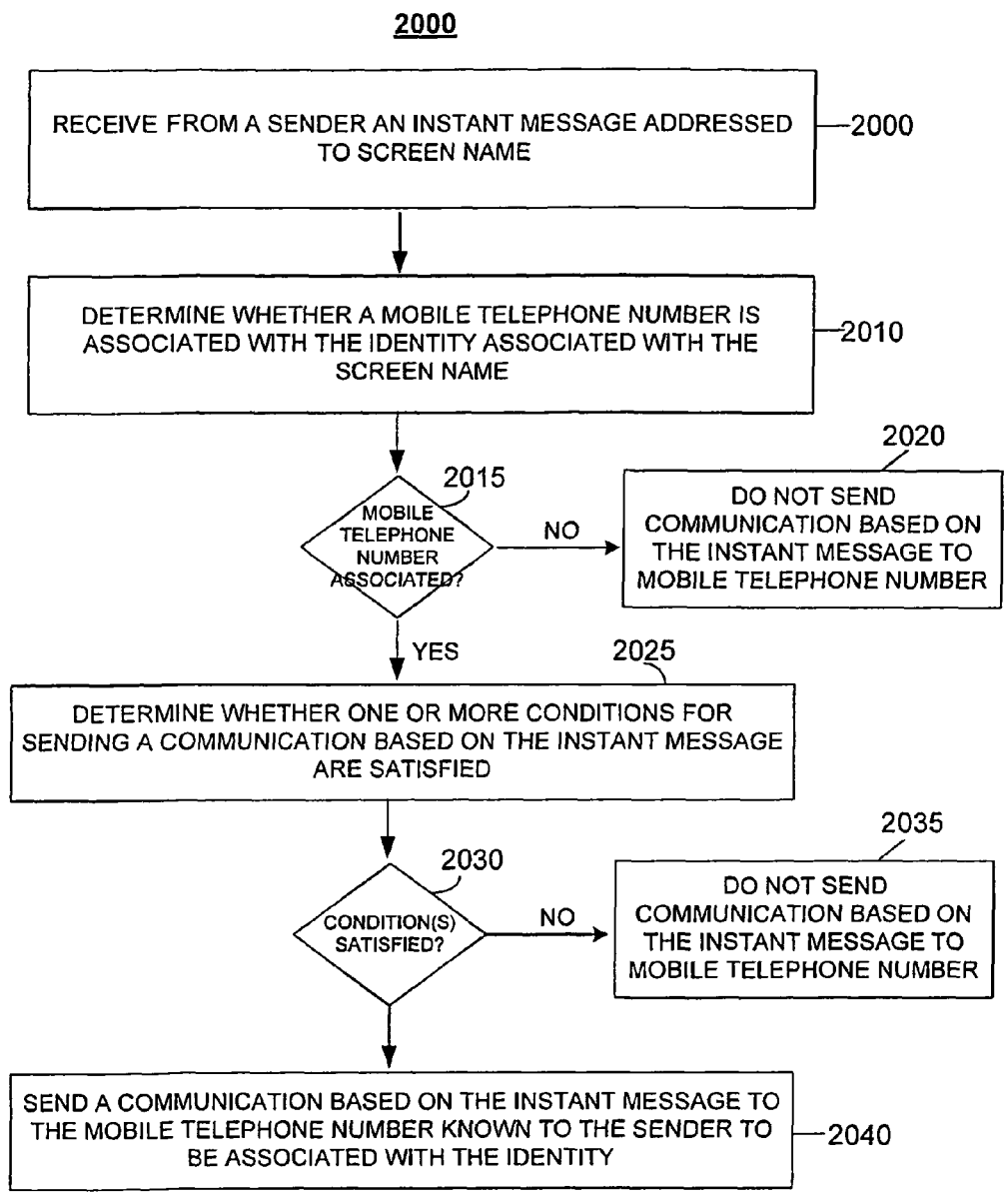
FIG. 20 is a flowchart of a process for conditionally forwarding an instant message to a mobile telephone number associated with an instant messaging screen name.

FIG. 20 illustrates a process 2000 for conditionally forwarding an instant message to a mobile telephone number associated with an instant messaging screen name. The process 2000 may be performed, for example, by a processor on the provider system 110 of FIG. 1 or the process 2000 may be performed by an instant messaging application, such as instant messaging application 107A or 107B of FIG. 1. For convenience, the processor performing the process 2000 may be referred to as an instant messaging system.

The process 2000 begins when a user creates an instant message addressed to a screen name, and the instant message is received by the instant messaging system (2005). The user, who may be referred to as a sender, may do so using an instant messaging application to identify a buddy from within the user's buddy list and enter text or other content for the instant message. Accordingly, the instant message is addressed to a screen name of an identity listed on the sender's buddy list. Alternatively, the screen name of the intended recipient of the instant message may be identified by the user by entering a screen name (rather than selecting a buddy from the sender's buddy list).

The instant messaging system determines whether a mobile telephone number is associated with the intended recipient (2010). In one example, the instant messaging system identifies a collection of contact information (e.g., an address book, a contact list, or a buddy list) that is associated with the sender of the instant message and searches the identified collection for an entry that includes the intended recipient's screen name. If such a match is found, the instant messaging system determines whether a mobile telephone number is included in the contact information entry, and, when so, the instant messaging system determines that a mobile telephone number is associated with the intended recipient's screen name. In another example, the instant messaging system searches the sender's collection of contact information as well as collections of contact information of identities that are included in the sender's social network map for an entry that includes the intended recipient's screen name. If such a match is found, the instant messaging system determines whether a mobile telephone number is included in the contact information entry, and, when so, the instant messaging system determines that a mobile telephone number is associated with the intended recipient's screen name. In still another example, the instant messaging system determines whether a mobile telephone number has ever been associated with the intended recipient's screen name. For example, the intended recipient may have associated his/her screen name with a mobile telephone number while configuring his/her instant messaging account.

When the instant messaging system determines that a mobile telephone number is not associated with the intended recipient's screen name (2015), the instant messaging system does not send a communication based on the instant message to the mobile telephone number (e.g., does not forward a text message to a mobile telephone number) (2020).

When the instant messaging system determines that a mobile telephone number is associated with the intended recipient's screen name (2015), the instant messaging system determines whether one or more conditions for sending a communication based on the instant message to the mobile telephone are satisfied (2025). For example, sending a communication based on the instant message to the mobile telephone number may be conditioned on the geographic location of the intended recipient (e.g., the geographic location of the intended recipient's mobile telephone), the time of the instant message, and/or the strength of the relationship between the sender and the intended recipient.

If the sending of a communication based on the instant message to the mobile telephone number is conditioned on the location of the intended recipient's mobile telephone, one or more locations may be identified as locations to which instant messages are allowed to be sent to the mobile telephone number and/or one or more locations may be identified as locations to which instant messages are not allowed to be sent to the mobile telephone number. The location of the intended recipient's mobile telephone may be determined by requesting an indication of the location of the mobile telephone from a cellular system associated with the intended recipient's mobile telephone. Additionally or alternatively, the location of the intended recipient's mobile telephone may be determined based on a location manually entered by the intended recipient. For example, the intended recipient's mobile telephone may enable the intended recipient to manually enter a location of the intended recipient's mobile telephone into the telephone and the manually entered location may be stored by the mobile telephone and/or the instant messaging system.

In some implementations, the intended recipient may specify one or more locations to which communications are allowed to be sent (e.g., a location associated with the intended recipient's home) and/or the intended recipient may specify one or more locations to which communications are not allowed to be sent (e.g., a location associated with the intended recipient's office). Thereafter, the instant messaging system may send communications to the mobile telephone number only when the mobile telephone is determined to be at a location to which communications are allowed to be sent and/or the instant messaging system may send communications to the mobile telephone number when the mobile telephone is determined not to be at a location to which communications are not allowed to be sent.

Additionally or alternatively, the instant messaging system may determine one or more locations to which communications are allowed to be sent to the mobile telephone number and/or the instant messaging system may determine one or more locations to which communications are not allowed to be sent to the mobile telephone number. Such system determined locations may be determined by identifying one or more locations at which it is likely that the intended recipient will receive a communication sent to the mobile telephone number and/or by identifying one or more locations at which it is unlikely that the intended recipient will receive a communication sent to the mobile telephone number. For example, the instant messaging system may monitor the intended recipient's pattern of receiving and not receiving (i.e., missing) communications sent to the intended recipient's mobile telephone number in order to determine one or more locations at which it is likely that the intended recipient will receive communications sent to the intended recipient's mobile telephone number (e.g., locations at which, the intended recipient historically receives a high percentage of communications sent to the mobile telephone number) and/or one or more locations at which it is unlikely that the intended recipient will receive communications sent to the intended recipient's mobile telephone number (e.g., one or more locations at which the intended recipient historically misses a high percentage of communications sent to the mobile telephone number). Thereafter, the instant messaging system may send communications to the intended recipient's mobile telephone number only when it is determined that the mobile telephone is at a location that has been determined to be a location at which the intended recipient is likely to receive communications sent to the intended recipient's mobile telephone number and/or when it is determined that the mobile telephone is at a location that has been determined to be a location at which the intended recipient is unlikely to receive communications sent to the intended recipient's mobile telephone number. In some implementations, system-determined locations are updated regularly to reflect intended recipient's current patterns.

In some implementations, an actual location (e.g., longitudinal and latitudinal coordinates) of the intended recipient's mobile telephone may be used to determine whether communications should be sent to the intended recipient's mobile telephone number. In other implementations, a relative location of the intended recipient's mobile telephone may be used to determine whether communications should be sent to the intended recipient's mobile telephone number. For example, the intended recipient may specify that communications should not be sent to the intended recipient's mobile telephone number when the intended recipient's mobile telephone is determined to be located at the intended recipient's office and/or when the intended recipient's mobile telephone is determined to be located at the intended recipient's vacation home.

If the sending of a communication based on the instant message to the mobile telephone number is conditioned on the time of the message, one or more time periods may be determined during which communications based on instant messages are allowed to be sent to the mobile telephone number and/or one or more time periods may be determined during which communications based on instant messages are not allowed to be sent to the mobile telephone number. In some implementations, the intended recipient may specify one or more time periods during which communications based on instant messages are allowed to be sent to the mobile telephone number and/or the intended recipient may specify one or more time periods during which communications based on instant messages are not allowed to be sent to the mobile telephone number. Thereafter, the instant messaging system may send communications to the mobile telephone number only during time periods that the intended recipient has specified as time periods during which communications based on instant messages are allowed to be sent to the mobile telephone number and/or the instant messaging system may send communications to the mobile telephone number only during time periods that the intended recipient has not specified as time periods during which communications are not allowed to be sent to the mobile telephone number.

Additionally or alternatively, the instant messaging system may determine one or more time periods during which communications based on instant messages are allowed to be sent to the intended recipient's mobile telephone number and/or one or more time periods during which communications based on instant messages are not allowed to be sent to the intended recipient's mobile telephone number. System determined time periods may be default time periods or system determined time periods may be determined based on times during which it is likely that the intended recipient is able to receive communications sent to the intended recipient's mobile telephone number. For example, the instant messaging system may monitor the intended recipient's pattern of receiving and not receiving (i.e., missing) communications sent to the intended recipient's mobile telephone number in order to determine one or more time periods during which it is likely that the intended recipient will receive communications sent to the intended recipient's mobile telephone number (e.g., time periods during which the intended recipient historically receives a high percentage of communications sent the mobile telephone number) and/or one or more time periods during which it is unlikely that the intended recipient will receive communications sent to the intended recipient's mobile telephone number (e.g., time periods during which the intended recipient historically misses a high percentage of communications sent to the mobile telephone number). Thereafter, the instant messaging system may send communications to the intended recipient's mobile telephone number only during time periods for which it has been determined that the intended recipient is likely to receive communications sent to the intended recipient's mobile telephone number and/or the instant messaging system may not send communications to the intended recipient's mobile telephone number during periods of time for which it has been determined that the intended recipient is unlikely to receive communications sent to the intended recipient's mobile telephone number. In some implementations, system-determined time periods are updated regularly based on the user's current patterns.

Time periods during which communications based on instant messages are allowed to be sent to the mobile telephone number may be the same every day, or they may be different from day to day. For example, the time periods during which communications based on instant messages are allowed to be sent to the mobile telephone number may be the same on weekdays but different on weekend days.

In some implementations, the time periods during which communications are allowed to be sent to the mobile telephone number may be considered from the sender's perspective. That is to say, the determination of whether the instant message is received within a time period during which communications are allowed to be sent to the mobile telephone number may be determined based on whether the local time of the sender at which the sender sent the instant message falls within a time period during which communications are allowed to be sent to the mobile telephone number. In other implementations, the time periods during which communications are allowed to be sent to the mobile telephone number may be considered from the intended recipient's perspective. That is to say, the determination of whether the instant message is received within a time period during which communications are allowed to be sent to the mobile telephone number may be determined based on whether the local time of a default location associated with the intended recipient (e.g., the intended recipient's home or office) or a local time of the actual location of the intended recipient's mobile telephone falls within a time period during which communications are allowed to be sent to the mobile telephone number. In implementations where the determination of whether the instant message is received within a time period during which communications are allowed to be sent to the mobile telephone number is based on the actual location of the intended recipient's mobile telephone, the actual location of the intended recipient's mobile telephone may be determined, for example, by requesting an indication of the location of the intended recipient's mobile telephone from a cellular system associated with the intended recipient's mobile telephone.

If the sending of a communication based on the instant message to the mobile telephone number is conditioned on the strength of the relationship between the sender and the intended recipient, a threshold relationship strength required for allowing communications based on instant messages sent by a sender to be sent to the intended recipient's mobile telephone may be specified, and communications based on instant messages may be sent to the intended recipient's mobile telephone only if the relationship strength between the sender and the intended recipient satisfies the required threshold relationship strength.

In some implementations, the strength of the relationship between a sender and the intended recipient may be determined based on whether the sender and the intended recipient are linked to each other in a social network. In some such implementations, the relationship between a sender and the intended recipient may be deemed to satisfy the required threshold relationship strength merely if the sender and the intended recipient are linked to each other by a social network. In other such implementations, the required threshold relationship strength may be specified as a maximum number of links between a sender and the intended recipient, and the relationship strength between a sender and the intended recipient may be deemed to satisfy the required threshold relationship strength only if the sender and the intended recipient are linked to each other by a number of links that is equal to or less than the maximum number of links. The maximum number of links may be specified by the intended recipient, or the maximum number of links may be specified by the instant messaging system.

If the instant messaging system determines that one or more conditions for sending a communication based on the instant message are not satisfied (2030), the instant messaging system does not send a communication based on the instant message to the mobile telephone number (2035). In some implementations, when the instant messaging system determines that one or more conditions for sending a communication based on the instant message are not satisfied, the instant messaging system sends an alert to the sender indicating that the one or more conditions for sending a communication based on the instant message are not satisfied and informing the sender that a communication based on the instant message will not be sent to the intended recipient's mobile telephone. In such implementations, the sender may be able to override the instant messaging system's decision not to send a communication to the mobile telephone number based on the determination that the one or more conditions for sending the communication are not satisfied. For example, the alert sent to the user indicating that the one or more conditions have not been satisfied may enable the user to send an instruction to the instant messaging system that instructs the instant messaging system to send a communication based on the instant message to the mobile telephone number despite the fact that the one or more conditions are not satisfied.

If the instant messaging system determines that the one or more conditions for sending a communication based on the instant message are satisfied (2030), the instant messaging system sends a communication based on the instant message to the mobile telephone number associated with the intended recipient (2025). This may be accomplished, for example, by preparing and forwarding a text message based on the instant message to the mobile telephone number for the intended recipient, directly or indirectly, through a cellular system, as described previously, for example, with respect to FIG. 1.

The techniques described related to mobile forwarding based on contact information may provide a convenient method to automatically provide mobile forwarding without requiring the text message recipient to set up or otherwise configure the recipient's instant message account to enable such mobile forwarding. This may be useful, particularly when a user may be reluctant to so enable the user's account, perhaps, on the assumption that such a configuration process is or may be complex or confusing (regardless of whether such a configuration process is complex or confusing).

Although the techniques and concepts often are described above in terms of SMS text messaging, the techniques and concepts may be applied to other types of messages, such as a Multimedia Messaging Services (MMS) message, a video message and an audio message. Similarly, the techniques and concepts have been described in terms of receiving an instant message at a desktop computer. Other electronic devices configured to receive instant messages may be used, such as a laptop computer, a personal data assistant (PDA) and a telephone receiver.

Instant messaging programs typically allow instant message senders to communicate in real-time with each other in a variety of ways. For example, many instant messaging programs allow instant message senders to send text as an instant message, to transfer files, and to communicate by voice. Examples of instant messaging communication applications include AIM (America Online Instant Messenger), AOL (America Online) Buddy List and Instant Messages which is an aspect of many client communication applications provided by AOL, Yahoo Messenger, MSN Messenger, and ICQ, among others. Although discussed above primarily with respect to instant message applications, other implementations are contemplated for providing similar functionality in platforms and online applications.

The techniques and concepts generally have been described in the context of an instant messaging system that uses an instant messaging host system to facilitate the instant messaging communication between instant message senders and instant message recipients. Other instant message implementations are contemplated, such as an instant message service in which instant messages are exchanged directly between two instant message client systems (e.g., an instant message sender system and an instant message recipient system).

In addition, although the examples above are given in an instant message context, other communications systems with similar attributes may be used. For example, some or all of the techniques may be applicable to messages exchanged in a chat room or in electronic mail (e-mail) communications. Also, some or all of the described user interfaces may be a viewable interface, an audible interface, a tactile interface, or a combination of these.

In addition, the techniques and concepts describing sender-initiated forwarding of an instant message to a mobile telephone based on recipient contact information known by the sender may be applied to other contexts. For example, an e-mail message may be sent to an e-mail address known by the sender that corresponds to the recipient identified in the instant message. In other examples, sender-initiated forwarding of messages may be enabled to a voice telephone message or a second instant message address provided by another instant message service. In some implementations, a hierarchy of communication schemes may be identified. For example, an instant message may be first forwarded as a text message to a mobile telephone number known to the sender and, when the recipient is not available to receive the message at the mobile telephone, the message may be also forwarded as an e-mail message to an e-mail address of the intended recipient that is known to the sender. A hierarchy of communication schemes may be automatically applied to select among available contact criteria for a recipient of an instant message. In some implementations, a user may set a preference for the order in which available contact criteria are applied. For example, a user may prefer that a text message be forwarded to a mobile telephone number (if known) before an e-mail message is sent to an e-mail address (if known). A user may set a default preference that is applied to all contacts, unless overridden by a preference identified for a particular contact. For example, in general, a user may indicate that an instant message is forwarded to a mobile telephone number before being sent as an e-mail message; however, for a particular contact, an instant message is forwarded as an e-mail message before a text message is forwarded to the mobile telephone number of the particular contact.

The techniques and concepts describing a buddy list that separates various identities into groups based on availability and/or communication scheme also may be applied to identify a group of buddies that are available via sending an e-mail message (and are otherwise offline and/or away).

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. As another example, a screen name is used throughout to represent a unique identifier of an account, but any other unique identifier of an account may be used when linking accounts. Accordingly, other implementations are within the scope of the following claims.

What is claimed is:

1. A computer-implemented method comprising:
   receiving an incoming message from a sender, the incoming message being an instant message sent to a recipient using a first communication channel;
   receiving configuration information about the recipient of the incoming message, the configuration information indicating whether or not the recipient permits receipt from the sender of the incoming message at a mobile device using a second communication channel, the mobile device having a mobile number associated with the recipient;
   determining a relationship strength between the sender and the recipient based on a relationship between the sender and the recipient in a social network; and
   sending using the second communication channel, a text message, including the incoming message, to the mobile telephone number associated with the recipient of the incoming message when the configuration information indicates that the recipient permits receipt of the incoming message using the mobile device, and the relationship strength meets or exceeds a relationship threshold strength, wherein the text message indicates that an electronic message is available for the recipient.

2. The method of claim 1, wherein the recipient includes an instant message identity.

3. The method of claim 1, wherein the message available for the recipient associated with the mobile telephone number is an instant message associated with the incoming message.

4. The method of claim 1, further comprising:
   determining if the recipient is available to receive an electronic message using a communication mechanism other than a mobile telephone associated with the mobile telephone number; and
   sending a message to the mobile telephone number when the recipient is determined to be not available to receive the electronic message using the communication mechanism.

5. The method of claim 1, wherein the recipient includes an instant message identity that is not signed on to an instant message service when the incoming message is received, and wherein the recipient is determined to be not available to receive an electronic message when the instant message identity is not signed on.

6. The method of claim 1, wherein the recipient includes an instant message identity that is signed in to an instant message service and is in an idle state when the incoming message is received, and wherein the recipient is determined to be not available to receive an electronic message when the instant message identity is in the idle state.

7. The method of claim 1, wherein the text message is based on the incoming message.

8. The method of claim 1, further comprising:
   receiving, in response to the text message, an instruction from the mobile telephone number, the instruction prohibiting forwarding a future incoming message to the mobile telephone number.

9. The method of claim 1, further comprising:
   receiving, in response to the text message, an instruction from the mobile telephone number, the instruction including identification information of the sender, and the instruction prohibiting forwarding of a future incoming message from the sender to the mobile telephone number.

10. The method of claim 1, further comprising:
    receiving an additional incoming message sent from the sender of the incoming message;
      determining whether an instruction to prohibit forwarding of incoming messages from the sender has been received; and
    preventing sending an additional text message in response to receipt of the additional incoming message to the mobile telephone number when the instruction to prohibit forwarding is determined to be received.

11. A computer-readable storage device storing programmable instructions, which when executed on at least one processor, cause the at least one processor to perform a method comprising:
    receiving an incoming message from a sender, the incoming message being an instant message sent to a recipient using a first communication channel;
    receiving configuration information about the recipient of the incoming message, the configuration information indicating whether or not the recipient permits receipt from the sender of the incoming message at a mobile device using a second communication channel, the mobile device having a mobile number associated with the recipient;
    determining a relationship strength between the sender and the recipient based on a relationship between the sender and the recipient in a social network; and
    sending using the second communication channel, a text message, including the incoming message, to the mobile telephone number associated with the recipient of the incoming message when the configuration information indicates that the recipient permits receipt of the incoming message using the mobile device, and the relationship strength meets or exceeds a relationship threshold strength, wherein the text message indicates that an electronic message is available for the recipient.

12. The computer-readable storage device of claim 11, wherein the recipient includes an instant message identity.

13. The computer-readable storage device of claim 11, wherein the method further comprises:
    determining if the recipient is available to receive an electronic message using a communication mechanism other than a mobile telephone associated with the mobile telephone number; and sending the additional message to the mobile telephone number when recipient is determined to be not available to receive the electronic message using the communication mechanism.

14. The computer-readable storage device of claim 11, wherein the recipient includes an instant message identity that is not signed on to an instant message service when the incoming message is received, and the recipient is determined to be not available to receive an electronic message when the instant message identity is not signed on.

15. The computer-readable storage device of claim 11, wherein the recipient includes an instant message identity that is signed in to an instant message service and is in an idle state when the incoming message is received, and the recipient is determined to be not available to receive an electronic message when the instant message identity is in the idle state.

16. The computer-readable storage device of claim 11, wherein the method further comprises:
   receiving, in response to the text message, an instruction from the mobile telephone number, the instruction prohibiting forwarding a future incoming message to the mobile telephone number.

17. The computer-readable storage device of claim 11, wherein the method further comprises:
   receiving an additional incoming message sent from the sender of the incoming message;
      determining whether an instruction to prohibit forwarding of incoming messages from the sender has been received; and
   preventing sending an additional text message to the mobile telephone number when the instruction to prohibit forwarding is determined to be received.

18. A system for sending a notification to a mobile device comprising:
   at least one processor; and
   a computer-readable storage device storing instructions, which when executed on the at least one processor, cause the at least one processor to:
      receive an incoming message from a sender, the incoming message being an instant message sent to a recipient using a first communication channel;
      receive configuration information about the recipient of the incoming message, the configuration information indicating whether or not the recipient permits receipt from the sender of the incoming message at a mobile device using a second communication channel, the mobile device having a mobile number associated with the recipient;
      determine a relationship strength between the sender and the recipient based on a relationship between the sender and the recipient in a social network; and
      send using the second communication channel, a text message, including the incoming message, to the mobile telephone number associated with the recipient of the incoming message when the configuration information indicates that the recipient permits receipt of the incoming message using the mobile device, and the relationship strength meets or exceeds a relationship threshold strength, wherein the text message indicates that an electronic message is available for the recipient.

* * * * *